May 28, 1940.  E. C. OLNEY  2,202,784
ACCOUNTING MACHINE
Filed Aug. 15, 1935   20 Sheets-Sheet 1
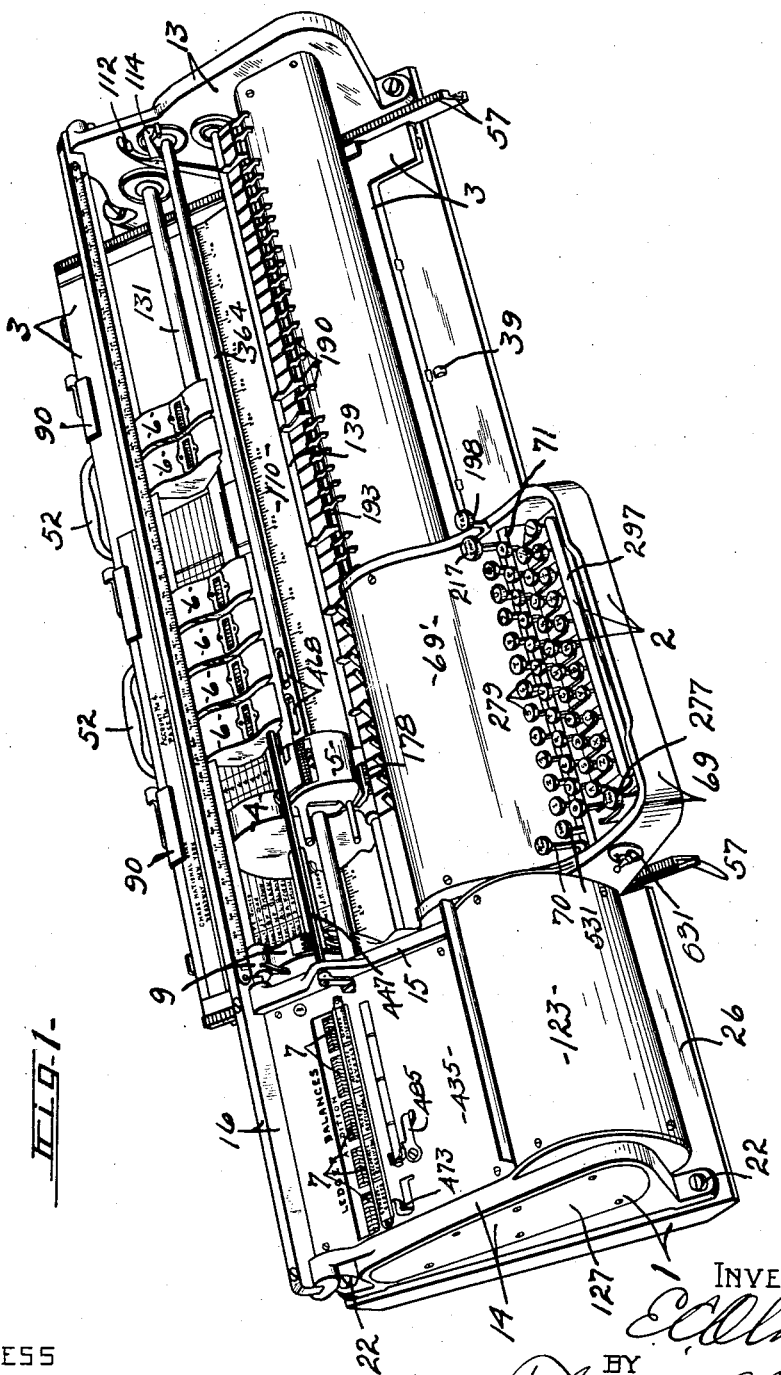

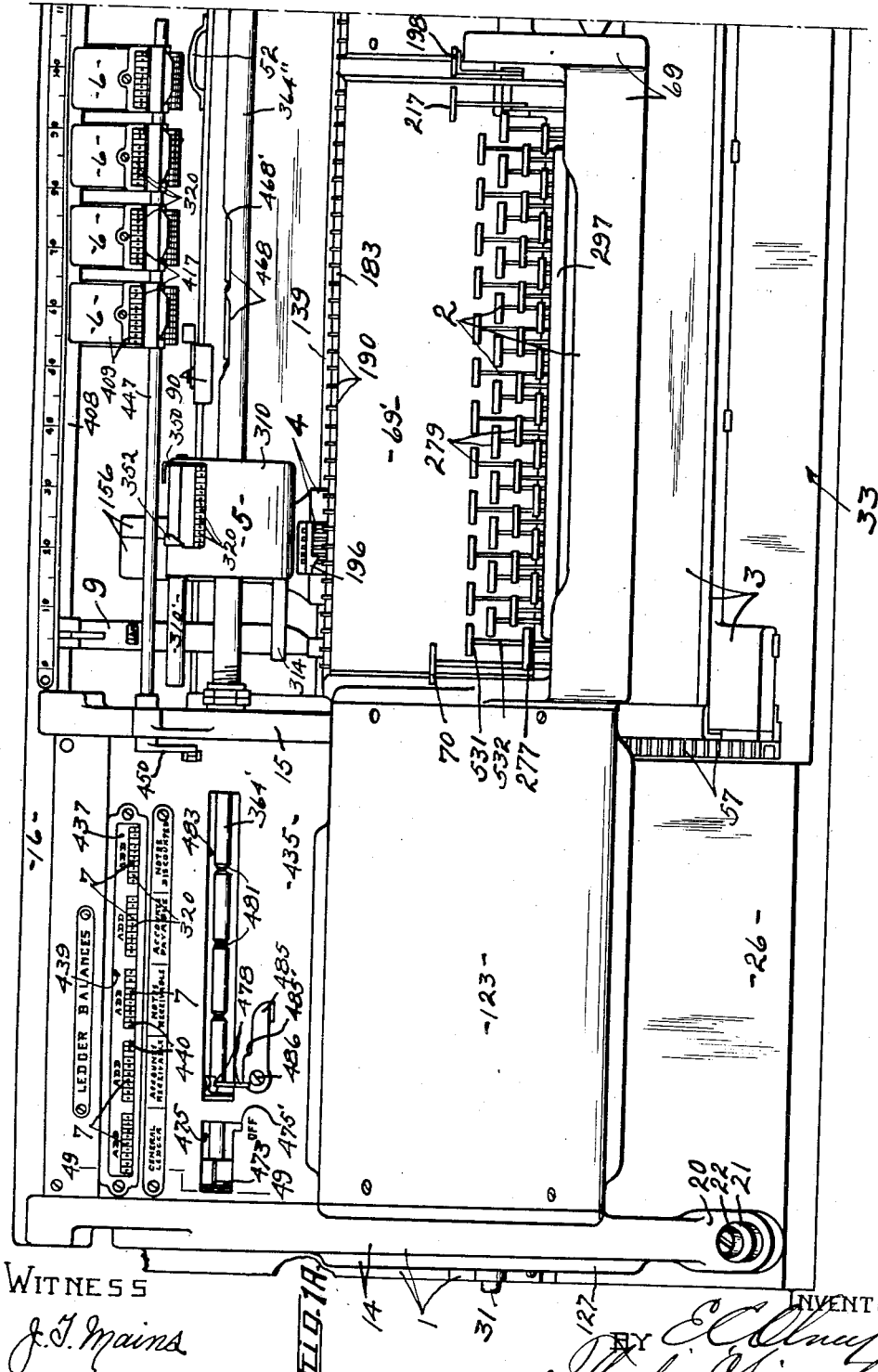

May 28, 1940.   E. C. OLNEY   2,202,784
ACCOUNTING MACHINE
Filed Aug. 15, 1935   20 Sheets-Sheet 3
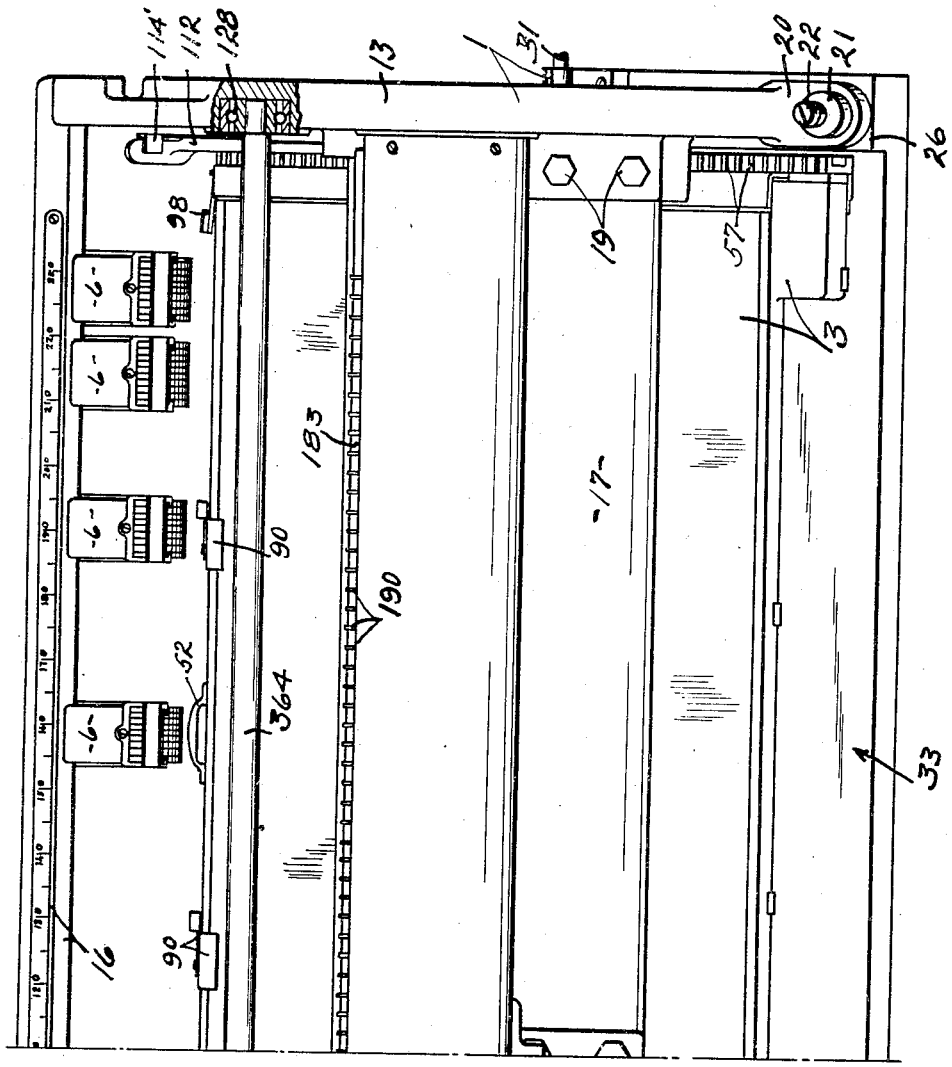
INVENTOR
E. C. Olney,
BY
Theodore E. Simonton
ATTORNEY
WITNESS
J. T. Mains

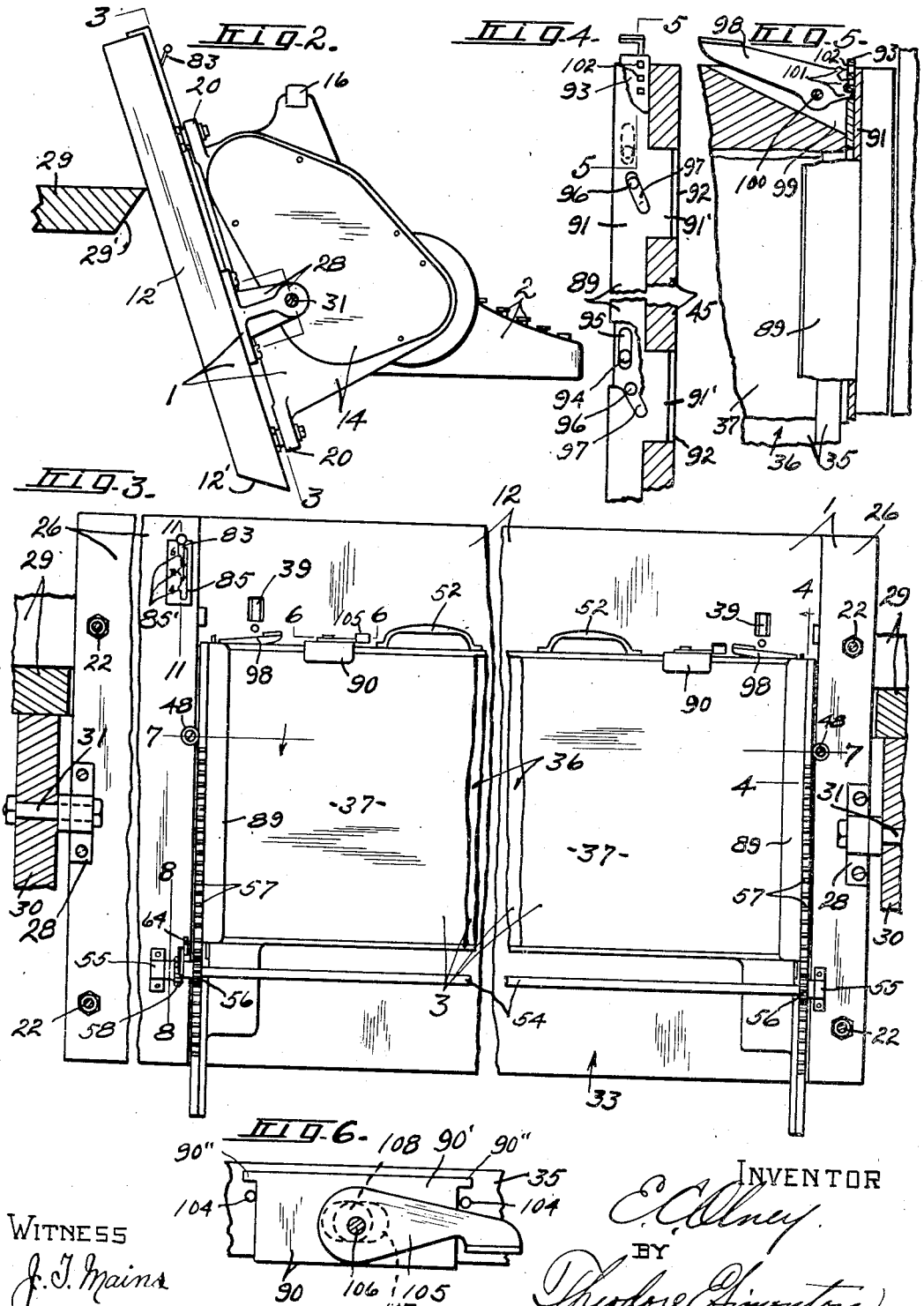

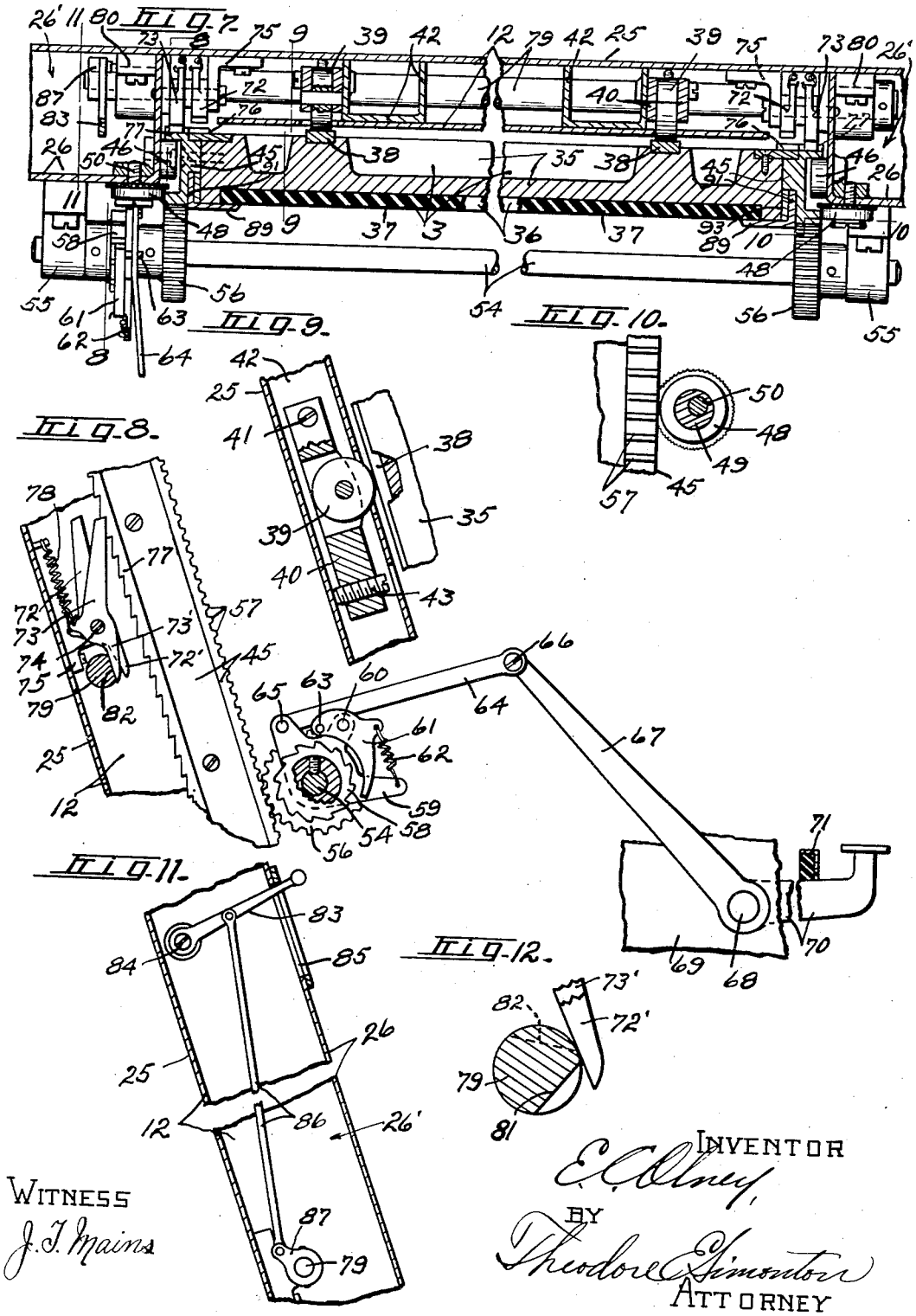

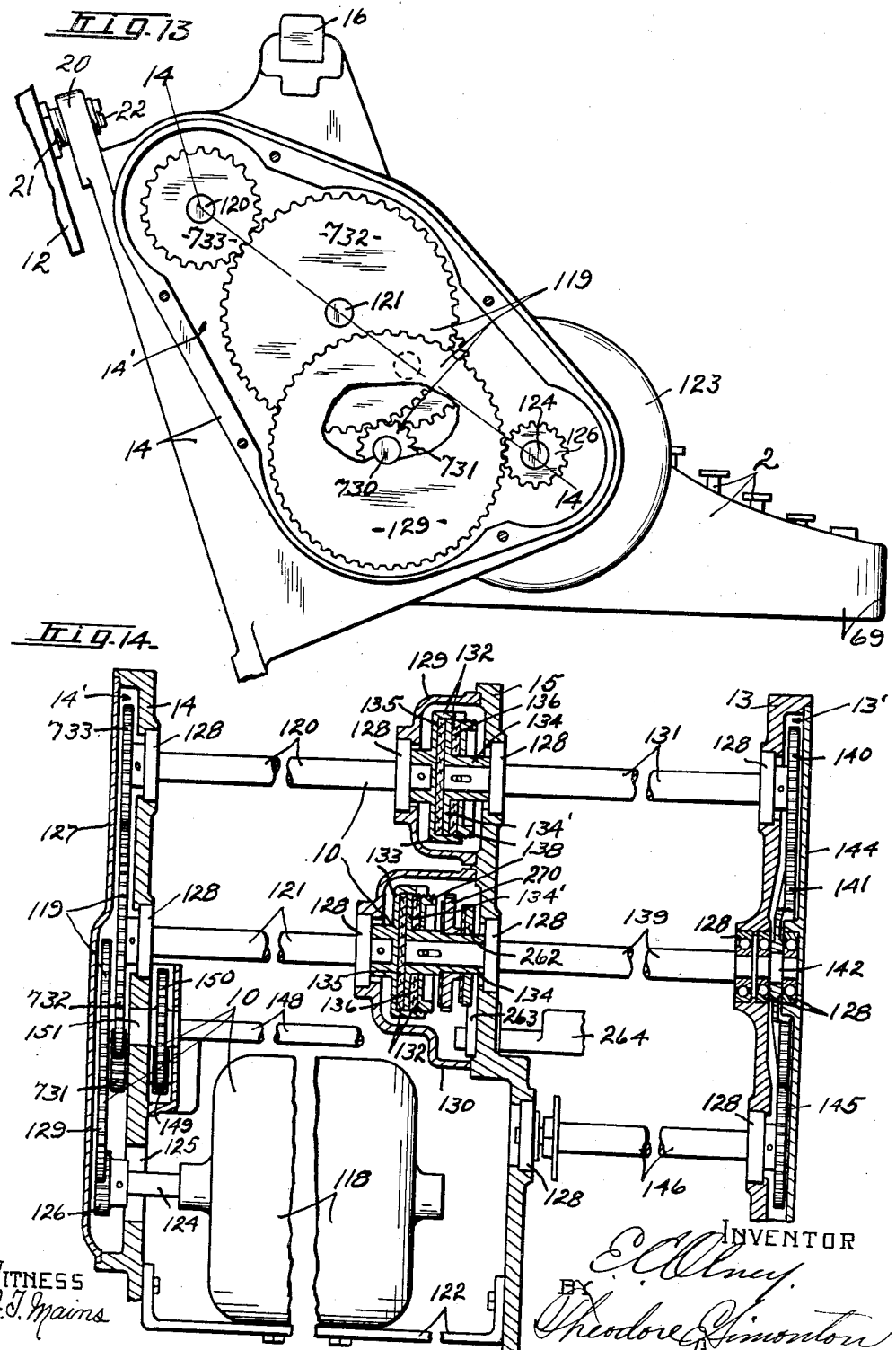

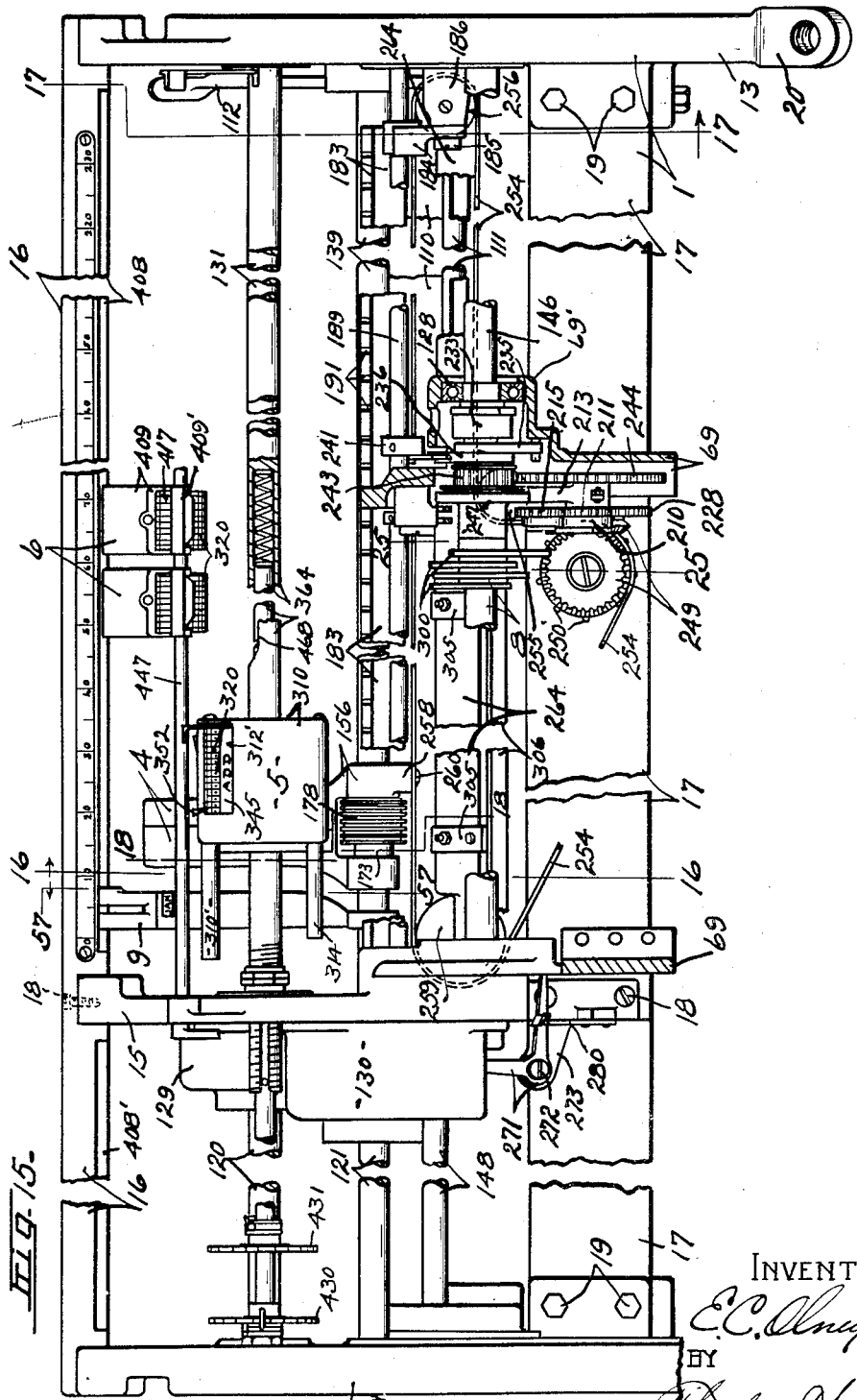

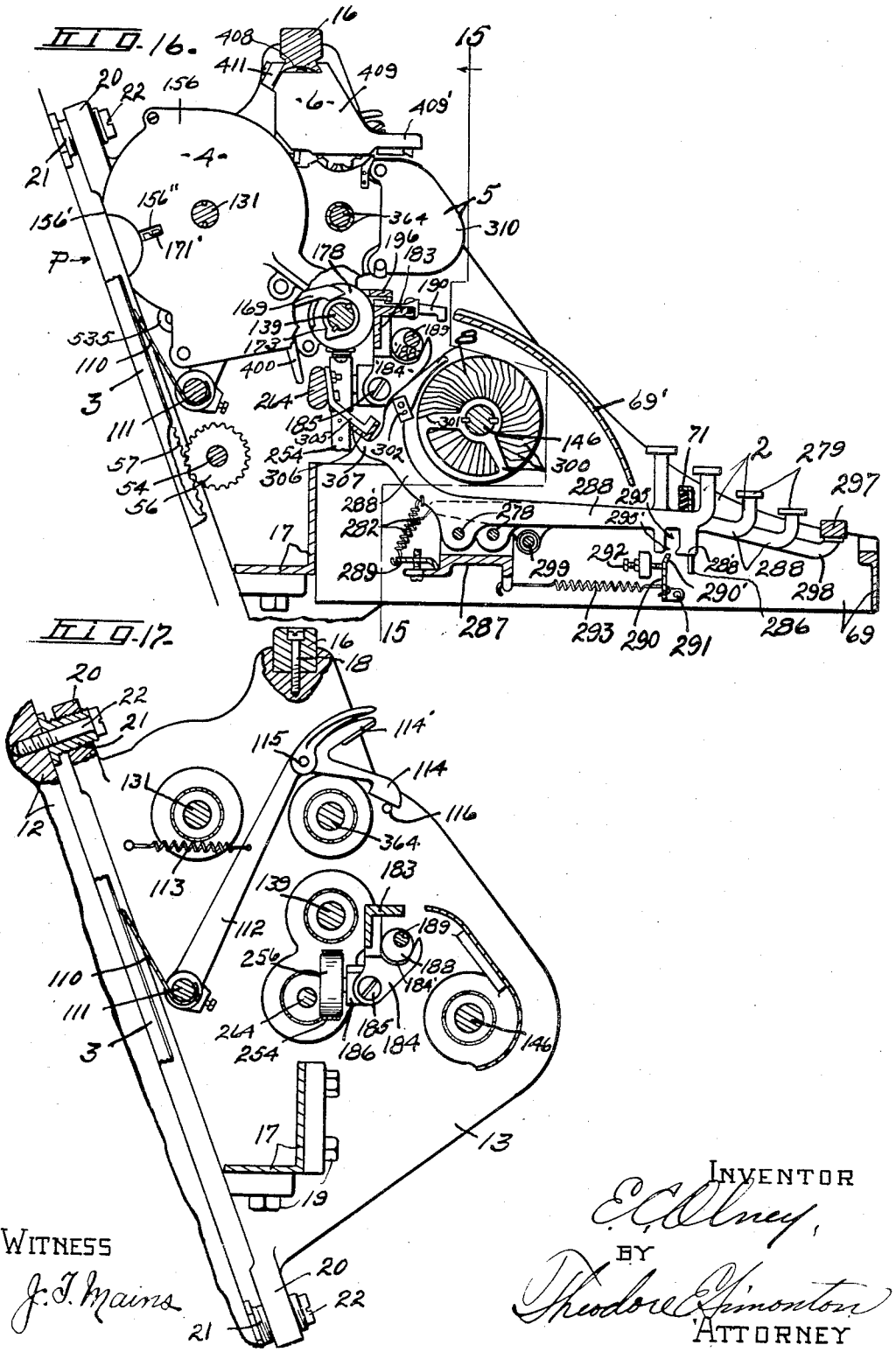

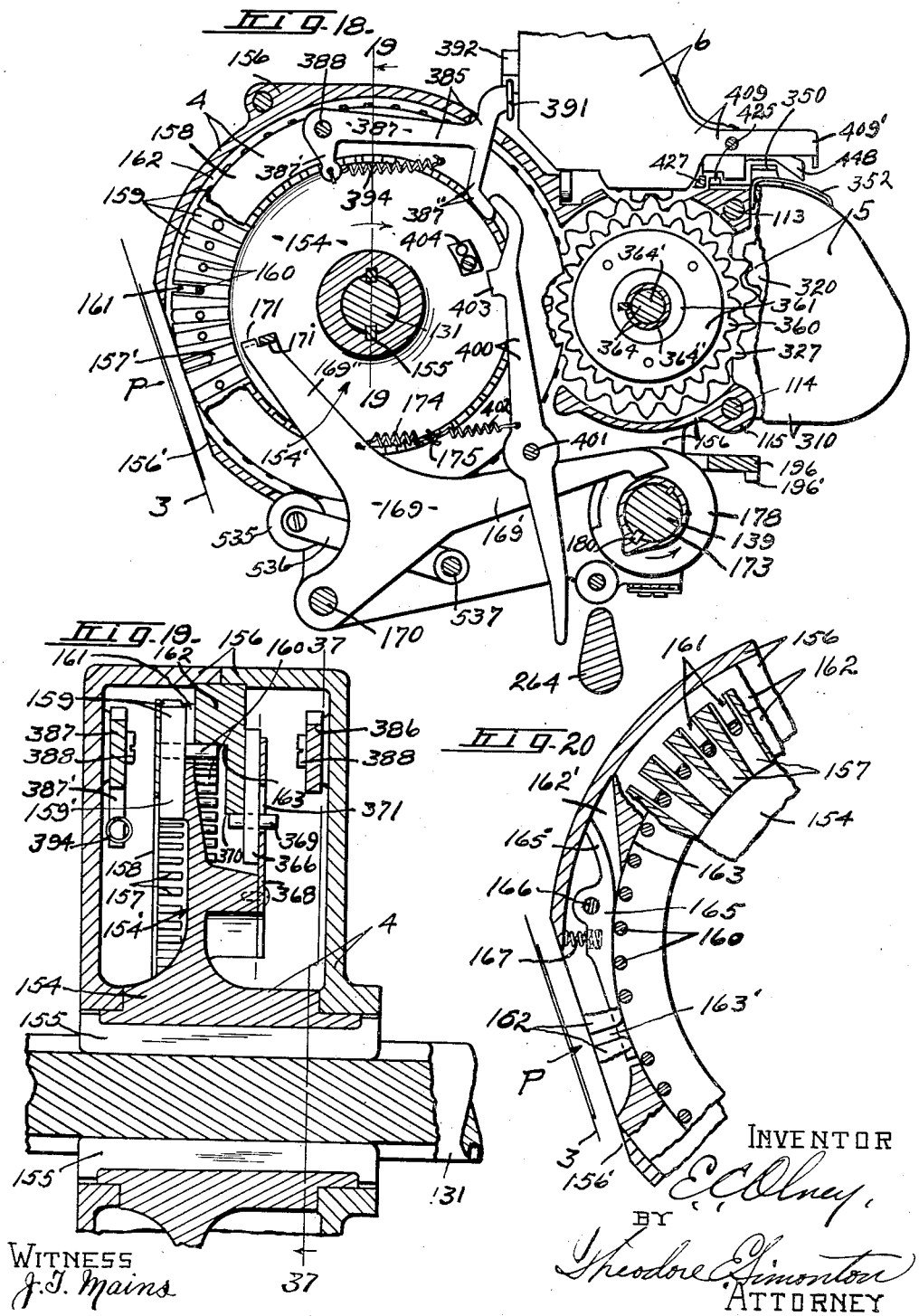

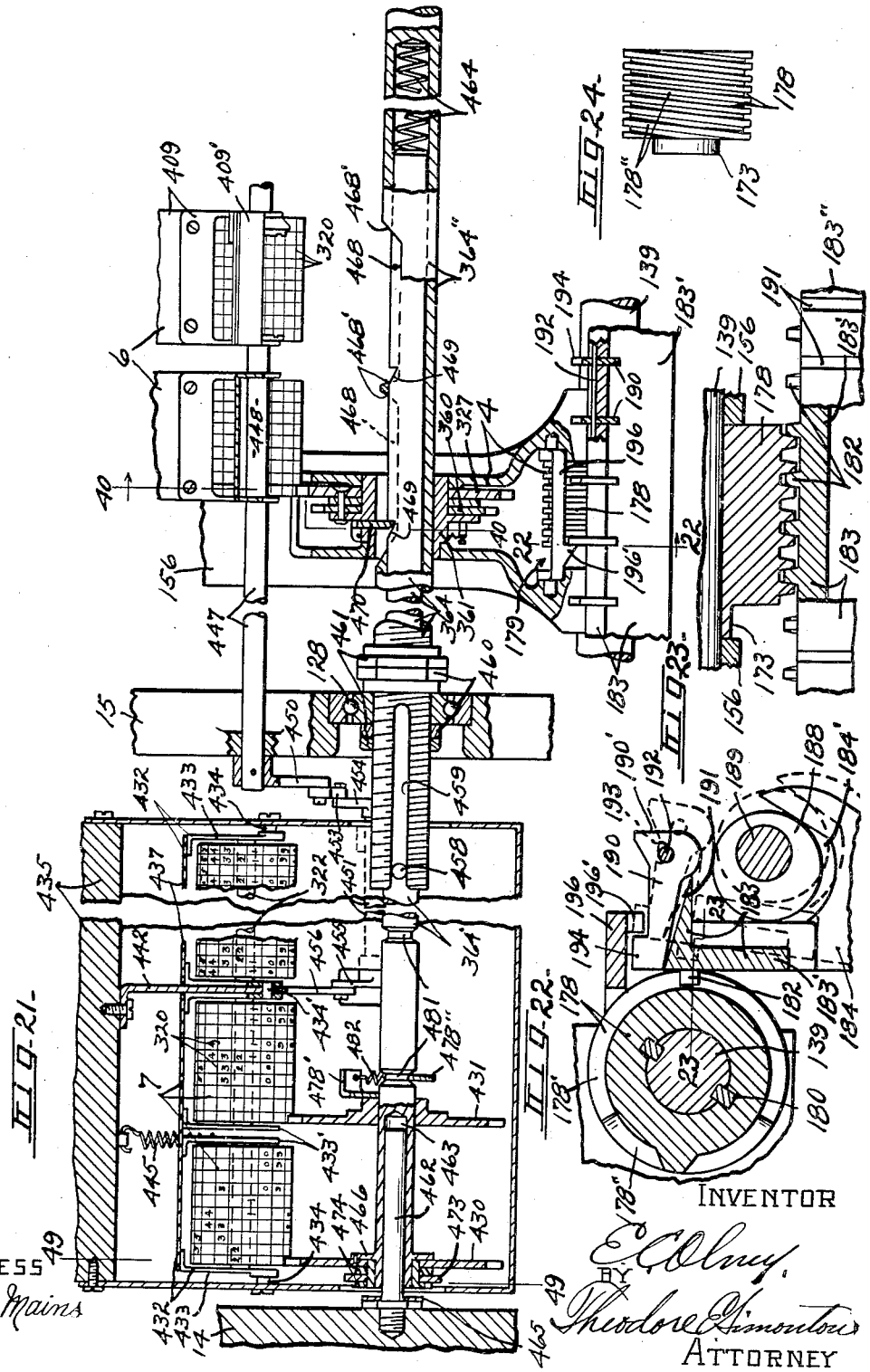

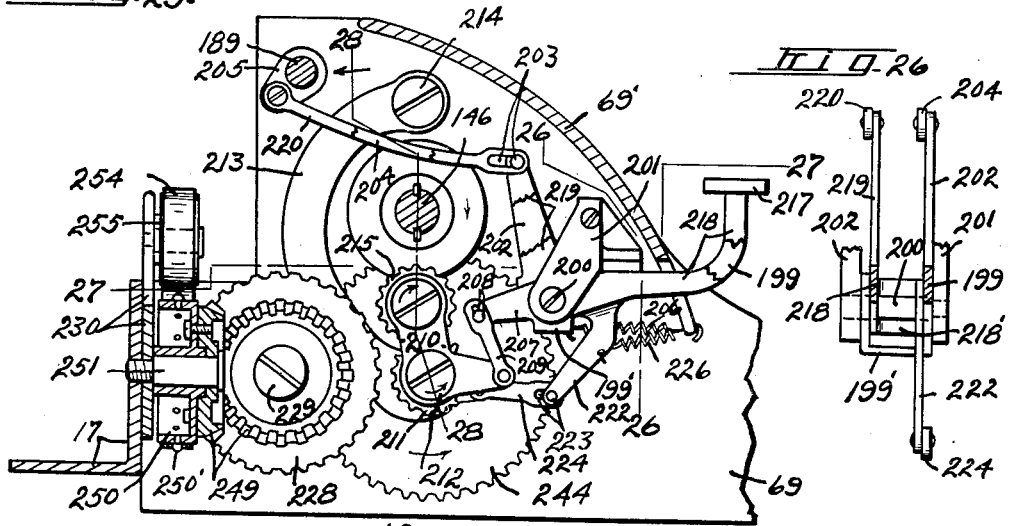
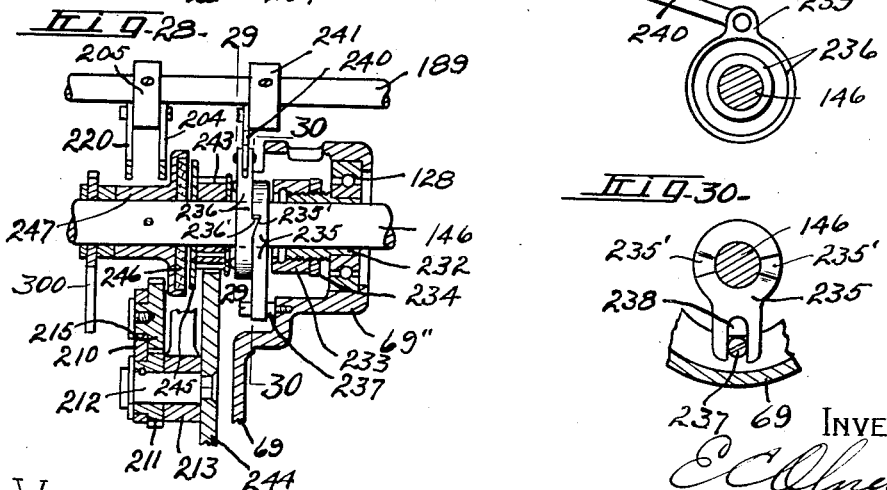

May 28, 1940.　　　　　E. C. OLNEY　　　　　2,202,784
ACCOUNTING MACHINE
Filed Aug. 15, 1935　　　20 Sheets-Sheet 12
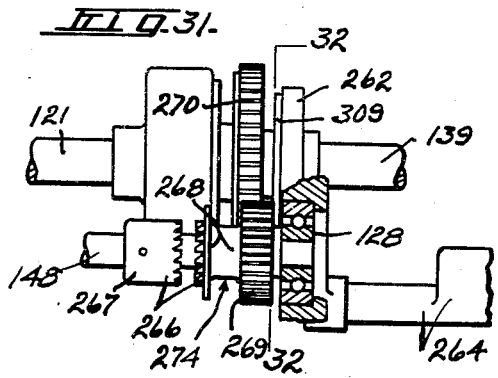
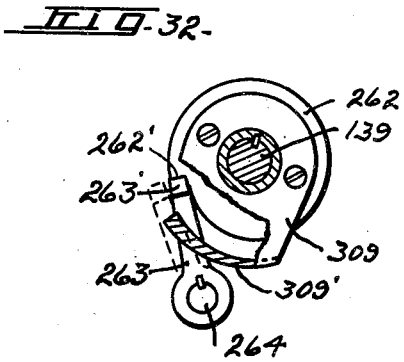
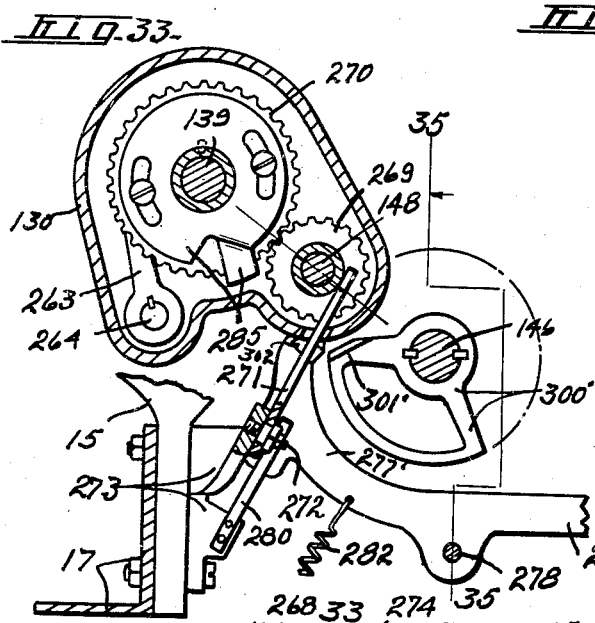
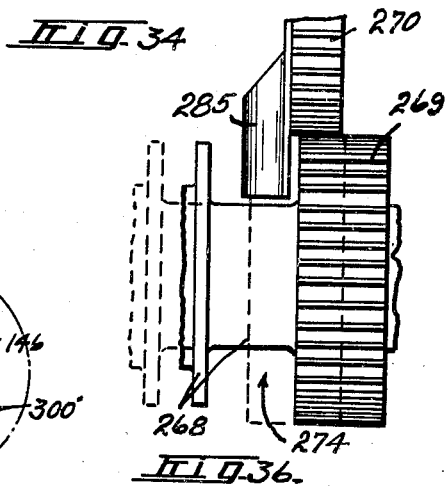
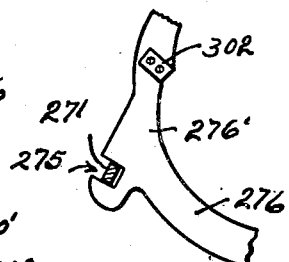
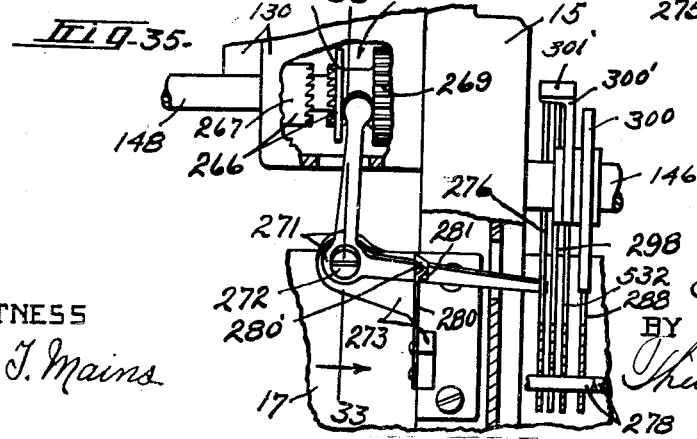

May 28, 1940. E. C. OLNEY 2,202,784
ACCOUNTING MACHINE
Filed Aug. 15, 1935 20 Sheets-Sheet 13
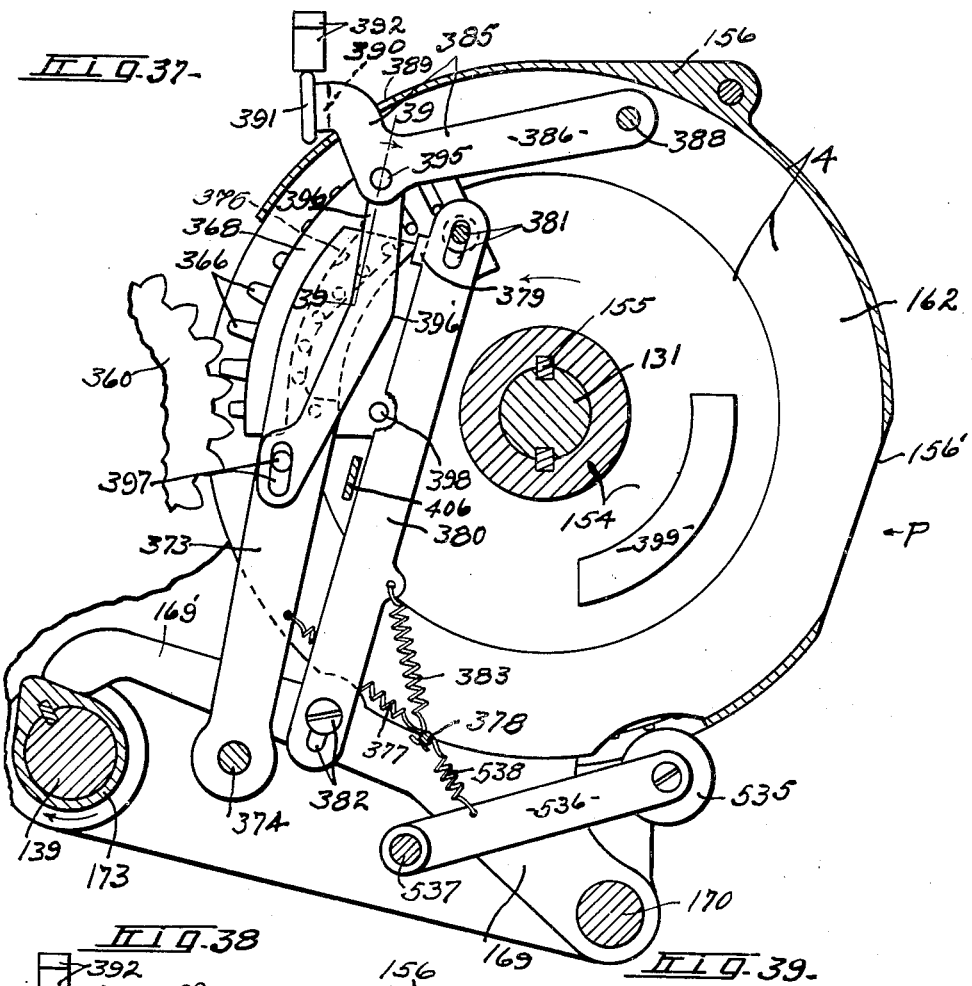
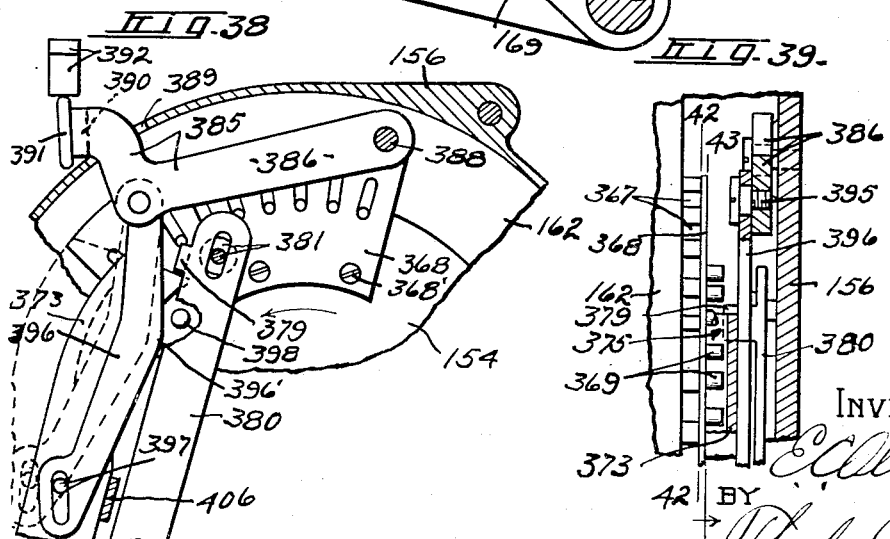
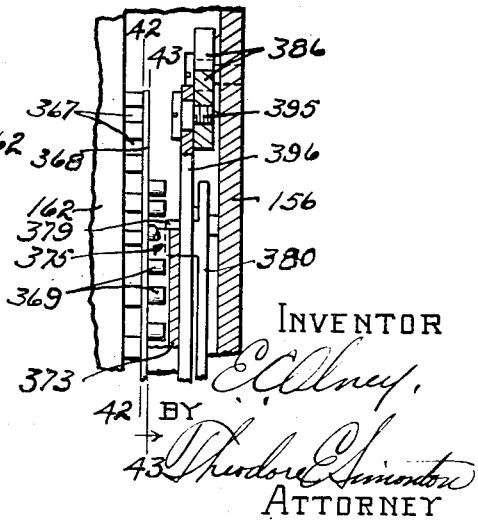

May 28, 1940.  E. C. OLNEY  2,202,784
ACCOUNTING MACHINE
Filed Aug. 15, 1935  20 Sheets-Sheet 14
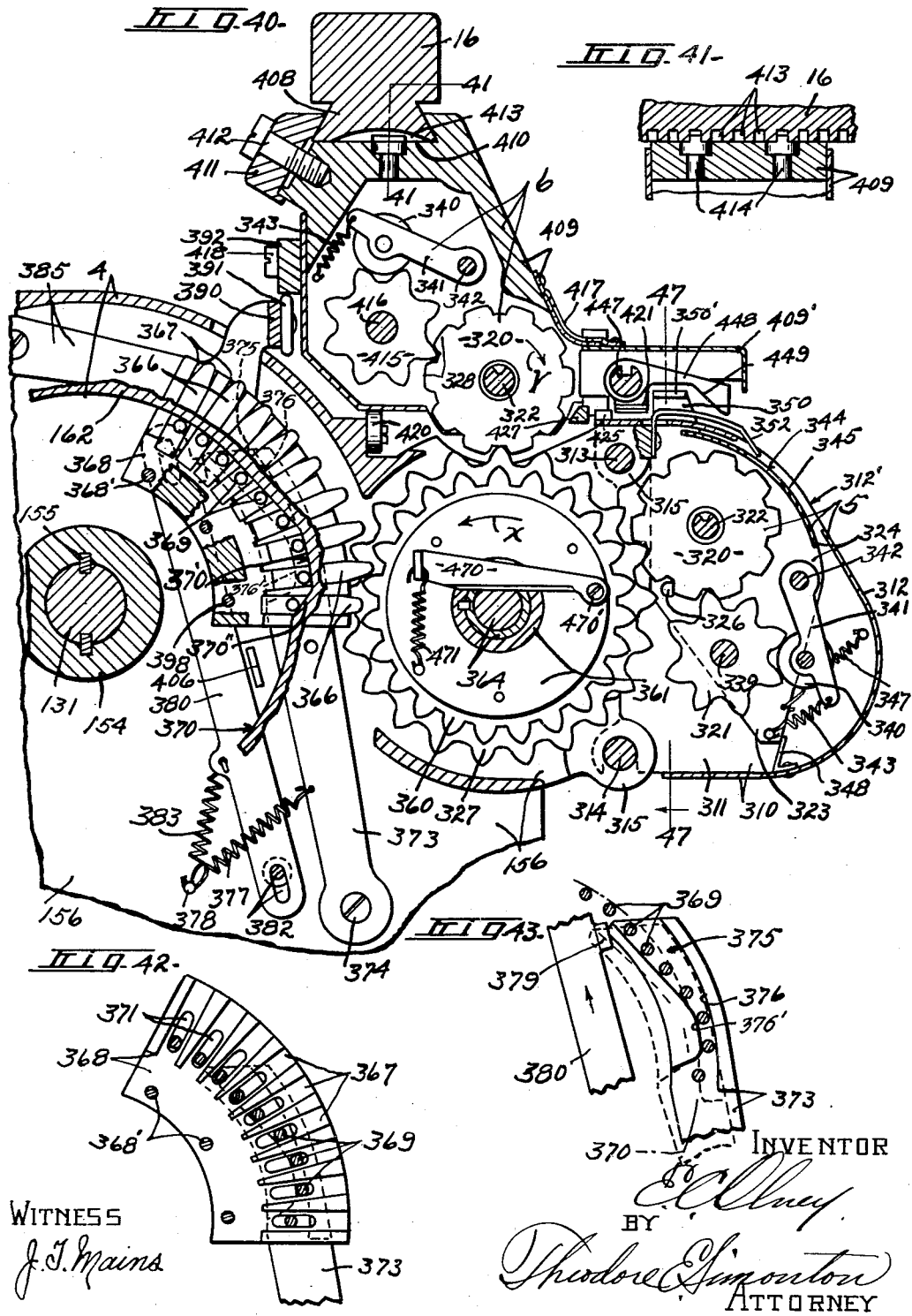

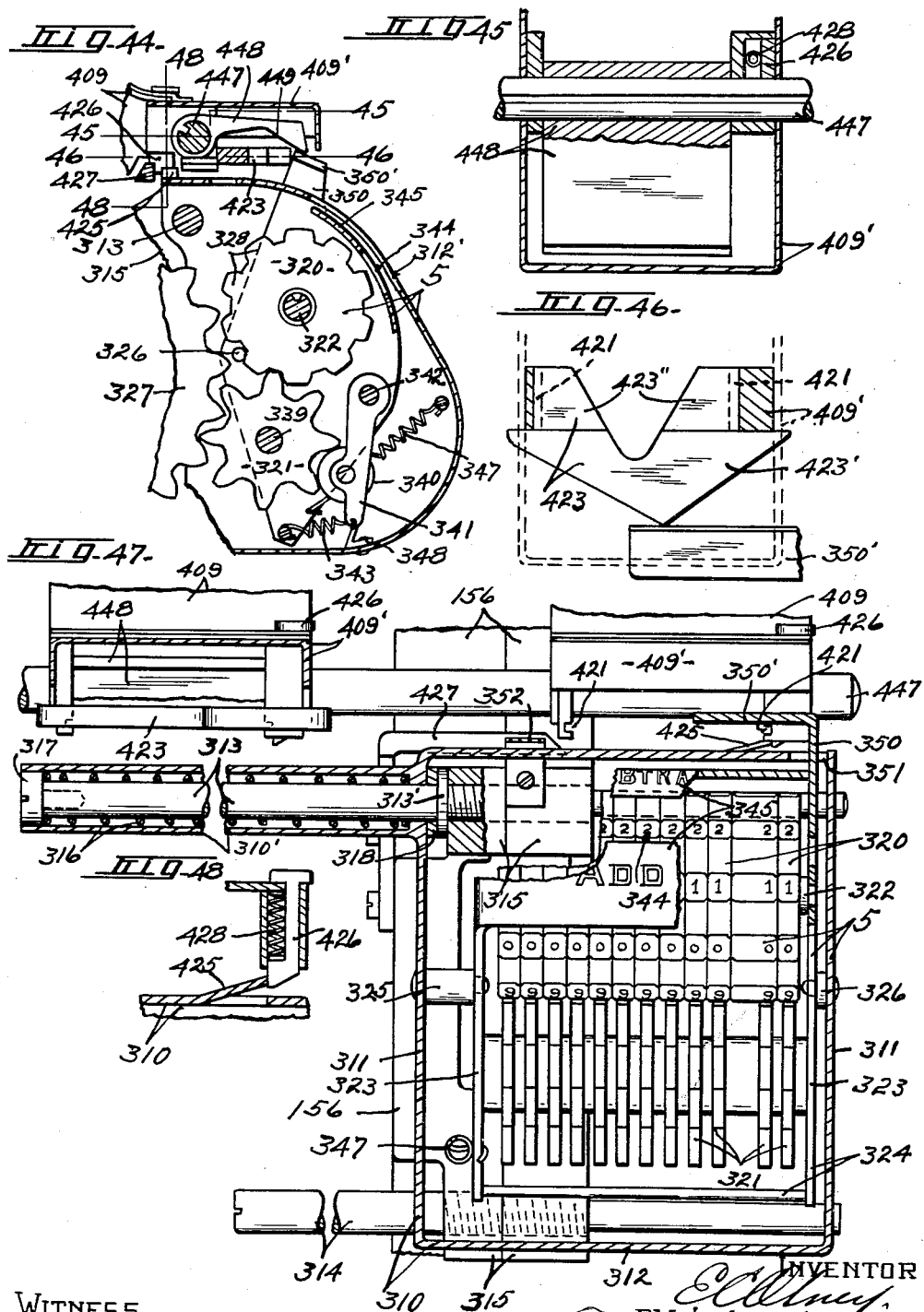

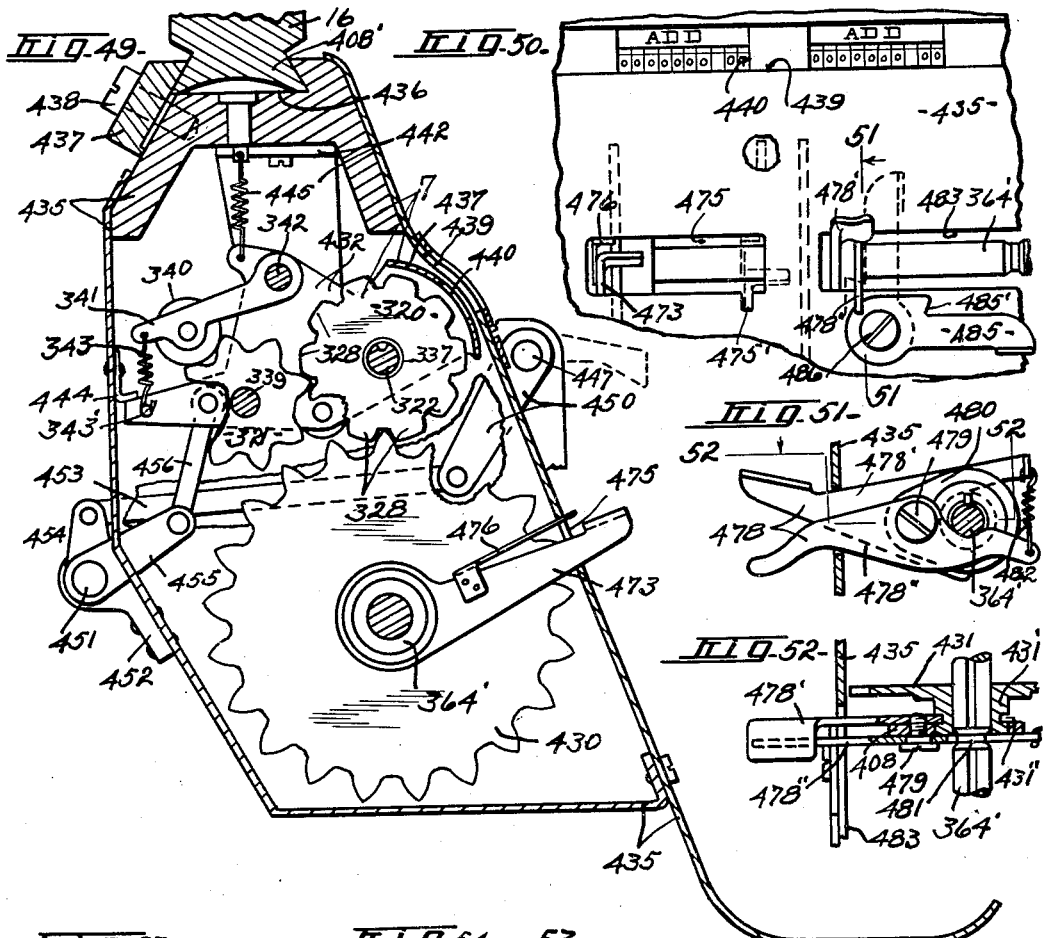

May 28, 1940.  E. C. OLNEY  2,202,784
ACCOUNTING MACHINE
Filed Aug. 15, 1935  20 Sheets-Sheet 17
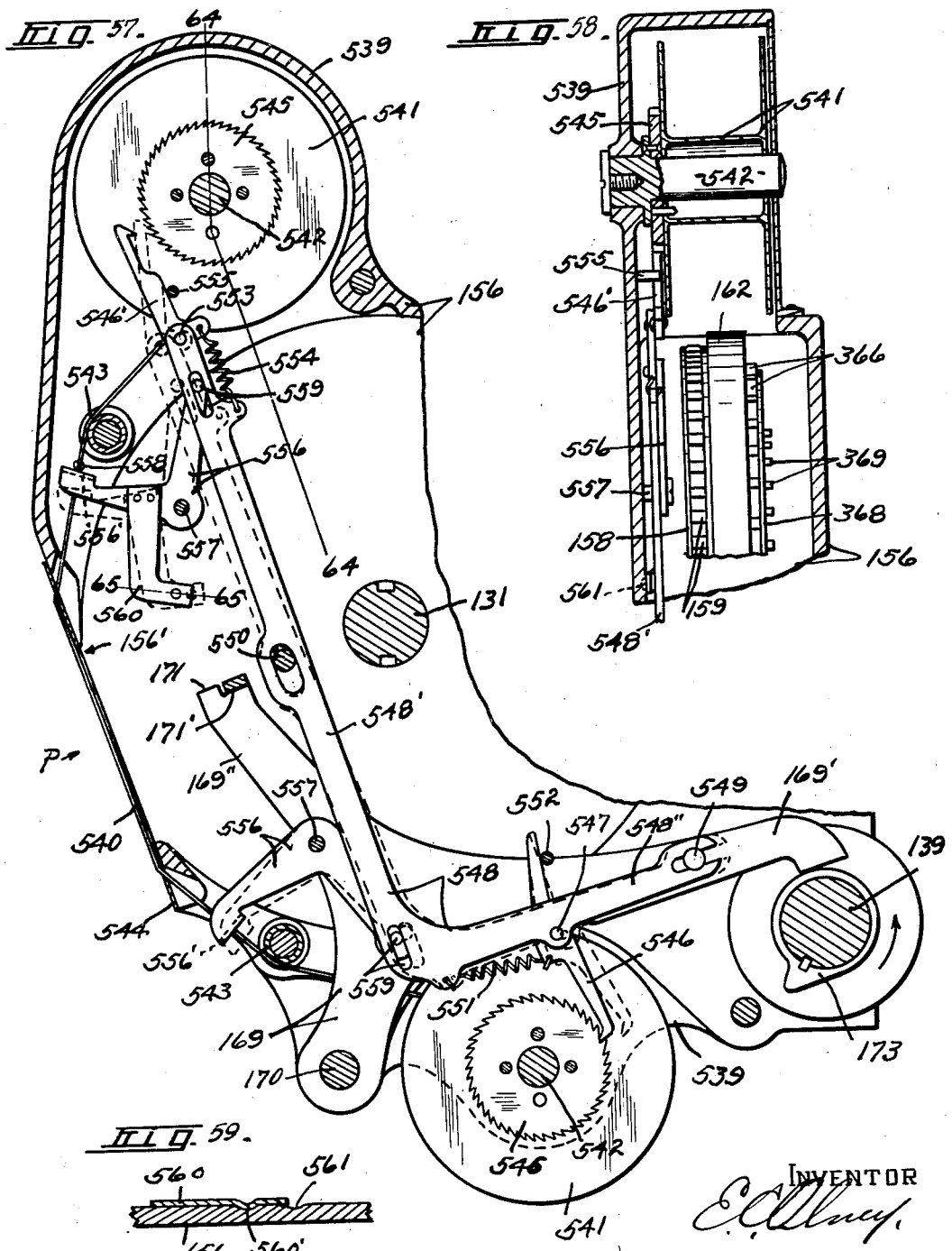

May 28, 1940.  E. C. OLNEY  2,202,784
ACCOUNTING MACHINE
Filed Aug. 15, 1935  20 Sheets-Sheet 18
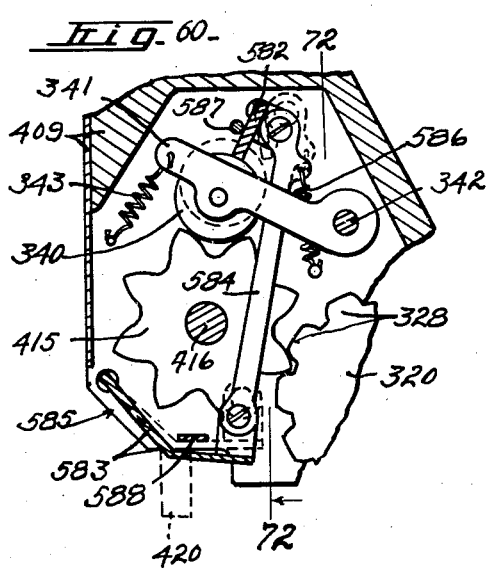
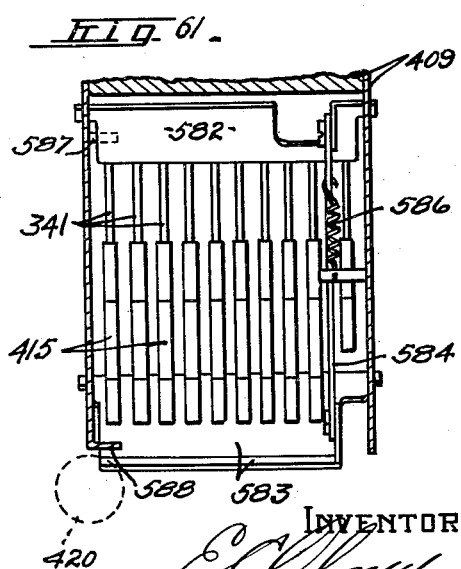

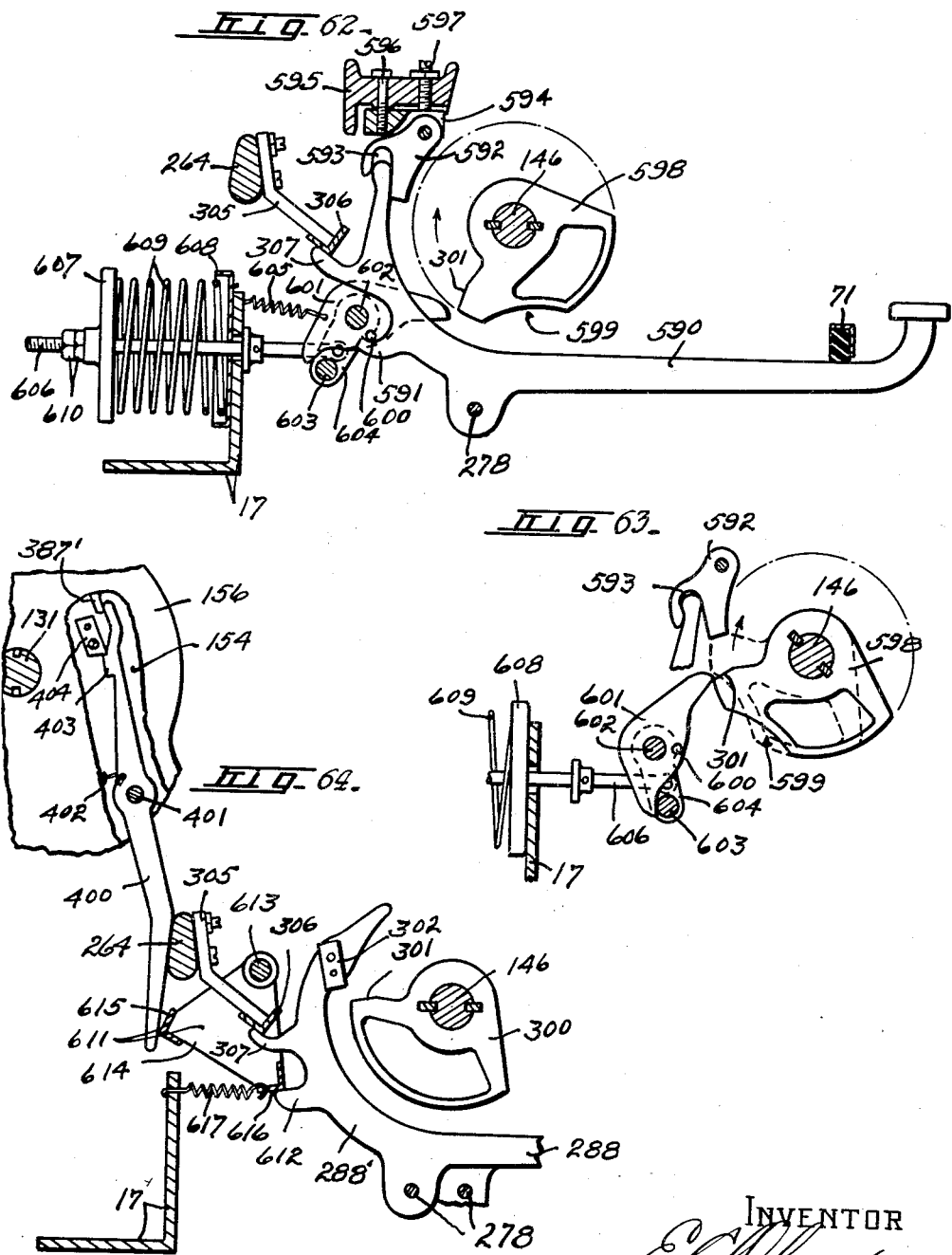

May 28, 1940.  E. C. OLNEY  2,202,784
ACCOUNTING MACHINE
Filed Aug. 15, 1935   20 Sheets—Sheet 20
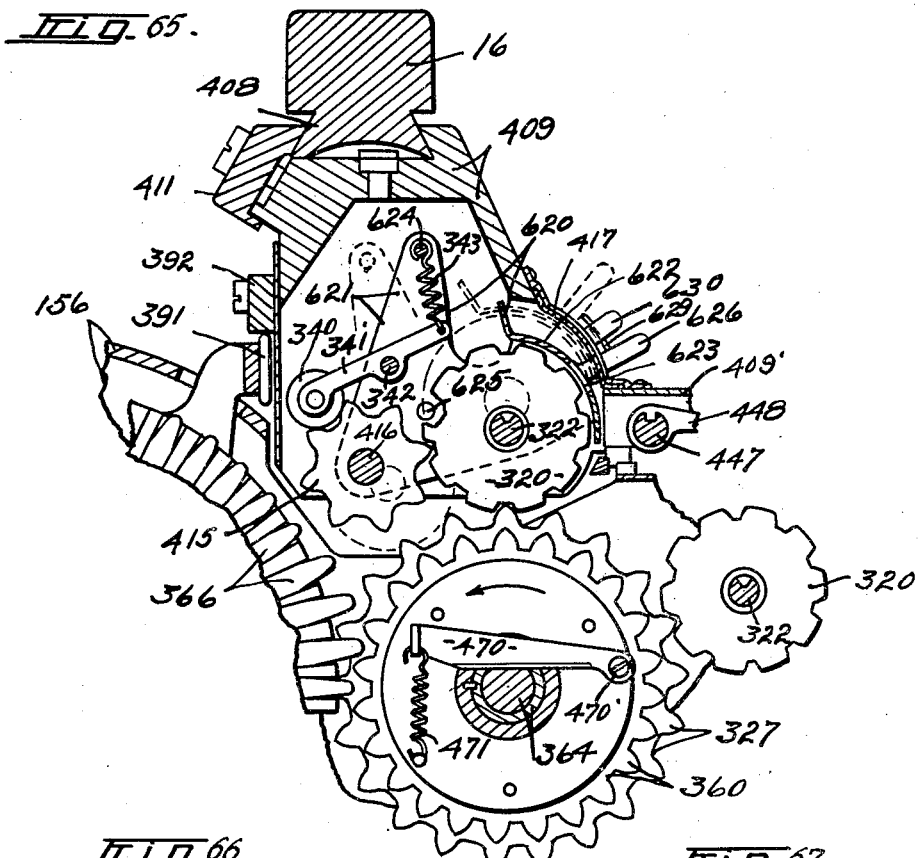
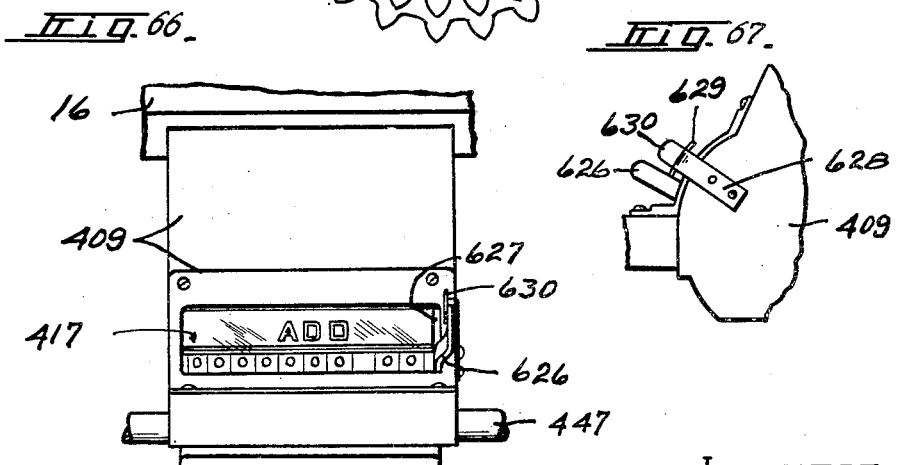
INVENTOR
E. C. Olney
BY
Theodore E. Simonton
ATTORNEY
WITNESS
J. J. Mains Patented May 28, 1940

2,202,784

UNITED STATES PATENT OFFICE 2,202,784

ACCOUNTING MACHINE

Ernest C. Olney, Syracuse, N. Y., assignor to
E. C. Olney & Company, Inc., Syracuse, N. Y.,
a corporation of New York Application August 15, 1935, Serial No. 36,351

31 Claims. (Cl. 235—59)

This invention relates to an accounting machine in which printing type and mechanical computing units are operated by power means manually controlled by a slight physical effort.

One of the main objects of this invention is to produce a universal bookkeeping and accounting machine by which all the requirements in the science and art of bookkeeping and accounting may be accomplished.

Other important objects of the invention are to produce a machine of the above mentioned class that is economical in the cost of manufacture and maintenance, that is durable and simple in construction, and which is accurate and dependable in operation.

In carrying out the first mentioned object, I have provided a machine having a single conventional typewriter key board and a printing unit comprising a set of alphabetical and numerical characters together with certain punctuation marks, etc., as designated by the keys of the key board, and which is operatively connected with the key board in such a manner that the manipulation of the keys will cause the operation of the characters of the printing unit to produce a printed record.

The characters or type are operated on the rotor principle by a suitable power means and are movable as a unit longitudinally of the lines to effect letter spacing, tabulation, etc. In addition to the above, I have provided a movable platen located wholly at the rear of the key board and which is tilted to a most convenient angle to not only enable the operator to advantageously observe the operation of the machine and the records as they are being made, but to always maintain the platen during the operation of the machine in an out-of-the-way position so as to not obstruct or interfere with the action of the operator manipulating the keys. The platen is movable relatively to the key board and the printing unit for line spacing.

In accomplishing the second list of objects, I have produced a power driven machine in which nearly all of the operations are controlled from the key board by a slight physical effort. The parts of the device are limited to a minimum number and many of them are standardized and interchangeable.

A further object of the invention resides in providing an accounting machine with a plurality of mechanical computing units which may, as herein illustrated, be classified into three major groups, namely, balancing totalizers 7, computing totalizers 6 and a cross totalizer 5. These totalizers are so associated with the printing unit that one or more computations may be simultaneously effected with the printing of the numerals. Furthermore, these totalizers are so associated with the type or carrier for the type that the cross totalizer is actuated each and every time any of the remaining totalizers is operated, while said remaining totalizers are arranged to be selectively operated individually or in groups as desired, whereby any required result may be readily obtained.

A still further object is to provide manually operated means whereby the operation of certain of the totalizers may be controlled as desired to simultaneously effect addition and subtraction of a given amount to and from corresponding balances already obtained. In other words, the balance totalizers are adapted to maintain a perpetual balance record of major accounts. The computing totalizers are utilized automatically to add to each account debits or credits substantially simultaneously with the printing of the amounts thereof whereby the total of a given column may be ascertained after each entry, and the cross totalizer provides a means for checking and proving the entries as they are made and as shown by the computing totalizers.

Other objects, uses and advantages pertaining to the structure of the device and to the form and relation of the parts thereof, will more fully appear from the following description taken in connection with the accompanying drawings in which:

Figure 1 is a perspective view of an accounting machine embodying the various features of this invention.

Figures 1A and 1B are front elevations of the left hand and right hand end portions respectively of the accounting machine illustrated in Figure 1.

Figure 2 is a left hand end elevation of the device shown in Figures 1, 1A and 1B illustrating the same on a reduced scale and as being associated with the top portion of a desk or table which is shown in section.

Figure 3 is a sectional view taken substantially in the plane of the line 3—3, Figure 2 and showing the platen in elevation and a portion of the support therefor, with intermediate portions of the platen broken away.

Figure 4 is an enlarged detail sectional view taken on line 4—4, Figure 3.

Figure 5 is a detail sectional view taken on line 5—5, Figure 4.

Figure 6 is a detail sectional view taken on line 6—6, Figure 3.

Figure 7 is a detail transverse sectional view taken substantially on line 7—7, Figure 3.

Figure 8 is a detail sectional view taken substantially on line 8—8, Figure 7 and illustrating the mechanism for actuating the platen.

Figures 9 and 10 are detail sectional views taken respectively on lines 9—9 and 10—10, Figure 7.

Figure 11 is a detail sectional view taken on line 11—11, Figure 7 and also in the plane of the line 11—11, Figure 3 showing the lever means for governing the line spacing of the platen.

Figure 12 is an enlarged transverse section of the shaft actuated by the lever means in Figure 11 and showing the adjacent portions of the holding pawls associated therewith in elevation.

Figure 13 is a partial end elevation of my improved accounting device with the cover plate removed and illustrates a driving gear train for transmitting motion from a power element to the various operating units of the device.

Figure 14 is a detail transverse sectional view of the machine taken in the plane of the line 14—14, Figure 13 and illustrating the shafts operated by the train of gears shown in Figure 13 with the intermediate portion of said shafts broken away.

Figure 15 is a plan view partly in section and with portions thereof broken away illustrating the general arrangement of the operating mechanism of the machine as viewed substantially from line 15—15, Figure 16.

Figure 16 is a transverse section of the device taken substantially on line 16—16, Figure 15, illustrating portions of the platen and frame of the machine broken away.

Figure 17 is a detail transverse sectional view taken substantially on line 17—17, Figure 15.

Figure 18 is a detail transverse sectional view through the type carrier housing and associated members taken substantially on line 18—18, Figure 15 and illustrating other associated members partly broken away and in section.

Figure 19 is an enlarged detail section taken on line 19—19, Figure 18.

Figure 20 is a detail transverse sectional view of the type carrier taken substantially in the plane of the operating cam for the alphabetical type adjacent the printing station.

Figure 21 is a longitudinal vertical sectional view partly in elevation taken substantially in the plane of the spacer and cam shaft and illustrating the type carrier moved axially from the position shown in Figures 1A and 15 into cooperative relation with one of the mechanical totalizers located in the printing and computing zone.

Figure 22 is a detail section taken on line 22—22, Figure 21.

Figure 23 is a detail horizontal sectional view taken on line 23—23, Figure 22.

Figure 24 is a side elevation of the type operating cam and letter spacing shown in Figure 21.

Figure 25 is an enlarged detail sectional view taken in the plane of the line 25—25, Figure 15, illustrating the control for the operating mechanism for moving the type unit axially in either direction.

Figure 26 is a detail section taken substantially on line 26—26, Figure 25.

Figure 27 is a detail horizontal sectional view taken on line 27—27, Figure 25.

Figure 28 is a detail vertical sectional view taken on line 28—28, Figure 25.

Figures 29 and 30 are sectional views taken respectively on lines 29—29 and 30—30, Figure 28.

Figure 31 is an elevation partly in section of the clutch housing associated with the space and cam shaft and illustrating a reversing clutch for effecting the back spacing of the type unit and the associated members.

Figure 32 is a sectional view taken on lines 32—32, Figure 31.

Figure 33 is a fragmentary sectional view taken substantially on line 33—33, Figure 35 with a portion of the supporting frame bracket broken away and illustrating a selector disc and a portion of a key lever in elevation.

Figure 34 is a fragmentary face view illustrating a throw-out cam for automatically declutching the clutch member.

Figure 35 is a fragmentary face view as viewed from line 35—35, Figure 33 showing portions of the machine case and clutch case broken away and in section.

Figure 36 is a fragmentary side elevation of the inner end portion of the key lever shown in Figure 33 with the bell crank arm associated therewith in section.

Figure 37 is a detail transverse section of the type carrier housing taken at the opposite side thereof from that shown in Figure 18 and substantially on line 37—37, Figure 19.

Figure 38 is a detail transverse section of the upper portion of the type carrier as viewed in Figure 37 but with certain members thereof in a second position.

Figure 39 is a detail sectional view taken on line 39—39, Figure 37.

Figure 40 is a detail transverse sectional view taken through the cross totalizer and the adjacent portions of the type carrier and one of the totalizers located in the printing and computing zone as viewed substantially from line 40—40, Figure 21.

Figure 41 is a detail section taken on line 41—41, Figure 40.

Figures 42 and 43 are detail sections taken respectively on lines 42—42 and 43—43, Figure 39, and illustrating portions of the guide cam means associated with the drive mechanism for transmitting motion from the type rotor to the master drive gear for the totalizers.

Figure 44 is a detail vertical section of a portion of the cross totalizer and a control plate therefor, taken in the plane of Figure 40 and illustrating certain of the parts thereof in an adjusted position for producing calculations in subtraction.

Figures 45 and 46 are horizontal sections taken respectively on lines 45—45 and 46—46, Figure 44.

Figure 47 is a vertical sectional view through the case of the cross totalizer taken substantially on line 47—47, Figure 40 and showing certain of the interior mechanism in elevation and other portions thereof broken away and in section.

Figure 48 is a detail sectional view taken on line 48—48, Figure 44.

Figure 49 is a detail vertical sectional view taken on line 49—49, Figure 21 and also substantially in the plane of the line 49—49, Figure 1A and illustrating the structure of one of the balance totalizers located in the summarizing zone.

Figure 50 is a fragmentary outer face view of the housing of the accounting machine in the summarizing zone but on an enlarged scale from that shown in Figure 1A.

Figure 51 is a detail section taken on line 51—51, Figure 50.

Figure 52 is a sectional view taken on line 52—52, Figure 51.

Figure 53 is a detail longitudinal sectional view through a plurality of adjacent register wheels of any one of the totalizers taken in the plane of the line 53—53, Figure 54.

Figure 54 is a transverse sectional view taken on line 54—54, Figure 53.

Figure 55 is a detail transverse sectional view taken in the plane of Figure 54 showing the drive members of an adjacent register wheel in a second position.

Figure 56 is a detail sectional view taken on line 56—56, Figure 54.

Figure 57 is a fragmentary transverse sectional view illustrating a ribbon feed mechanism particularly adapted to be used in connection with my novel accounting device.

Figures 58 and 59 are detail sectional views taken respectively on lines 58—58 and 59—59, Figure 57.

Figure 60 is a detail transverse sectional view through the upper portion of a totalizer illustrating a modified form of the structure shown more particularly in Figure 40 and which pertains more specifically to an automatic locking device.

Figure 61 is a sectional view partly in elevation taken substantially in the plane of the line 61—61, Figure 60.

Figure 62 is a detail transverse sectional view illustrating a modified form of selector and the key operated control mechanism associated therewith.

Figure 63 is a fragmentary sectional view taken in the plane of Figure 62 illustrating a second position of certain of the control mechanism illustrated in the latter figure.

Figure 64 is a fragmentary transverse sectional view illustrating a means for automatically locking the keys for the alphabetical characters when the type unit is in operative connection with one of the totalizers located in the printing and computing zone.

Figure 65 is a detail transverse sectional view illustrating a modified form of totalizer and of the relation thereof to the printing unit and the cross totalizer.

Figure 66 is a face view of the totalizer shown in Figure 65.

Figure 67 is a fragmentary side elevation of the totalizer.

General description

The apparatus comprising this invention as illustrated in the drawings comprises primarily a supporting frame 1, a key board 2, a platen 3, a type or printing unit 4, a cross totalizer 5, a plurality of computing totalizers 6, a plurality of balance totalizers 7, a selector mechanism 8, and a power driven mechanism 10 for operating the type unit, the several totalizers and the selector mechanism.

The key board 2 is substantially a standard typewriter key board and is fixed in relation to the frame 1. The platen 3 is of the flat bed type permitting the use of flat forms. Platen 3 is inclined to the vertical so that the matter being printed may be readily observed by the operator. The platen moves in its plane, which is substantially vertical, with respect to the key board for line spacing. Aside from the platen, the entire machine is power actuated by means of an electric motor concealed in housing 123. The motor continuously drives suitable reducing gears and friction slip clutches. Printing mechanism 4 and cross totalizer 5 constitute a single compact rotor unit which is adapted to slide along the rotor shaft 131 for letter spacing and for registering the master gear 360 of the calculator with the denominational orders of the totalizers 5 and 6. The rotor 154 carries movable type 159 for printing, and extensible gear teeth 366 for cooperating with the master gear 360. When in the printing zone the rotor is continually rotated in one direction. Selector mechanism is connected with the rotor to arrest the rotation in a preselected position corresponding with the key depressed, thus bringing the selected type into printing position. The accounting mechanism embraces the cross totalizer 5, a plurality of computing totalizers 6 and a plurality of balance totalizers 7. Computing totalizers 6 are fixed to the frame in definite spaced relationship with the balance totalizers 7, the latter being contained in a unit located at one side of the machine. Cross totalizer 5 is arranged to move into and out of registration with the various totalizers 6. When cross totalizer 5 is in registration with any one of said totalizers 6, the master gear operates both the totalizer 5 and the selected totalizer 6 simultaneously. A means is provided to hold the rotor 154 against rotation when cross totalizer 5 is in registration with any one of totalizers 6. Upon the depression of a numeral key, said means is released, permitting the rotor to move through a partial revolution when it is arrested by the selector mechanism. A second means is provided which is adapted to extend the gear teeth 366 into cooperative relation with the master gear 360 when totalizers 5 and 6 are in registration and when the rotor 154 is rotated. The cross totalizer 5 is adapted to perform operations either in addition or subtraction, thus permitting a combination of operations with the totalizers 6. Balance totalizers 7 are operated by secondary master gears 430 and 431 which are suitably connected with master gear 360 to operate in synchronism with said gear. Thus, in the accounting field, when the operator presses a numeral key, the rotor is first released, then the selector mechanism stops the rotor in a position to print the number selected while simultaneously entering the number into the cross totalizer 5, a selected computing totalizer 6, and a balance totalizer 7.

Supporting frame

The frame 1 comprises a base 12, right and left end brackets 13 and 14 respectively and an intermediate bracket 15 which is located between what may be designated as the summarizing zone comprising that portion of the upper part of the apparatus located between the brackets 14 and 15 and the printing and computing zone comprising that portion of the upper part of the apparatus located between the brackets 13 and 15. The brackets 13, 14 and 15 are secured to each other by means of an upper cross bar 16 and an angle tie rail 17 as shown more clearly in Figures 1A and 1B, 15 and 16. The upper cross bar 16 has the ends thereof mounted in suitable recesses provided in the respective end brackets 13 and 14 and is removably secured in place as by screws 18; see Figure 17. The tie rail 17 has the ends thereof removably secured to the respective brackets 13 and 14 as by screws 19. It will thus be seen that the length of the machine may be readily increased or diminished by providing cross members 16 and 17 of required length while the brackets 13 and 14 will remain the same for the various models of the machine.

Each of the end brackets 13 and 14 is provided with laterally disposed feet 20 arranged one adjacent either end thereof and at the lower side of the bracket. Each of these feet 20 is provided with a threaded aperture in which is screw threaded a post or bushing 21 as shown more clearly in Figure 17. Each of these posts or bushings 21 has the lower end thereof enlarged for engaging the adjacent portion of the base 12 and is secured to said base by means of a screw 22.

It will thus be seen that the end brackets 13 and 14, together with the mechanism carried thereby may be adjusted relative to the base 12 by screw threading the posts or bushings 21 to a greater or less degree into the feet 20 of the brackets. This adjustment of the brackets 13 and 14 not only affords a convenient means by which the brackets and mechanism carried thereby may be properly aligned, but also provides for the adjusting of the type unit 4 relative to the platen 3 for governing the degree of travel of the printing type relatively to the platen and sheets of paper carried thereby and also to obtain uniform printing throughout the distance of travel of the type unit as will hereinafter be more apparent.

The intermediate bracket 15 is shorter than the end brackets 13 and 14 and is removably secured to the upper cross bar 16 and to the tie rail 17 in any suitable manner as by screws 18 as illustrated in Figure 15. It will thus be seen that the length of the summarizing zone and the printing and computing zone may be altered as desired by adjusting the intermediate bracket 15 along the cross members 16 and 17.

As shown in Figures 2, 3 and 7, the base 12, in this instance, is of considerably greater width than the length of the brackets 13 and 14. The base 12 is preferably composed of sheet metal formed to provide a substantially flat bottom portion 25 which extends beneath the brackets 13, 14 and 15 and which is of slightly greater length than the cross members 16 and 17. The end portions of the bottom 25 are bent forwardly and then inwardly and rearwardly to form a housing chamber 26' across each end of the base 12.

A bracket 28 is secured to each end of the base 12 intermediate the longitudinal sides thereof for pivotally connecting the base to a suitable support and as illustrated more particularly in Figures 2 and 3, the base 12 and brackets 28 are adapted to be operatively connected with a suitable desk or table, a portion of the top of which is indicated at 29, Figure 2. The brackets 28 may be connected in any suitable manner with the desk or table and as illustrated more particularly in Figure 3, the desk is provided with a pair of inwardly extending members 30 secured in any suitable manner to the wall thereof while pivotal bolts 31 are mounted in the brackets 28 and to the members 30 in such a manner that the base 12 and the mechanism carried thereby may be rocked from an open tilted position as indicated in Figure 2 to a closed position with the bottom 25 of the base arranged in the horizontal plane of the top 29 and the brackets 13, 14 and 15 and the mechanism carried thereby depending from the base and located within the desk to be concealed thereby in a manner which will be readily understood. In order that the base 12 may be releasably maintained in the horizontal position, the adjacent ends of the desk top 29 and the base may be beveled or inclined as at 29' and 12' respectively.

The relation of the pivots 31 and the accounting machine mechanism carried thereby to the table top 29 is such that when the accounting machine is moved to the open or operative position, the bottom 25 of the base will engage the forward end 29' of the top 29 in such a manner as to maintain the base inclined at an angle of approximately 20 degrees to the vertical as illustrated in Figure 2. It is to be understood, however, that I do not wish to be limited to this exact angular position of the base 12 when in the open or operative position as this may vary considerably. But this angle of inclination is to be within such limits that the platen carried by the base 12 may be moved transversely or vertically of the base to produce the required line spacing, as will hereinafter more clearly appear, without causing said platen to interfere in any way with the operator while manipulating the keys of the key board.

Platen

It will be noted by referring to Figures 1A, 1B and 3 that the housings 26 formed at the ends of the base 12 are of different lengths, that is, the housing at the left hand side of the base extends inwardly to substantially the plane of the intermediate frame bracket 15 while the housing 26 at the other or right hand end of the base is a relatively narrow member. These housings 26 provide a transverse recess 33 in the front face of the base of nearly the same length as the printing and computing zone of the machine and in which is mounted the platen 3.

This platen 3 is comprised of a rectangular frame member 35 composed preferably of aluminum or a similar light weight material and which is provided in the front face thereof with a rectangular recess 36 in which is mounted in any suitable manner a pad 37 composed of vulcanized rubber or the like having a slight degree of resiliency for cooperating with the type for making the printed records.

To the rear face of the platen frame 35 is secured two or more track members 38 which extend transversally to the frame from one side thereof to the other. Mounted upon the base 12 in alignment with the tracks 38 are a plurality of bearing rollers 39, two of which are shown in Figure 7. These rollers may be spaced as desired transversely of the base and are each mounted as shown in Figure 9 in a rock arm 40 intermediate the ends thereof. Each of these rock arms is pivotally secured as at 41 to a bracket 42 which is secured by spot welding or the like to the bottom 25 of the base 12. The opposite end of each arm 40 is provided with an adjusting screw 43 screw threaded therein for rocking the arm about its pivot 41 and thereby bringing the bearing rollers 39 carried thereby into proper relation with the track 38 for a purpose which will presently be described.

The length of the platen frame 35 is somewhat less than that of the recess 33 in the base 12 and has secured to each end thereof a channel track member 45 as shown in Figure 7 which provides a track-way for a plurality of bearing rollers 46 which are arranged in spaced relation transversally of the base 12 adjacent the inner wall of a respective housing 26. These bearing rollers 46 are rotatably secured in any suitable manner to the adjacent portion of the housing 26 in position for rolling engagement with the rear frame of the respective track member 45. It will thus be seen that the bearing rollers 46 maintain the platen 3 against outward movement toward the front of the machine and the bearing rollers 39 are adjusted in the manner hereinbefore described by the manipulation of the screws 43 to bring the rollers 39 into such engagement with the respective tracks 38 as to firmly maintain the track members 45 in engagement with the bearing rollers 46 and at the same time permit free transfer movement of the frame 35 relative to the base 12.

The longitudinal position of the platen 3 relative to the base 12 is governed by a plurality of guide rollers 48 secured to the front face of the housing members 26 adjacent the inner edge thereof. These rollers 48 engage the longitudinal outer edge of the respective track members 45 as shown in Figure 7 and they are also adjustably mounted by means of an eccentric bushing 49 mounted upon the screws 50 for securing the rollers to the respective housings 26 as shown more particularly in Figure 10 for the purpose of positioning and maintaining the platen 3 in proper relation with the base 12 and the type unit 4.

It will thus be seen that the platen 3 is securely maintained in predetermined relation with the base 12 by the rollers 39, 46 and 48 and at the same time these rollers permit the ready movement of the platen transversely or vertically of the base and in order that the platen may be manually moved along the rollers, I have provided the upper longitudinal edge of the platen frame 35 with a plurality of spaced handles 52 which may be secured to said frame in any suitable manner. These handles 52 are utilized when it is desired to rapidly move the platen upwardly to bring the paper carried thereby into proper relation with the type unit 4 and when it is desired to move the platen upwardly to produce line spacing, this may be accomplished in the following manner:

A shaft 54 is disposed in a horizontal plane near the lower longitudinal edge of the base 12 with the ends thereof journaled in suitable brackets 55 secured to the forward face of the housing members 26 as shown in Figure 3. To this shaft is secured a pair of pinions 56, one adjacent either end thereof for engagement with a respective series of rack teeth 57 formed in this instance, on the forward longitudinal edge of each track member 45. A ratchet wheel 58 is secured to the shaft 54 in this instance, between the bracket 55 positioned at the left hand end of the shaft 54 and the adjacent pinion 56. A rock member 59 is rotatably mounted upon the shaft adjacent the ratchet wheel 58 and has pivotally secured thereto as at 60 a detent 61 which has one end thereof normally urged toward the ratchet wheel 58 for holding engagement therewith by a spring 62 as shown more clearly in Figure 8. The opposite end of the detent 61 is provided with a pin 63 which extends laterally therefrom into the path of movement of a link 64 which has one end pivoted as at 65 to the member 59 at the rear of the pivot 60. The other end of the link 64 is pivotally connected as at 66 to the outer end of a rock arm 67 which has the opposite end thereof secured to a stub shaft 68 journaled in the frame 69 for the key board 2. The inner end of the shaft 68 has secured thereto one end of the lever 70 of the line space key which is maintained in the normal position by a stop bar as 71 in the usual manner for typewriting machines.

The relation of the pin 63 to the link 64 is such that, when the spacing key is in its normal uppermost position, the pin will be engaged by the link for rocking the opposite end of the detent 61 out of engagement with the ratchet wheel 58 and when the spacing key is depressed the pin 63 will be released by the link due to the inner end of said link being carried upwardly by the rock member 59 as said member is rotated about the shaft 54 thereby permitting the detent to be moved by the action of the spring 62 into operative engagement with the ratchet wheel 58 for producing a limited rotation of the shaft 54 and pinions 56.

In order that the platen 3 may be maintained in the raised position when the spacing key 70 is in the normal raised position and the detent 61 out of engagement with the ratchet wheel 58, I have provided two pairs of holding pawls arranged, one pair at either end of the frame 35, the pawls as 72 and 73 of each pair are rotatably mounted upon a pin 74 having one end thereof mounted in a bracket 75 secured to the bottom 25 of the base 12 while the other end of the pin is mounted in the adjacent portion of a respective housing 26 as shown more clearly in Figure 7. The pawls 72 and 73 extend upwardly from the respective pivotal pin 74 for engagement with a respective rack member 76 or 77 provided on the rear face of the platen 3. The teeth of the racks 76 and 77 are preferably of the formation shown in Figure 8 and the teeth of one rack are spaced apart a greater distance than the teeth of the other rack depending upon the line spacing desired. For example, one of the racks as 76 has six teeth to the inch while the other rack 77 is provided with four teeth to the inch thereby providing for maintaining the platen when elevated by pressure on the spacing key 70 against downward movement and the line spacing of the platen whether there are to be six lines to the inch or four lines to the inch, depends upon which holding pawl is in the inoperative position.

The upper ends of these pawls are normally urged toward the respective racks by means of corresponding springs 78 as shown in Figure 8 and the pawls extend downwardly from the respective pivotal pin 74 a short distance to provide arms 72' and 73' respectively which are in engagement with a control shaft 79 which extends lengthwise of the base 12 and has the ends thereof journaled in suitable brackets 80 mounted one at either end of the base in a respective chamber 26' and which are secured to the bottom plate 25 of the base.

The control shaft 79 is provided with a pair of flattened cam surfaces 81 and 82 adjacent each pair of holding pawls. These cam surfaces are arranged in registration with a corresponding arm 72' or 73' and are in staggered relation with each other so that when one of the cam surfaces as 82 is in registration with the corresponding arm as 73' as in Figure 8, the pawl 73 will be permitted to be moved into holding engagement with the corresponding rack 77 by the spring 78 and when the shaft 79 is rocked to bring the other cam surface 81 into registration with the arm as 72', the corresponding pawl 72 will be permitted to be moved into operative engagement with the rack as 76 by its spring 78 while the other pawl 73 will be moved out of operative engagement with its rack. These cam surfaces 81 and 82 are preferably spaced slightly circumferentially from each other as illustrated in Figure 12 so that when the shaft 79 is moved to an intermediate position, both of the pawls associated therewith will be moved to the inoperative position and the platen 3 will then be free to move downwardly by gravity to its lowermost position.

This rocking movement of the shaft 79 is effected in this instance, by a lever 83 which as shown more clearly in Figures 3 and 11, is mounted in the chamber 26' at the left hand end of the machine with one end thereof pivotally connected as at 84 to the housing 26 and extends outwardly through an elongated slot 85 provided in the forward wall of the housing in position to be readily manipulated by the operator. A series of notches or recesses 85' is provided in one wall of the slot 85 adapted to be engaged by the lever 83 for maintaining said lever in the adjusted position. This lever 83 is connected to the shaft 79 by a link 86 pivotally connected to said lever intermediate the ends thereof and to a rock arm 87 secured to the shaft 79 as shown in Figure 11.

In order that one or more sheets of paper may be releasably secured to the platen 3, I have provided said platen with paper clips 89 positioned one at either end thereof and a plurality of paper clips 90 positioned in spaced relation along the upper longitudinal edge of the platen. The clips 89 are alike in construction and operation and each of these clips is in the form of an angle bar having one leg 91 thereof positioned in a recess provided in the inner face of the corresponding track member 45. The other leg of the bar extends inwardly a short distance across the adjacent end portion of the platen pad 37 as shown more clearly in Figure 7. The leg 91 of the clip is provided with a pair of longitudinally spaced lateral projections or guides 91' which are slidably mounted in suitable guide ways or recesses 92 provided in the track member 45 as shown more clearly in Figure 4. Each clip 89 is moved toward and from the platen by means of a control bar 93 which is slidably mounted for longitudinal movement between the leg 91 of the clip and the adjacent end face of the platen frame 35. The longitudinal movement of the bar 93 is limited by pins 94 secured to the platen frame 35 and which have one end thereof extending into an elongated slot 95 provided in the bar 93. The bar 93 is also provided with a pair of actuating pins 96 arranged in longitudinal spaced relation and which extend outwardly into cam slots 97 provided in the leg 91 of the clip so that as the bar is moved longitudinally, the corresponding clip 89 will be moved laterally toward and from the platen by the action of the pins 96 in the cam slots 97.

The control bar 93 may be manually moved longitudinally by any suitable means and as shown more particularly in Figures 4 and 5, the means for actuating the control bar comprises an operating lever 98 mounted in a slot 99 provided in the upper edge portion of the platen frame 35. This operating lever 98 is pivotally secured to the platen frame by a pin 100 positioned in slightly spaced relation to the inner end of the lever. The inner end of the lever is provided with a plurality of, in this instance, three rack teeth 101 arranged concentrically with the pin 100 and which are adapted to engage in a corresponding number of apertures 102 provided in longitudinal spaced relation at the upper end of the control bar.

The clips 90 are each angular in cross section having one leg thereof disposed adjacent the front face of the platen as shown in Figure 3, while the other leg as 90' extends rearwardly across the upper face of the platen between a pair of guide pins 104 mounted in the platen frame 35. The leg 90' of each clip is provided with a shoulder 90'' at each end thereof as shown in Figure 6. These shoulders are normally spaced rearwardly from pins 104 and are adapted to engage said pins for limiting the outward movement of the clip. Each clip 90 is manually moved toward and from the forward face of the platen by means of an operating lever 105 pivotally mounted upon a shouldered screw or stud 106 which extends downwardly through an elongated slot 107 provided in the leg 90' of the clip and is screw threaded in the platen frame 35. The lever 105 is positioned adjacent the outer face of the leg 90' and is provided with an eccentric cam 108 on the lower face thereof which is positioned in the slot 107 and is arranged eccentric to the pivot 106 so that by swinging the lever 105 about the pin 106 as an axis, the eccentric cam will produce a corresponding lateral movement of the clip for securing or releasing paper to or from the platen.

As shown more clearly in Figures 15 and 17, I have provided additional means for releasably securing the paper to the platen 3 which is mounted upon the supporting frame 1 and which comprises a pressure plate 110 which extends longitudinally of the frame throughout nearly the entire length of the platen 3. This plate has one end thereof secured to a rock shaft 111 which is journaled at its ends in the frame brackets 13 and 15. The plate extends upwardly from the shaft with the upper edge thereof adapted to contact with the paper a short distance below the plane of the printing station as will hereinafter more clearly appear. The shaft 111 is manually rocked by means of a lever 112 secured to the shaft adjacent the inner face of the right hand end bracket 13 as shown more clearly in Figure 15 and which is yieldingly urged rearwardly toward the platen by a coil spring 113 for pressing the plate 110 into engagement with the paper. The lever 112 extends outwardly from the shaft 111 to a position near the outer edge of the bracket 13 and has the outer end portion thereof provided with a detent 114 which is pivotally connected as at 115 to the lever, said detent being provided with a finger piece 114' by which the same may be rocked about the pivot 115 to bring the detent out of holding engagement with a pin 116 secured to the bracket 13, the relation of the pin 116 and the detent 114 being such that when said pin is operatively engaged by the detent, the pressure plate 110 will be maintained in the inoperative position out of engagement with the paper against the action of the spring 113.

Power drive mechanism

The power drive mechanism 10 as shown more clearly in Figures 13 and 14 comprises an electric motor 118, a train of speed reducing gears 119 and a pair of drive shafts 120 and 121. The motor 118 is mounted at the lower side of the supporting frame 1 between the frame brackets 14 and 15 and is secured to a bar 122 which in turn is secured at its ends to the brackets 14 and 15 as illustrated in Figure 14.

The motor as indicated in Figures 1 and 13, may be enclosed in a suitable case 123 secured to the brackets 14 and 15 in any suitable manner.

The armature shaft 124 of the motor extends through an aperture 125 provided in the bracket 14 and has a pinion 126 secured to the outer end thereof for driving the train of gears 119. The train of gears 119 is mounted in a recess 14' provided in the outer face of the bracket 15 and which may as shown be closed by a cover plate 127 secured by screws or other means to the bracket 14.

The train of gears 119 includes a relatively large diameter gear 729 mounted upon a stub shaft 730 and which is in meshing engagement with the pinion 126. The stub shaft 730 is journaled in any suitable manner in the bracket 14 and has secured thereto a pinion 731 which is in meshing engagement with a gear 732 of the same pitch diameter as the gear 729. The gear 732 is secured to one end of the drive shaft 121 and is in meshing engagement with a gear 733 of smaller pitch diameter than the gears 732 and 729 and is secured to one end of the drive shaft 120. The drive shafts 120 and 121 are journaled adjacent their outer ends in respective bearing members 128 which are preferably of the ball bearing type secured in any suitable manner in the bracket 14. The other ends of the shafts are journaled in similar bearing members 128 mounted in respective clutch housings 129 and 130 secured to the intermediate bracket 15. A rotor shaft 131 is arranged in co-axial relation with the drive shaft 120 and is journaled in bearings 128 positioned adjacent the ends thereof and secured in the frame brackets 13 and 15 as shown in Figure 14. The drive shaft 120 is maintained in driving relation with the rotor shaft 131 by a slip friction clutch mechanism 132 mounted in the housing 129.

The clutch 132 comprises a cup-shaped clutch element 133 secured to the adjacent end of the drive shaft 120. The other clutch element as 134 is splined to the shaft 131 to rotate therewith and at the same time is free to move axially along said shaft. The element 134 is provided with an outwardly extending circular flange or plate 134' adapted to extend into the recess in the cup-shaped element 133. A disc 135 composed preferably of cork is mounted in the cup-shaped element 133 between the bottom thereof and the flange 134', while a similar annular disc 136 is mounted upon the other element 134 adjacent the opposite side of the flange 134'. A nut 138 is screw threaded in the outer end of the element 133 for pressing the discs into engagement with the flange 134' and the bottom wall of the element 133, whereby motion from the shaft 120 and clutch element 133 is transmitted by friction through the disks 135 and 136 to the clutch element 134 and shaft 131. The degree of the friction thus produced may, of course, be readily controlled by screw threading the nut 134 into greater or less frictional contact with the disk 136.

A space and cam shaft 139 is arranged in co-axial relation with the drive shaft 121 and is journaled in ball bearings 128 arranged in the frame brackets 13 and 15. This shaft 139 is frictionally driven by the shaft 121 through the medium of a friction clutch 132 constructed in the same manner as the clutch 132 shown and described in connection with the shafts 120 and 131. The outer or right hand end of the shaft 139 terminates as shown in Figure 14 in the bearing 128 located in the bracket 13.

The rotor shaft 131 extends a short distance beyond the bearing 128 provided in the bracket 13 into a recess 13' provided in the outer face of said bracket and has secured thereto a gear 140 which, in turn, is in meshing engagement with a relatively large pitch diameter idler gear 141 mounted on a stub shaft 142 which is journaled in suitable bearings 128 mounted in the bracket 13 and in a cover plate 144 secured to the bracket 13 for closing the recess 13'. The gear 141 is in meshing engagement with a second gear 145 of the same pitch diameter as the gear 140 and which is secured to the outer end of a selector shaft 146 which is arranged in parallel spaced relation to the shafts 131 and 139 and journaled in suitable ball bearings 128 provided in the brackets 13 and 15 as shown in Figure 14.

It will thus be seen that the gear train 119 and drive shafts 120 and 121 are constantly driven by the motor 118 while motion from the shafts 120 and 121 is frictionally transmitted to the rotor shaft 131 and space and cam shaft 139 through the clutch members 132. Furthermore, it will be noted that motion is positively transmitted from the rotor shaft 131 through the gears 140, 141 and 145 to the selector shaft 146 so that whenever the rotor shaft 131 is rotated the shaft 146 will be rotated at the same speed as the rotor shaft and when the selector shaft 146 is held against rotation, that the rotor shaft 131 will also be maintained against rotation through the medium of the gears 145, 141 and 140 even though the shaft 120 is being rotated.

In addition to the drive just described for the shafts 131, 139 and 146, motion is constantly transmitted when the motor 118 is in operation from said motor to a back-spacing shaft 148 in the following manner:

The stub shaft 730 extends through the bracket 14 to the inner side thereof and has secured to its inner end a pinion gear 149 of the same pitch diameter as the pinion 731. This pinion 149 is in meshing engagement with a gear 150 secured to the shaft 148. The shaft 148 is arranged in parallel relation with the drive shafts 120 and 121 and has one end thereof journaled in a suitable bearing 151 mounted in the bracket 14 and the other end of said shaft is journaled in a bearing 128 mounted in the intermediate bracket 15 as illustrated in Figure 31.

*Type unit*

The type unit as illustrated more particularly in Figures 18, 19 and 20 comprises a rotor 154 slidably mounted upon the rotor shaft 131 and which is secured to the shaft by keys 155. The rotor is also journaled in a sectional housing 156 which rotatably receives the rotor shaft 131 therethrough and which is also supported by the space and cam shaft 139 which extends through the lower portion of the housing in rotary sliding relation therewith so that the housing and the rotor carried thereby are free to be moved axially along the shafts 131 and 139.

The rotor 154 is of slightly less diameter than twice the distance from the center of the shaft 131 to the platen 3 and is provided with a plurality of, in this instance forty-six, radially disposed type receiving slots 157 in one side face adjacent the periphery thereof. The outer sides of the slots 157 are covered by an annular cover plate 158 which is secured by screws or other means to the rotor to rotate therewith. The type 159, in this instance, comprises a rectangular body or bar portion 159' of any suitable cross sectional area and form and they are of substantially the same length as the slots 157 and each carries a raised type character on the outer end thereof. The inner ends of the type bars are in registration with a recess 154' provided in the rotor 154 adjacent the inner ends of the slots 157. Secured to each type bar is a pin 160 which extends laterally from the bar parallel with the shaft 131 through a slot 161 extending inwardly from the outer peripheral edge of the rotor in communication with a respective type slot 157. The outer end of the pins 160 are in engagement with a cam ring 162 which is fixedly secured in any suitable manner to the housing 156. The face 163 of the cam ring 162 engaged by the pins 160 is formed concentric with the shaft 131 and is continuous throughout the circumference thereof except adjacent the printing station as P where the ring is provided with a radial slot 163', as shown in Figure 20, which is located adjacent the platen 3 in the plane passing through the axis of the rotor shaft 131 normal to the adjacent face of said platen. The wall of the housing 156 adjacent the platen is cut away as at 156' to provide a passage for the paper between the housing and the platen.

It will thus be understood that the type are maintained in their normal innermost position during the rotation of the rotor and type except at the slot 163' where a cam member 165 engages the pins 160 to releasably maintain the type in their innermost position during the passage thereof past the printing station. This cam member 165 is mounted in a slot 162' provided in the periphery of the cam ring 162 adjacent the printing station and is in the form of an arm pivotally secured as at 166 to the adjacent portion of the cam ring 162. This cam member extends across the slot 163' and has an inner arcuate edge formed substantially concentric with the shaft 131 which normally lies in the plane of the circular face 163 of the cam. A spring 167 is positioned as shown in Figure 20 for yieldingly urging the cam to its inner operative position where it is maintained against the action of the spring by the engagement of the rear end 165' of the cam with the adjacent portion of the housing 156. The width of the slot 163' is substantially equal to the diameter of each pin 160 to serve as an aligning means for the type whereby a true direct impression of the type character is produced.

The outward movement of the type to effect printing is produced by a rock lever 169 mounted in the case 156 at the side of the rotor 154 adjacent the type slots 157. This lever 169 is pivoted as at 170 intermediate its ends to the housing 156 in a plane beneath the rotor 154. One arm 169' of the lever extends forwardly from the pivot 170 to a position over the space and cam shaft 139, while another arm as 169'' extends upwardly to a position adjacent the inner end of the type located at the printing station. The upper end of the arm 169'' is provided with a lateral extension which forms a pressure head 171 and which projects into the recess 154' of the rotor in alignment with the type at the printing station for engagement with the inner end of the type bar or body to slide the type outwardly.

The lever 169 is rocked about the pivot 170 to effect this outward movement of the type for printing purposes by means of a cam 173 mounted upon the space and cam shaft 139. The lever 169 may, if desired, be yieldingly urged about its pivot 170 in a direction to maintain the outer end of the arm 169' thereof in constant contact with the cam 173 by means of a coil spring 174 which has one end secured to the lever arm 169'' and the other end connected with a pin 175 secured to the adjacent portion of the housing 156.

The cam member 173, as shown more clearly in Figures 23 and 24, is preferably made integral with a spacing screw 178 although it is obvious that the cam and screw may comprise separate elements without departing from the spirit of the invention. The cam 173 and screw 178 are mounted in a recess 179 provided in the housing 156 and these members have a close operating fit between the end wall of the recess so as to permit the free rotary movement of the cam and screw and at the same time prevent the relative axial movement thereof and the housing 156 so that any axial movement of the screw will produce a corresponding axial movement of said housing and the rotor 154 mounted therein. The cam 173 and screw 178 are slidably mounted upon the shaft 139 for axial movement relative thereto, and these members are secured to the shaft by means of keys 180 whereby the screw and cam will rotate in unison with the shaft 139.

*Letter spacing and tabulating mechanism*

The spacing screw 178 is mounted in cooperative relation with rack teeth 182 provided on a tabulating bar 183 not only automatically to move the type unit 4 axially one letter space after the printing of each type, but for securely holding the type carrier against axial movement as the type is moved radially during the printing operation and for this purpose, the teeth of the screw extend circumferentially thereof in a plane substantially normal to the axis of the screw through a greater portion of their circumferential length or as indicated at 178', Figure 22, substantially 240°. The remaining portion of each screw thread is arranged at an angle to the axis of the screw and extends spirally of the screw from one end of a thread portion 178' to the adjacent end of the next thread portion 178' to form screw threads or cam portions 178'' adapted to effect the axial movement of the screw one tooth spacing during the engagement thereof with the rack teeth 182 on the bar 183 as the screw is rotated through an arc of substantially 120°.

The tabulation bar 183 extends longitudinally across the machine adjacent the forward face of the screw 178 and has each end thereof provided with a pendant arm 184 which is pivotally secured by a studded screw 185 or the like, to a bracket 186 which extends inwardly from the adjacent frame brackets 13 and 15 as illustrated more clearly in Figures 15, 16, 17 and 22. It will thus be seen that the tabulating bar 183 is adapted to be rocked about the pivots 185 toward and from the screw 178 for bringing the teeth 182 into and out of cooperative relation with the spacing screw 178 to effect the letter spacing of the type carrier after each printing operation or to permit the type carrier and the mechanism carried thereby to be tabulated axially along the supporting shafts 131 and 139 to bring the type unit into registration with different portions of the paper secured to the platen or to bring the rotor and the mechanism actuated thereby into cooperative relation with a predetermined computing totalizer 6 located in the printing and computing zone in a manner which will hereinafter be more fully described.

The tabulating bar 183 is maintained in its normal operative position in close proximity to the spacing screw 178 by a pair of cams 188 secured to a rock shaft 189 and positioned one in a respective cam recess 184' provided in each arm 184 as illustrated in Figures 16, 17 and 22. The bar 183 is angular in cross section and has one leg 183' thereof provided with the teeth 182 as illustrated in Figures 22 and 23. The other leg as 183" extends forwardly from the leg 183' and carries a plurality of tabulating arms 190 which are arranged in longitudinal spaced relation along the leg 183" in respective laterally disposed slots 191 formed in the upper surface of said leg. Each of these arms 190 is pivotally mounted adjacent one end upon a rod 192 which extends longitudinally of the bar leg 183" across the slots 191 and is mounted in longitudinally extending recesses 193 provided in the upper face of the leg 183" between the arm slots 191. The arms 190 are thus free to be rocked about the rod 192 as a pivot from a horizontal position within the respective slots 191 as illustrated in Figure 22 to an outer inoperative position as shown in Figure 16.

In order that the arms may be maintained in substantially a horizontal plane as illustrated in Figure 16 when in the inoperative position, I have provided the arms with a flat surface 190' at the pivoted end thereof adapted to engage the surface of the bar leg 183" adjacent the outer end of the respective slots 191. The opposite or free end of each arm 190 is provided with a laterally disposed projection which extends upwardly when the arm is in the operative position to form a stop shoulder 194. A stop 196 is fixedly secured to the housing 156 in any suitable manner and, as illustrated more clearly in Figures 21 and 22, this stop is a U-shaped member extending outwardly from the housing 156 in substantially a horizontal plane over the tabulating bar 183. The outer portion of the stop 196 is provided with a pendant shoulder 196' arranged in the transverse plane of the left hand end of the spacing screw 178. This shoulder 196' is positioned outwardly beyond the shoulders 194 when the arms 190 are in the slots 191 in position to be engaged by said stop shoulders 194 when the arms and the tabulating bar 183 are rocked to the outermost position as illustrated by broken lines in Figure 22.

It will now be observed that when the tabulating bar 183 is in the vertical position, the teeth 182 carried thereby are in position to be engaged by the spacing screw 178 for effecting letter spacing of the type carrier 4 and the shoulders 194 of the arms positioned in the slots 191 will be out of the path of movement of the pendant shoulder 196' on the stop 196. It will also be observed that when the tabulator bar 183 is rocked to its outermost position, the arms 190 positioned in the slots 191 will have the stop shoulders 194 carried thereby positioned in the path of movement of the shoulder 196" so as to be engaged by said shoulder for limiting further axial movement of the type unit 4 toward the right hand end of the machine.

The rocking movement of the tabulator bar 183 is produced manually through the medium of the shaft 189 and cams 188 by a slight pressure on one of the keys associated with the key board 2. This tabulating control key as 198 may, as shown in Figures 1, 1A and 27, be positioned at the right hand side of the key board 2. The lever as 199, see Figures 25, 26 and 27, of the tabulating key is journaled intermediate its ends upon a stud or screw 200 mounted in a bracket 201 secured to the inner side of the adjacent portion of the key board frame 69. The lever 199 also has an arm 202 extending upwardly from near the pivot 200 which has the upper end thereof pivotally connected by a pin and slot connection 203 to one end of a link 204 which has the other end thereof pivotally connected to the outer end of a rock arm 205 secured to the tabulating cam shaft 189 as shown more clearly in Figures 25 and 28. It will now be apparent that when the tabulating key 198 is pressed downwardly the arm 202 of said lever will be moved outwardly toward the key board which produces a corresponding movement of the rock arm 205 and the shaft 189 thereby operating the cams 188 carried by said shaft to effect the outward rocking movement of the tabulating bar 183. A spring 206 having one end secured to a cover plate 69' of the key board frame 69 and the other end secured to the transverse portion of a U-shaped arm 199' provided on the lever 199 adjacent the pivotal pin 200, operates yieldingly to return the key 198 and the cams 188 to their normal positions and thereby effect the return movement of the tabulating bar 183 to its normal upright position.

The U-shaped arm 199' of the lever 199 has the leg opposite said lever provided with an inwardly extending arm 207 which is pivotally connected by a pin and slot connection 208 to one end of a link 209 which has the other end thereof pivotally connected to one arm of a bell-crank lever 210. The bell crank lever is journaled upon a pinion 211 which in turn is secured to one end of a stud 212 journaled in the lower end of an arcuate arm 213. This arm 213 extends upwardly to a position above the selector shaft 146 and is pivotally mounted upon a shouldered screw 214 secured to the adjacent portion of the key board frame 69 in the vertical plane of the selector shaft 146. The opposite arm of the bell-crank lever 210 to that connected with the link 209 has rotatably mounted therein a pinion 215 which is in meshing engagement with the pinion 211 as shown in Figures 25 and 28.

The pinions 211 and 215 are for the purpose of connecting a drive mechanism for moving the type unit 4 and the mechanism carried thereby axially along the shafts 131 and 139 in either direction, with the selector shaft 146 which, as hereinbefore stated, is driven by the motor 118. For this latter purpose, I have provided in addition to the tabulating key 198 a rotor return key 217 which, as shown in Figures 1, 1A and 27, is positioned adjacent the tabulator key 198 on the key board. This return key 217 has the lever 218 thereof pivotally mounted upon the pin 200 adjacent the inner leg of the U-shaped arm 199' of the lever 199 as shown in Figures 26 and 27. The lever 218 has an arm 219 extending upwardly therefrom from a position adjacent the pivot 200 in the plane of the arm 202 for the lever 199. The upper end of the arm 219 has a pin and slot connection, similar to the pin and slot connection 203, with one end of a link 220 which is similar in construction to the link 204. The other end of the link 220 is pivotally connected to the rock arm 205 at the opposite side thereof to which the link 204 is connected as shown more clearly in Figure 28.

It will thus be seen that when the carrier return key 217 is depressed, the shaft 189 and cams 188 carried thereby are operated in the same manner as when the tabulating key 198 is depressed as hereinbefore described for effecting the rocking movement of the tabulating bar 183. The pin and slot connection 203 is such that the links 204 and 220 may be moved by the depression of their respective key without transmitting the motion thereof to the key not being depressed.

The lever 218, like the lever 199, is provided with a U-shaped arm 218' which is pivoted to the stud 200 and positioned within the U-shaped arm 199' as illustrated in Figures 26 and 27. This arm 218' has the leg thereof opposite the lever 218 and adjacent the lever 199 provided with a pendant arm 222 which has the outer or free end thereof connected by a pin and slot connection 223 to one end of a link 224 which has the other end thereof pivotally connected to the lower end of the arm 213; see Figures 25 and 27. The key 217 and lever 218 are yieldingly maintained in their normal position by means of a spring 226 secured to the arm 222 as shown in Figure 25 and to the cover member 69'.

The relation of the arm 222 and link 224 to the arm 213 is such that when the key 217 is in its normal uppermost position the pinions 211 and 215 carried by said arm and the bell-crank lever 210 will be maintained in the position illustrated in Figure 25 out of meshing engagement with a driven gear 228 which is rotatably mounted upon a shouldered screw 229 secured to a bracket 230 which, in turn, is mounted upon the adjacent portion of the tie rail 17; see Figures 25 and 27. It will now be uderstood that one or the other of the pinions 211 and 215 may be moved into meshing engagement with the gear 228 by the manipulation of one or the other of the keys 198 or 217 in the following manner:

Considering first that the tabulating key 198 is pressed downwardly, the arm 207 connected therewith will be rocked upwardly which will produce a rearward rocking movement of the arm of the bell-crank lever 210 carrying the pinion 215 through the medium of the link 209 and thereby bring the pinion 215 into meshing engagement with the gear 228. This rocking movement of the bell-crank lever about the stud 212 is due to the fact that the arm 213 is maintained against swinging movement by the arm 222 of the lever 218 and the spring 226 connected thereto. The pinion 215 will obviously remain in engagement with the gear 228 until the key 198 has been released when the spring 206 will effect the return movement of the pinion to its normal position out of engagement with said gear. Considering now that the return key 217 is depressed, it will be observed the arm 222 will be rocked rearwardly thereby effecting a rearward rocking movement of the arm 213 and the pinion 211 rotatably connected thereto until said pinion is brought into meshing engagement with the gear 228. As soon as the key 217 has been released, the pinion 211 will be returned to its normal inoperative position by the action of the spring 226 upon the arm 222.

Motion is transmitted to the pinion 211 and thence to the pinion 215 from the selector shaft 146 in the following manner:

It will be observed by referring more particularly to Figures 15 and 28 that the selector shaft 146 extends through the right hand side portion of the key board frame 69 and is journaled in a bearing member 128 mounted in a cylindrical extension 69" of the frame 69. Mounted upon the shaft 146 adjacent the bearing 128 so as to rotate with said shaft and the inner ball race of the bearing is a bushing 232 which is threaded externally. Screw threaded upon the bushing 232 is a nut 233 which extends inwardly beyond the inner end of the bushing, and is secured in a predetermined position by a lock nut 234.

Mounted upon the shaft 146 is a cam plate 235, while adjacent the cam plate 235 is a second cam plate 236 which has a pair of diametrically disposed outwardly extending cam faces 236' which when in the normal position are adapted to register in corresponding cam recesses 235' in the cam plate 235. These cam plates 235 and 236 are slidably and rotatably mounted upon the shaft 146 while the plate 235 is maintained against rotation by a stud 237 secured to the adjacent portion of the frame 69 and which registers in an elongated slot 238 provided in the lower edge of the plate 235 as shown in Figure 30. The other cam plate 236 is provided with a pair of ears 239 to which is pivotally connected one end of the link 240 which is also pivotally connected to the outer end of a rock arm 241 secured to the tabulating cam shaft 189 as shown in Figure 29.

Adjacent the outer face of the cam plate 236 is positioned a pinion 243 which is in meshing engagement with a gear 244 secured to the stud 212 journaled in the lower end of the arm 213. The pinion 243 is rotatably and slidably mounted upon the shaft 146 and the width of the face of the teeth thereof is somewhat greater than that of the teeth of the gear 244 so as to permit relative axial movement of the pinion and gear within certain limits. To the side face of the pinion 243 opposite the cam plate 236 is secured a clutch disc 245 which is adapted to frictionally engage a friction disc or plate 246 composed preferably of cork and which is mounted in an annular recess provided in one face of a clutch element 247 fixedly secured to the shaft 146 in any suitable manner so as to rotate therewith.

It will thus be seen that when the tabulating cam shaft 189 is rocked by the downward movement of either key 198 or 217 in the manner hereinbefore described, a similar rocking movement will be transmitted by the arm 241 and link 240 to the cam plate 236. This rocking movement of the cam plate 236 will, of course, be relative to the cam plate 235 due to the engagement of said latter cam plate with the stud 237. As the cam elements 236' are thus moved out of the corresponding cam recesses 235', the cam plates will be operated axially until the cam plate 235 engages the adjacent face of the nut 233 after which axial movement of the cam plate 236 will force the pinion 243 toward the clutch element 247 to bring the clutch plate 245 into frictional engagement with the disk 246 thereby causing the clutch element 247 to transmit motion from the shaft 146 to the pinion 243 and thence to the gear 244, stud 212 and the pinions 211 and 215. The drive through the friction clutch to the pinion 243 will be continued as long as the key actuating the shaft 189 remains in the depressed or lowered position. As soon, however, as the key is released and the shaft 189 is returned to its normal position by the action of either spring 206 or the spring 226, the clutch plate 236 will be returned to its normal position and thereby permit the clutch elements 245 and 246 to disengage as the cam elements 236' enter the cam slots 235'. The motion thus transmitted from the selector shaft 146 through the friction clutch to the pinions 211 and 215 will also produce a corresponding rotation of the gear 228 in one direction or the other depending upon which pinion is brought into meshing engagement therewith.

Motion thus produced upon the gear 228 is transmitted through a pair of beveled gears 249 to a belt drive wheel 250. One of the beveled gears 249 is connected in any suitable manner with the gear 228 to rotate therewith. The other beveled gear 249 is secured as illustrated in Figure 25 to the wheel 250 and is rotatably mounted with said wheel upon a shoulder stud 251 secured to the tie rail 17 and bracket 230.

The wheel 250 is provided on the periphery thereof with a plurality of teeth 250' adapted to engage in suitable apertures 253 provided in longitudinal spaced relation in an endless belt 254. This belt 254, as shown in Figure 15, extends upwardly from the right hand side of the drive wheel or drum 250 and thence over an idle pulley 255 which is rotatably secured as shown in Figure 25 to the bracket 230. The belt thence extends in substantially a horizontal plane to the right hand end bracket 13 and thence upwardly over a pulley 256 which is rotatably secured to the bracket 186. The belt then passes toward the left hand end of the machine in the horizontal plane of the lower end of an extension 258 formed on the type unit housing 156 as illustrated in Figure 15 and thence over a pulley 259 which may be rotatably supported in any suitable manner as upon a bracket similar to the bracket 186 which in turn is secured to the intermediate supporting frame bracket 15. The belt then passes from the pulleys 259 back to the drive wheel 250. The belt 254 is secured to the extension 258 of the housing 156 in any suitable manner as by one or more screws 260, so that as the drive wheel 250 is rotated in one direction or the other, the housing 156 will be moved in a corresponding direction by the belt 154.

Back spacing means

As previously stated, the type or printing unit 4 will be moved forwardly across the platen 3 one letter space upon each revolution of the shaft 139 and screw 178, and in order that said shaft and screw will make but one revolution at a time to produce step by step movement of the unit, I have provided the shaft 139 with means for automatically holding said shaft against being continuously rotated by the action of the drive shaft 121 through the medium of the corresponding slip friction clutch 132. This holding means comprises a catch plate 262 which, as shown more clearly in Figures 14, 31 and 32, is mounted within the clutch housing 130 adjacent the intermediate supporting frame bracket 15. This catch plate is secured to the hub of the clutch element 134 connected with the shaft 139 and which is extended axially for this purpose so as positively to rotate the catch plate 262 with said shaft. The catch plate 262 is provided with a peripheral ratchet tooth 262' (see Figure 32) adapted to be engaged by a detent 263 mounted upon a rock trip bar 264 which extends horizontally between the supporting frame brackets 13 and 15, in a plane beneath the space and cam shaft 139. The trip bar has the ends thereof journaled in the brackets 13 and 15 and the end of the trip bar journaled in the bracket 15 is extended through said bracket into the interior of the housing 130 for the reception of the detent 263 as illustrated in Figures 14 and 33.

The relation of the ratchet tooth 262' with the cam 173 and the angular or cam portion 178" of the spacing screw 178 is such that when the cam 173 has passed beyond the adjacent end of the lever 169 and the cam portions 178" of the spacing screw has passed a relatively short distance beyond the adjacent rack teeth 182, said ratchet tooth will be engaged by the detent 263 for maintaining the shaft 139 and the cam 173 and screw 178 against being rotated by the action of the drive shaft 121 and the motor 118.

In order that the printing unit 4 may be back letter spaced, I have provided a simple mechanism controlled by a key of the key board 2 for reversing the direction of rotation of the space and cam shaft 139 and, therefore, the spacing screw 178 secured thereto. This back-spacing control mechanism, as shown more clearly in Figures 14, 31, and 33 to 36 inclusive, comprises a jaw clutch 266 having one of the elements as 267 secured to the back-space shaft 148 while the other clutch element as 268 is rotatably mounted upon the shaft 148. The clutch element 268 is provided with a gear 269 made integral therewith or secured thereto and which has meshing engagement with a gear 270 secured to the hub of the clutch element 134 connected with the shaft 139 as shown in Figure 14. The width of the face of the teeth of the gear 269 is somewhat greater than that of the teeth of the gear 270 so as to permit the gear 269 to be moved axially with the clutch element 268 without disengaging the same from the teeth of the gear 270.

The clutch element 268 is moved axially into and out engagement with the clutch element 267, in this instance by means of a bell crank lever 271 which is pivotally connected as at 272 to a bracket 273 secured to the intermediate supporting frame bracket 15 below the housing 130 as shown in Figures 33 and 35. One arm of the bell crank lever 171 extends upwardly through an elongated slot in the housing 130 into an annular recess 274 provided in the clutch element 268. The other arm of the bell crank lever extends inwardly from the pivot 272 through an elongated slot provided in the bracket 15 and terminates in a recess 275 provided in the lever 276 of the back-space key 277; see Figures 1 and 1A. The lever 276 is pivotally mounted upon a horizontally disposed shaft 278 mounted in the frame 69 of the key board in a manner which will hereinafter be more fully described. The recess 275 is located at the rear of the pivot 278 so that when the back-space key 277 is depressed the arm of the bell crank lever 271 connected therewith will be moved upwardly and the other arm of said bell crank lever will effect axial movement of the clutch element 268 to move the same into clutching engagement with the other clutch element 267. A spring member 280 has one end thereof secured to the bracket 273 and the other end of the spring is formed with a cam 280' for frictionally engaging a pin 281 secured to the bell crank lever for yieldingly maintaining the lever in either of two positions as will be readily understood. The clutch element 268 is normally urged toward the de-clutching or inoperative position by a spring 282 secured to the inner end portion of the space key lever 276 as illustrated in Figure 33, and to the frame 69; see Figure 16.

In operation the depressing of the back-space key 277 will move the clutch element 268 into clutching engagement with the clutch element 267, thereby causing the gear 269 to be driven by the shaft 148 and thus transmit motion to the gear 270 for driving the shaft 139 in a direction reversed to that produced by the action of the shaft 121 through the slip friction clutch 132. This rotation of the gear 270 will, in turn, produce a corresponding rotation of the shaft 139 against the action of the drive shaft 121 and clutch discs 135 and 136. As the shaft 139 is thus rotated in a clockwise direction as viewed in Figures 32 and 33, the upper end of the detent 263 will ride upon the peripheral face of the catch plate 262. As the gear 270 approaches the end of a complete revolution, the clutch element 268 will be automatically moved out of clutching engagement with the element 267 by means of the engagement of a cam member 285 adjustably secured to the outer face of the gear 270 as shown more particularly in Figure 33 with the clutch element 268.

Key board

The key board 2 is of the conventional construction in that it comprises the usual typewriter character key tops 279 which are arranged in the conventional manner and are provided with respective levers which extend rearwardly therefrom in substantially a horizontal plane through the usual slotted guide or comb 286 and are pivotally mounted upon a pair of shafts 278 which are mounted in the usual manner in a supporting bracket 287, see Figure 16, secured to the hereinbefore mentioned key board frame 69. The key board frame 69 is substantially U-shaped in plan view and has one of the arms thereof secured to the intermediate supporting frame bracket 15 and the other arm secured to the tie rail 17 by any suitable means. The bracket 287 has the upper face thereof provided with transversally disposed recesses or slots 287' for the reception of the adjacent portion of the key levers as 288 therein. The key heads are arranged in four banks with the levers of two of the banks journaled on the rearwardly disposed shaft 278 and the levers of the other two banks of keys journaled on the forwardly disposed shaft 278. The hereinbefore mentioned stop bar 71 is arranged transversally of the frame 69 with the ends thereof secured in any suitable manner to the sides of said frame.

The key levers 288 are each yieldingly maintained in their normal uppermost position against the stop bar 71 by a hereinbefore mentioned spring 282 which has one end thereof connected with the respective lever rearwardly of the pivot 278 while the other end of the spring is secured to a plate 289 adjustably secured to the bracket 287 as illustrated in Figure 16 for governing the tension of each spring.

In order that only one of the character keys of the key board 2 may be manipulated at a time, I have provided a simple lockout mechanism whereby when one of the key levers is depressed, all of the other character key levers will be locked in their normal uppermost position. This lockout mechanism comprises a substantially vertically disposed bar 290 which extends transversally of the key board frame 69 in a plane beneath and slightly rearwardly of the stop bar 71 as shown in Figure 16. This lockout bar is pivoted as at 291 at either end thereof to the adjacent portion of the frame 69. The pivots 291 are arranged adjacent the lower edge of the bar 290 and said bar is maintained in a normal upright position against adjustable stops 292 mounted one at either end of the bar by one or more retracting springs 293 secured to the bar and to the bracket 287.

Each of the character key levers 288 is provided with a recess 295 which extends upwardly from the lower edge thereof in a plane over the lock bar 290. The recess 295 of each lever is provided with a restricted mouth portion 295' at the lower end thereof in registration with the upper edge of the bar 290 which is bent forwardly to form a cam edge 290' in alignment with the mouth 295' of each lever recess. The arrangement of the lever recess 295 and the lock bar 290 is such that when a given key is pressed downwardly the upper longitudinal edge of the lock bar will enter the recess 295 and in so doing the cam portion 290' of the bar will be engaged by the rear wall of the recess so that the bar will be rocked forwardly about the pivots 291 and thus bring the upper edge of said bar beneath the lower edge 288' of the remaining keys adjacent the mouth 295' of the recess in the path of movement thereof. The levers of the remaining keys are thus prevented from being moved downwardly until the lock bar 290 has been again returned to its normal upright position by the action of the spring 293 as said lock bar is released by the return of the depressed key to its normal uppermost position.

The key board 2 is also provided with the usual spacer bar 297 which extends across the frame 69 in parallel relation with the transverse portion thereof as illustrated in Figures 1, 1A and 16. This spacer bar is provided at either end thereof with a spacer bar lever 298. These levers 298 extend rearwardly from the spacer bar 297 beneath the stop bar 71 and are journaled intermediate their ends upon a horizontally disposed shaft 299 secured to the frame 69 in parallel relation with the shafts 278 in front thereof as shown in Figure 16. One of the space levers 298 extends a relatively short distance rearwardly from the shaft 299 as illustrated by broken lines in Figure 16 and has secured thereto one end of a retracting spring 282 which has the other end secured to the plate 289. The other lever 298 of the space bar 297 extends along the opposite or left hand side of the frame 69 and has the inner or rear portion thereof extended rearwardly from the shaft 299 and thence curved upwardly to a position at the rear of the selector shaft 146 in a manner and for a purpose hereinafter more fully described.

Selector mechanism

In order that the power drive mechanism 10 may be controlled by the action of the keys of the key board 2 for selectively operating the type 159 mounted in the rotor 154, I have provided the machine with a novel selector mechanism which, as shown in the drawings, is constructed and operated in the following manner:

Mounted upon that portion of the selector shaft 146 located within the key board frame 69, as indicated more particularly in Figures 15, 16, 33, 35 and 36, is a multiplicity of, in this instance 46 selector elements, one for each radial type receiving slot 157 provided in the rotor 154. These selector elements as 300 and 300' are, in this instance, as shown more particularly in Figures 16, 33, 35 and 64, in the form of segmental discs or plates arranged in longitudinal spaced relation along the selector shaft 146 in cooperative relation with a respective lever or levers of the key board 2 and they are secured in fixed relation to the selector shaft to positively move therewith.

The selector plates or discs 300 are preferably, as shown, formed with an intermediate portion thereof removed to provide for maximum lightness consistent with the required strength and are each provided with a substantially flat contact surface 301 which extends inwardly from the periphery thereof at the forward edge and at an obtuse angle to the remainder of said edge. The selector discs 300 are mounted on the shaft 146 with the contact edge 301 thereof arranged in substantially equal circumferential spaced relation, or in other words, the discs 300 are so mounted upon the shaft 146 that the forward contact surfaces 301 thereof will have a definite predetermined relation with a respective type receiving recess or slot 157 in the rotor 154 with which the discs are operatively connected through the medium of the gears 140, 141 and 145 as hereinbefore explained so as to move simultaneously therewith and at the same rate of speed. It will thus be seen that when the selector shaft 146 is held against rotation by means, presently described, engaging the contact surface 301 of a predetermined selector disc 300 at a predetermined position of the travel thereof, the rotation of the rotor 154 will be stopped and held against the action of the slip friction clutch 132 connected with the rotor shaft 131 with a corresponding type slot 157 located at a predetermined position in its course of travel, that is, at the printing station P in alignment with the type pin slot 163'.

The means for engaging the contact surface 301 of the selector elements 300 consists of a stop block 302 which, as shown more clearly in Figure 16, is mounted upon an upwardly curved portion 288' of the levers 288, or as shown in Figure 36, to a similarly upwardly curved portion 276' of the lever 276. The stop blocks are preferably individual hardened pieces removably secured to the respective levers whereby the same may be replaced, although these members may be formed integral with the levers. The selector discs 300 are all of substantially uniform size and construction. As shown in Figures 33 and 35, the selector disc 300' is similar in construction to the disc 300 with the exception that it has a relatively broad contact surface 301' adapted to be engaged by a plurality of, in this instance three, stop blocks 302 mounted upon a corresponding number of different key levers all of which function to produce a like positioning of the rotor 154 for a reason which will hereinafter be more fully explained. Each stop block 302 is preferably L-shaped and has one leg extended across the forward edge of the corresponding lever for engagement with the contact surface 301 of a respective selector element. The levers extend upwardly some distance beyond the stops and have the forward edge surface thereof curved and extended slightly beyond the forward end of the block for engagement with the peripheral edge of the corresponding selector in case the contact edge of said selector has immediately passed beyond the corresponding stop block when the lever is operated to bring the block into holding engagement with the selector element and thus prevent the stop block contacting with the peripheral edge of the selector element and the wearing of the block which would be incident thereto.

In order that the hereinbefore mentioned trip bar 264 may be actuated for moving the detent 263 out of holding engagement with the catch plate 262 as a selector element 300 is engaged and held by a key lever to permit the cam and space shaft 139 to be rotated by the drive shaft 121, the trip bar is provided with a pair of crank arms 305 which normally extend downwardly and forwardly therefrom and are arranged one adjacent a respective end of the series of selector elements 300 as shown in Figures 15 and 16. The forward or free ends of the arms terminate in a plane a short distance below and at the rear of that of the stop blocks 302 and have secured thereto a horizontally disposed tie or crank bar 306 which extends transversally of the key levers above and in the path of movement of rearwardly projecting shoulders or arms 307 provided on the levers so as to be engaged thereby as the inner or rear end portions of the levers are rocked upwardly for producing a sufficient rocking movement of the trip bar to move the detent 263 out of holding engagement with the ratchet tooth 262'.

All of the key levers having operative engagement with the discs are provided with the arms or shoulders 307 for actuating the trip bar 264 with the possible exception of the lever 276 for the back-space key 277 although this lever 276 may, if desired, be provided with means for actuating the trip bar. However, this is not necessary in the system shown herewith for the reason the trip bar, when back spacing, is rocked by the engagement of the peripheral surface of the catch plate 262 with the detent 263 inasmuch as said plate is rotated in a clockwise direction.

By referring more particularly to Figures 16 and 32, it will be observed that the arms 305 and tie bar 306 function constantly to urge the free end of the detent 263 toward the catch plate 262 and thus normally maintain the detent in contact therewith. However, in order that the trip bar 264 will be positively returned to its normal upright or vertical position at the end of each revolution of the catch plate when said plate is driven in the normal or counterclockwise direction, I have provided a cam plate 309 which is secured to the catch plate 262 in any suitable manner to rotate in unison therewith. The cam plate 309 is provided with an arcuate flange or cam element 309' arranged eccentrically with respect to the catch plate and in advance of the tooth 262' when the catch plate is rotated in the normal counter-clockwise direction. The detent 263 is provided with a lateral shoulder or extension 263' which is adapted to be engaged by the cam element 309' as said element approaches the end of a complete revolution and forced inwardly thereby so as to bring the upper or free end of the detent into the path of movement of the tooth 262' for stopping the rotation of the catch plate and the space and cam shaft 139 upon which said catch plate is mounted.

*Cross totalizer*

The cross totalizer 5 comprises a case 310 which, as shown in Figures 16, 40 and 47, has the rear side thereof open and comprises two end walls 311 and a front and bottom wall 312. The case 310 is operatively connected with the housing 156 by means of a pair of horizontally disposed guide pins or rods 313 and 314 slidably mounted in the end walls 311 of the case at the upper and lower sides thereof respectively as shown more clearly in Figures 40 and 47. The rods 313 and 314 are secured by any suitable means as by screw threads to forwardly projecting lugs or ears 315 provided on the housing 156 and which extend into the case 310 at the rear side thereof, said lugs being of considerably less width than the case as illustrated in Figure 47. The upper guide rod 313 is provided with an outwardly extending annular flange 313' intermediate its ends and which is positioned adjacent the left hand side of the upper housing lug 315. The rod extends outwardly from the flange 313' into a tubular housing 310' secured to or made integral with the case 310. This tubular housing 310' is of slightly greater interior diameter than the diameter of the rod 313 and has positioned therein a coil spring 316 which is mounted between the inner end of the housing and the head of a screw 317 which is secured to the outer end of the rod 313, said spring being tensioned to normally maintain the case 310 in contact with the flange 313' of the rod 313. A bumper 318 composed of leather, rubber or the like, may, as shown, be mounted upon the rod 313 adjacent the outer face of the flange 313', to be engaged by the adjacent wall of the case.

The lower supporting rod 314, as illustrated in Figure 47, also extends outwardly beyond the left hand end wall 311 of the case 310 a distance equal to or slightly greater than the distance between the right hand end wall 311 and the adjacent face of the ear 315.

Mounted within the case 310 is a plurality of register or digit wheels 320 and a corresponding number of auxiliary drive gears or holding members 321. The register wheels 320 may be of any required number and are rotatably mounted upon a stationary shaft 322 which extends horizontally through the case 310 and has the ends thereof secured in respective end walls 323 of a substantially U-shaped frame 324 mounted within the case 310 and which is pivotally secured to said case as by shouldered studs 325 and 326 secured to respective end walls 311 of the case 310 as shown in Figure 47. The studs 325 and 326 are located in a plane at the rear and below the shaft 322 as illustrated in Figure 40 so that when the frame is rocked about the studs as a pivot the register wheels 320 and shaft 322 will be moved forwardly or rearwardly to bring the wheels out of and into meshing engagement with a master gear 327 presently described.

The register wheels 320 are all of similar construction and, as shown more clearly in Figures 53, 54, 55 and 56, each of these wheels is of disc formation provided with ten teeth members 328, one for each numeral and the outer portion of the teeth is flattened as illustrated in Figure 54 so as to provide ample surface for the numeral character which may be engraved, printed, or otherwise applied thereto. One side face of each wheel as the right hand side, when viewed from the front of the machine, is provided with a circular recess 329 which has the peripheral wall thereof provided with ten semi-circular recesses or cam surfaces 329' arranged in radial alignment with a respective tooth 328. Mounted upon the shaft 322 and positioned within a corresponding recess 329 is a fixed cam plate 330 which is keyed or otherwise fixedly secured to the shaft 322. This cam plate 330 is of substantially less diameter than the recess 329 and is provided at one side thereof with an outwardly projecting cam surface 330' which is spaced from the extreme outer wall of the cam recess 329' a distance substantially equal to the distance the remaining portion of the cam is spaced from the peripheral wall of the recess 329 intermediate the cam recesses 329' thereby forming a cam track 331 between the wall of the recess 329 and the cam plate 330.

Each of the register wheels 320 is also provided with a laterally disposed segmental flange 332 which extends outwardly from the side face of the wheel opposite the recess 329 and extends into the recess 329 of the adjacent left hand wheel as shown in Figure 56. This flange is adapted to travel in the cam track 331 and is provided with a radially disposed slot 333 extending therethrough intermediate its ends. This slot is of substantially the same width as the cam track 331, that is, the distance between the major portion of the cam plate 330 and the peripheral wall of the recess 329. In the slot 333 is mounted a cam follower 334 in the form of a roller which is of substantially the same diameter as the width of the cam track 331 and the slot 333. The roller 334 is provided with an annular groove 334' in the periphery thereof intermediate its ends as shown more particularly in Figure 53. In this groove is mounted a tension spring 335 which has the ends thereof extending at opposite sides of the roller in a radial slot 332' provided in the inner face of the flange 332. The tension spring 335 is provided with a loop 335' adapted to engage the adjacent underlying portion of the roller 335 for maintaining the spring in contact with said roller during the rotation of the roller as it travels about the cam track 331.

The spring 335 is tensioned to normally maintain the roller in contact with the peripheral surface of the cam plate 330 and at the same time permit said roller to move outwardly relatively to the drive flange 332 as said roller passes over the cam surface 330' of the cam plate. The cam plates 330 are maintained in spaced relation in their respective recesses 329 by spacing collars 337 mounted upon the shaft 322 and upon which each of the register wheels is journaled as shown in Figure 53. The register wheels 320 are all of substantially the same width with the exception of the tenths wheel in the cents column which is of considerably greater width than the remaining wheels so as to provide for the usual spacing between the dollars and cents columns as illustrated more clearly in Figure 47.

In operation, any one of the register wheels 320 located at the left hand side of the units wheel in the cents column may be rotated in either direction, and the cam follower roller 334 will freely travel through the cam track 331 without transferring motion to the next adjacent register wheel located at the right hand side thereof until the roller approaches the cam surface 330' of the cam plate. As a roller 334 thus engages the cam surface 330' it will be moved outwardly by said cam surface against the action of the spring 335 into registration with an aligned cam recess 329' of the next adjacent wheel and thereby cause said next adjacent wheel to move in unison with the roller until said roller has passed beyond the cam surface 330' and again returned to its normal innermost position by the spring out of engagement with the cam recess 329'. The circumferential length of the cam portion 330' of the cam 330 relative to the distance between two adjacent cam recesses 329' is such that as the roller 334 passes over the cam surfaces 330' the register or digit wheel engaged by the roller will be moved substantially one tooth space regardless of which direction the roller is traveling.

Each of the register or digit wheels 320 is releasably maintained in such a position relative to the corresponding cam plate 330 that the two cam recesses 329' adjacent the cam surface 330' of the plate will be maintained in symmetrical relation with said cam surface. The mechanism for thus holding the register or digit wheels consists of the hereinbefore mentioned auxiliary drive or holding gears 321. These gears are rotatably mounted upon a supporting shaft 339 which extends horizontally through the case 310 in a plane below the shaft 322 and has the ends thereof secured in the end walls 323 of the frame 324 with the teeth thereof in meshing engagement with the teeth of the corresponding register wheel 320 as shown more clearly in Figure 40. A roller detent 340 is mounted upon a rock arm 341 which is pivotally mounted upon a shaft 342 carried by the frame 324. There are as many of these arms and rollers as there are auxiliary gears 321 and the rollers are yieldingly maintained in engagement with the teeth of the corresponding gear by springs 343.

The relation of each of the detent rollers 340 and teeth of each gear 321 to the teeth of the corresponding register wheel 320 is such that the register wheel will be maintained with one of the digit teeth 328 thereof in registration with an elongated sight slot 344 which extends longitudinally of the transverse wall 345 of the frame 324. The transverse wall 345 is positioned at the rear of a sight opening 312' provided in the front wall 312 of the case 310 as illustrated in Figure 40. The lower portion of the wall 345 may, as indicated in Figure 35, have the word "Add" stamped or printed thereon while the portion of said wall above the sight opening 344 may have the word "Subtract" printed or stamped thereon. The sight opening 312' in the case 310 is so related to the sight opening 344 that either the upper or the lower portion of said transverse wall will be in registration with the case sight opening 312', and inasmuch as the frame 324 is rocked from one position to another to cause the register or digit wheels 320 to add or subtract, it will be apparent that this manner of stamping the transverse wall of the frame will readily enable the operator to determine which position the mechanism is in.

The frame 324 is normally maintained in position to hold the register wheels 320 carried thereby in cooperative relation with the hereinbefore mentioned master gear 327 so as to be actuated thereby, when said gear is moved axially into engagement therewith, by means of a spring 347 and a stop member 348 secured to the front wall 312 of the case 310. In other words, the mechanism of the cross totalizer 5 is normally maintained in position for adding by the co-action of the spring 347 and stop 348, as illustrated in Figure 40, and when it is desired to have the totalizer function to produce subtraction, the frame 324 is rocked about the studs 325 and 326 as a pivot to bring the register wheels 320 out of cooperative alignment with the master gear 327 and the auxiliary drive gears 321 are moved into cooperative alignment with said master gear, as shown in Figure 44, so that as the master gear is moved axially, it will be brought into meshing engagement with a predetermined auxiliary gear 321 for producing a corresponding rotation of the register gear 320 in an opposite direction to that produced when the register gear is driven directly by the master gear.

In order that the frame 324 may thus be rocked about its pivots 325 and 326 against the action of the spring 347, I have provided the frame 324 with an extension 350 which projects upwardly from the right hand end wall 323 through a suitable slot 351 provided in the wall 312 of the case 310. The upper end portion of the extension 350 has a lateral projection 350' which extends a short distance across the upper face of the case 310 in spaced relation thereto, as shown more clearly in Figure 47, and which forms a lever adapted to cooperate with additional mechanism provided in connection with the calculators 6 for automatically rocking the frame in a manner which will hereinafter be more fully described.

The cross totalizer 5 is also provided with a pointer 352 secured by a screw or its equivalent to the upper positioned ear or lug 315 of the housing 156 and which extends upwardly through the wall 312 of the case 310 and thence forwardly into the sight opening 312' of said case with the forward end of the pointer arranged in alignment with the master gear 327 and terminating in slightly spaced relation to the digit tooth in registration with the sight opening 344 of the frame 324 as shown in Figures 1A and 40.

*Cross totalizer drive*

The means for actuating the cross totalizer register wheels 320 comprises the hereinbefore mentioned master gear 327 which is driven by a drive gear 360, both of which are mounted upon a flanged hub 361 and to which they are secured in any suitable manner as by rivets or screws as shown in Figure 21. The hub 361 is journaled in the housing 156 and has slidably extended therethrough a telescopical shaft 364 which will hereinafter be more fully explained and which has the outer section thereof keyed to the hub 361 so as to rotate in unison therewith, as shown in Figure 40.

The means for rotating the drive gear 360 and master gear 327 is mounted upon the hereinbefore mentioned rotor 154 and comprises a plurality of, in this instance 9, teeth 366 which are slidably mounted in corresponding radially disposed grooves or slots 367 formed in the inner face of a guide plate 368 which is secured by screws 368' or their equivalents, to the opposite face of the rotor 154 to that containing the type slots 157. The teeth 366 are arranged to have the same circular pitch as the teeth of the gear 360 and are each provided with a pin 369 which extends therethrough a relatively short distance from the inner end of the tooth. Each of these pins extends laterally beyond the tooth at each end with the inner end portion of the pin contacting with a cam surface 370 provided on the cam ring 162 as shown in Figures 19 and 40. The outer end portion of each pin 369 extends through an elongated slot 371 provided in the wall of the guide plate 368 in communication with the corresponding slot 367.

The cam surface 370 of the cam ring is arranged substantially concentric with the shaft 131 and in such spaced relation to the axis of said shaft as to maintain the teeth 366 in their innermost position throughout the greater portion of its circumferential length and is provided with an outwardly extending cam portion as indicated at 370', Figure 40, in the vicinity of the drive gear 360. This portion 370' of the cam is formed concentric with the shaft 131 for the teeth to have meshing engagement with the teeth of the gear 360 and terminates in a relatively abrupt inwardly extending cam portion 370" arranged in such relation to the teeth of the gear 360 that as said gear is moved one tooth space by the engagement of a sliding tooth 366 therewith, said sliding tooth will be moved inwardly by the portion 370"

to its innermost position out of engagement with the adjacent tooth of the gear 360.

The means for positively moving the teeth 366 outwardly as said teeth approach the gear 360 to the position permitted by the portion 370' of the cam surface 370, comprises a cam arm 373 which is arranged in substantially a vertical position between the rotor 154 and the housing 156 in the path of movement of the outer ends of the pins 369. This cam arm has the lower end thereof pivotally secured to the housing 156 by a shouldered stud or screw 374 in a plane beneath the rotor; see Figure 37. The upper end of the cam arm terminates in a plane a short distance above the portion 370' of the cam surface 370 as illustrated in Figures 37 and 40 and is provided with a downwardly extending cam groove 375 in the inner face thereof. The outer peripheral wall as 376 of the cam groove 375 is formed, as shown in Figures 40 and 43, with a curvature having a radius substantially equal to the radius of the cam surface 370.

The arm 373 is operatively maintained in such a position that the wall 376 is substantially coincident with the portion 370' of the cam surface 370 by means of a spring 377, and stop 379. This spring 377 is secured at one end to a pin 378 which, in turn, is secured to the adjacent portion of the housing 156. The stop 379 is provided at the upper end of a stop arm 380 which is secured by a pin and slot connection 381 to the adjacent wall of the housing 156. The arm 380 extends downwardly from the pivot 381 and has the lower end thereof connected by a pin and slot connection 382 to the lever 169 for actuating the type 159 as clearly illustrated in Figure 37. The stop arm 380 is maintained in its lowermost position as determined by the pin and slot connections 381 and 382 by a spring 383 connected at one end to the pin 378. The inner peripheral wall 376' of the cam groove 375 is formed to correspond to the cam portion 370' and 370'' of the cam surface 370. Thus, when cam arm 373 is in the position shown in Figures 37 and 43, the surface 376' will positively project the gear teeth 366 outwardly by means of pins 369 while the portion 370'' of the cam surface 370 will positively retract the teeth by means of pins 369 when the rotor is rotated.

In the upper portion of the housing 156 is a yoke member 385 which comprises a pair of arms 386 and 387 positioned one adjacent a respective side wall of the housing 156 and which is pivotally secured to the respective side wall by shouldered screws 388 or the like as illustrated in Figures 18, 19, 37 and 38. Each of the arms 386 and 387 extends forwardly from its respective pivot 388 and has the forward end portion thereof provided with an upwardly extending portion which extends outwardly through respective slots or apertures 389 provided in the peripheral wall of the housing 156, and are tied together by a transversely disposed bar 390. Substantially midway of the bar 390 between the arms 386 and 387 is rotatably secured a cam roller 391 which is adapted to engage a cam bar 392 provided on the rear side of the casing of the totalizers 6 in the manner hereinafter more fully described. The yoke 385 is yieldingly maintained in its uppermost position with the outer or free end portions of the arms 386 and 387 in engagement with the housing 156 by means of a spring 394 connected at one end to the housing 156 and at the other end to a pendant portion 387' of the arm 387 as illustrated more particularly in Figures 18 and 19.

To the forward or free end of the yoke arm 386 is pivotally secured as at 395, Figures 37, 38 and 39, the upper end of a cam link 396 which extends downwardly from the pivot 395 and has the lower end thereof connected by a pin and slot connection 397 to the cam arm 373 intermediate the ends thereof. The cam link 396 has a cam surface 396' intermediate its ends which when the yoke 385 is in its lowermost position, as illustrated in Figure 38, is positioned in the path of movement of a reset pin 398 secured to the rotor 154 in substantially radial alignment with the first drive tooth 366 and which, in this instance, is formed by extending one of the screws 368' for securing the guide plate 368 to the rotor outwardly for engaging said cam face of the link 396. It will be noted by referring to Figure 37 that the drive teeth 366 are arranged in consecutive relation at one side of the rotor 154 and in order that the rotor may operate smoothly and with a minimum amount of vibratory movement, the rotor may as indicated, be provided with a suitable counter weight 399 arranged at the diametrically opposite side thereof to that of the teeth 366 and guide plate 368.

As illustrated in Figure 18, the arm 387 of the yoke 385 is provided at its forward or free end with a pendant portion 387'' which has the lower end thereof in engagement with the upper end of a substantially vertically disposed rock arm 400 pivotally secured as at 401 intermediate its ends to the adjacent side wall of the housing 156. The lower end of the arm 400 terminates adjacent the trip bar 264 in slightly rearward spaced relation thereto when the bar is maintained in its normal vertical or upright position by the yoke 385. The upper end of the arm 400 is yieldingly maintained in engagement with the pendant portion 387'' of the arm 387 by a spring 402 secured at one end to the arm 400 above the pivot 401 and at its other end to the pin 175.

The rock arm 400 is provided with a rearwardly extending stop shoulder 403 near the upper end thereof which is adapted to engage the forward face of a stop block 404 secured to or made integral with the rotor 154 when the arm is released by the yoke 385. The forward edge of the stop block 404 is arranged diametrically opposite one of the type slots 157 which, in this instance, is a blank slot designated 157' in that there is no type element mounted therein and the stop shoulder 403 is so positioned relative to the block 404 that when the rotor is maintained against rotation by the engagement of the block 404 with the shoulder 403 the blank type slot 157' will be positioned at the printing station in registration with the aligning slot 163'. When the upper end of the rock arm 400 is permitted to move inwardly by the downward movement of the yoke 385, the lower end of the rock arm will move into close proximity to the trip bar 264 so that as the trip bar is actuated by one of the key levers as 288 in the manner hereinbefore described, said trip bar will rock the arm 400 to move the shoulder 403 out of holding engagement with the block 404 and thereby effect the release of the rotor 154.

Furthermore, the relation of the drive teeth 366 with the stop block 404 and the blank type slot 157' is such that the first tooth, when considered in the direction of rotation of the rotor, is spaced one tooth space at the rear of the plane passing diametrically through the rotor shaft 131 in line with the forward end of the block 404, and said blank slot and, therefore, the position of the rotor and the gear teeth shown in Figures 37 and 40 do not correspond to the position of the rotor illustrated in Figure 18, but the rotor and therefore the gear teeth, are illustrated in Figures 37 and 40 as being advanced two gear teeth spaces from that of the position of the rotor shown in Figure 18 for the purpose of illustrating the action of the cam surface 370 upon the gear teeth and the effect thus produced upon the drive gear 360 and the master gear 327 for the various totalizers.

In operation the drive mechanism for operating the master gear 327 is simultaneously operated with the printing of a predetermined numeral and said printing of the numeral and the recording thereof on one or more totalizers is controlled by the manipulation of the key of that numeral mounted in the key board 2 in the following manner:

This apparatus is so designed that the cross totalizer 5 and the master gear 327 is operated only when the carrier 4 is in cooperative relation with one of the computing totalizers 6 in which case the yoke 385 will be maintained in the depressed position by the action of the corresponding cam bar 392 upon the roller 391 connected with said yoke. As the yoke 385 is thus depressed, the cam link 396 is free to move downwardly with the yoke due to the pin and slot connection 397 of the link with the cam arm 373. In other words, the yoke 385, cam link 396, cam arm 373 and the stop arm 380 will be approximately in the position illustrated in the Figure 37 although at a less advanced position wherein the cam groove 375 of the cam arm 373 is in position to receive the pins 369 of the teeth 366 as they move toward the upper end of said cam arm and to positively move the pins and the teeth connected therewith outwardly. Also, as the yoke 385 is moved downwardly by a cam bar 392, the upper end of the rock arm 400 is permitted to be moved by the spring 402 rearwardly to bring the stop shoulder 403 into the path of movement of the stop block 404 secured to the motor 154 with the result that the rotor 154 will be held against rotation as the block 404 engages the shoulder 403 with the blank slot 157' maintained at the printing station.

It will thus be observed that the positioning of the rotor 154 and the cam link 396 just described, is automatically effected by the engagement of the yoke 385 with a cam bar 392, as the carrier 4 is moved axially into operative relation with one of the computing totalizers 6. If now the cipher key is pressed downwardly, the corresponding selector element 300 will be engaged by the stop block 302 on the lever of said key, and maintained against further rotary movement, thereby stopping the rotor shaft 131 through the medium of the gears 145, 141 and 140. Simultaneously with the engagement of the key lever with the selector element, the trip bar 264 will be actuated by the key lever for rocking the arm 400 out of engagement with the stop block 404 and also for bringing the detent 263 out of holding engagement with the catch plate 262 on the space and cam shaft 139 to permit the rotation of the cam 173 and spacing screw 178.

The relation of the selector element 300 engaged by the cipher key to the type slots 157 in the rotor is such that when the rotor is thereby maintained against rotation, the cipher type, that is the type having the cipher character thereon, will be maintained at the printing station in alignment with the pressure head 171 of the lever 169. When the cipher type is thus positioned at the printing station, the first sliding tooth 366 will be maintained one tooth space at the rear of the tooth of the drive gear 360, which would normally be engaged thereby, or in other words, the first tooth would be maintained in the position of the third tooth from the bottom as illustrated in Figure 40. Now as the lever 169 is actuated by the cam 173 for impressing the cipher type against the paper carried by the platen, the upward movement of the arm 169' of said lever thus produced by the cam, will be sufficient to move the stop 379 of the stop arm 380 above the upper end of the cam arm 373 and thereby permit the upper end of said arm to be moved inwardly by the action of the spring 377 into engagement with a stop 406, as illustrated in Figure 38, secured to the housing 156 in which position the rear peripheral wall 376 of the cam groove 375 will be maintained co-incident with the cam surface 370 of the cam ring 162 as illustrated by broken lines in Figure 43.

It will now be understood that with the cam arm 373 thus moved to its innermost position, as the rotor 154 is again rotated by the power drive mechanism 10 upon being released by the disengagement of the cipher key lever with the corresponding selector element 300 as effected by the return of the trip bar 264 to its normal position due to the action of the cam 309 upon the detent 263, the teeth 366 will be maintained in their innermost position as they pass the drive gear 360 and, therefore, the drive gear 360 and the master gear 327 connected therewith will not be actuated by the teeth 366 during the printing of the cipher digit. As the upper end of the cam arm 373 is moved inwardly by the spring 377 from the position shown in Figure 37 to that shown in Figure 38, the lower end of the cam link 396 will be rocked rearwardly or inwardly thereby bringing the cam surface 396' into the path of movement of the reset pin 398 so that as said pin engages the cam link as the rotor 154 resumes rotation, the lower end of the cam link will be rocked outwardly or forwardly thereby carrying the upper end of the cam arm 373 outwardly from beneath the stop shoulder 379. As the upper end of the arm 373 thus passes beyond the shoulder 379, said shoulder will again be brought downwardly to its lowermost position by the action of the spring 383 upon the arm 380. As the reset pin 398 passes beyond the cam surface 396' of the link 396, said link and cam arm 373 will be released by the pin and be permitted to be moved inwardly a slight distance by the spring 377 until the upper end of the cam arm again engages the stop shoulder 379 and the arm will be held in the operating position as indicated in Figure 37.

If, on the other hand, any one of the other digit keys from 1 to 9 inclusive, is operated, the action of the rotor 154 and the cam arm 373 together with the associated members will be substantially the same as that just described when the cipher key is pressed downwardly with the exception that the rotor will, of course, have a correspondingly greater movement from the at rest position as determined by the engagement of the stop block 404 with the shoulder 403 and this will result in a greater or less number of teeth 366 being brought into engagement with the teeth of the drive gear 360 before the rotor is maintained against rotation with the corresponding digit type in registration with the printing station.

It will thus be seen that if, for instance, the number 2 digit key is operated, the first result will be the positioning of the stop block carried by the corresponding key lever in the path of movement of one of the selector elements and at the same time, the rotor will be released by the engagement of the trip bar 264 with the rock arm 400. The rotation of the rotor after it has thus been released until it is again stopped by the engagement of one of the selector elements with the corresponding stop block on the key lever will be sufficient to bring the first and second drive teeth 366 into meshing engagement with the teeth of the drive gear 360 and produce a corresponding rotation of the drive gear 360 and the master gear 327 connected therewith which will transmit sufficient motion to the particular register wheel 320 in the totalizer with which the master gear is in operative engagement to rotate said register wheel two digit places and produce a corresponding addition or subtraction calculation depending upon the position of the frame 324.

Computing totalizers

Each of the computing totalizers 6 is movably mounted upon the cross bar 16 and for this purpose, said cross bar has the lower side thereof provided with a dove tail track 408, as shown more clearly in Figure 40, which extends longitudinally thereof from adjacent the bracket 15 to within a short distance of the end bracket 13 of the supporting frame 1. Each of the totalizers 6 comprises a sectional case 409 which has the upper wall thereof provided with a recess 410 undercut at the front side to receive the track 408 therein. A clamp block 411 is secured to the rear side of the case 409 as by one or more bolts 412 for frictional engagement with the rear side of the track 408 for clamping the case 409 to the cross bar 16. In order that the totalizers 6 may be releasably secured to the cross bar against accidental longitudinal movement thereof, the lower face of the track 408 is provided with a multiplicity of segmental recesses 413, while the case 9 is provided with, in this instance, two teeth members or pins 414 arranged in longitudinal spaced relation and adapted to engage in respective recesses 413 as shown in Figures 40 and 41.

When it is desired to adjust a computing totalizer 6 along the cross bar, the clamp 411 is released by screwing the bolt 412 outwardly sufficiently to permit the case 409 to be swung forwardly to clear the teeth members 414 from the respective recesses 413, and after the totalizer has been adjusted, it may be again secured to the cross bar by tightening the screws 412.

Each of the computing totalizers 6 is provided with a plurality of register wheels 320 constructed in the manner previously described for the register wheels 320 in the cross totalizer 5. As illustrated in Figures 53, 54, 55 and 56, these register wheels 320 are rotatably mounted upon the spacing sleeves 337 secured to the fixed shaft 322 which, in this instance, has the ends thereof secured in the case 409 for supporting the register wheels in operative relation with a sight opening 417 provided in the case 409. The shaft 322 of each computing totalizer 6 is arranged in a horizontal plane above the telescopical shaft 364 and is spaced above said shaft a distance adapted to maintain the register wheels 320 in cooperative alignment with the master gear 327 so that by moving the type unit 4 axially along the rotor shaft 331 and space and cam shaft 139, the master gear may be brought into operative engagement with any one of the register wheels of a selected computing totalizer 6.

A holding gear 415 similar to the auxiliary drive gear 321 is rotatably mounted upon a shaft 416 which extends horizontally through the case 409 in a plane slightly above the shaft 322 and at the rear thereof. There are as many of the holding gears 415 as there are register wheels 320 and each of these gears is in meshing engagement with a corresponding register wheel. A roller detent 340 mounted upon a rock arm 341 is pivotally mounted upon a transverse shaft or rod 342 extended horizontally through the case 409 with the ends thereof secured to said case. The roller detent 340, arm 341, and shaft or rod 342 correspond in construction and operation to the corresponding members in the cross totalizer 5 and they are yieldingly maintained in engagement with the holding gears 415 by springs 343.

To the rear of the case 409 is secured the hereinbefore mentioned cam bar 392 by screws 418 or their equivalent. This cam bar has the central portion of the lower surface thereof arranged below the normal path of movement of the rollers 319 secured to the yoke 385. While each end of said bar is provided with an upwardly extending cam surface adapted to be engaged by a respective roller 391 for depressing said roller and the yoke connected therewith downwardly as the master gear 327 is brought into operative relation with the register wheels 320 of the computing totalizer 6. As shown in Figure 40, the housing 156 is provided with a supporting roller 420 which is rotatably secured thereto in position to engage a lower surface of the case 409 so as to assist in supporting said case during the operation of the register wheels 320 and roller detent 340 associated therewith as the same are manipulated by the master gear 327.

Inasmuch as the gear 360 and the master gear 327 are always driven in one direction, that is in the counter-clockwise direction as indicated by the arrow X, Figure 40, through the medium of the drive teeth 366, the register wheels 320 of each totalizer 6 will always be driven in a clockwise direction as indicated by the arrow Y and, therefore, these totalizers always produce calculations in addition.

In order that the cross totalizer 5 may be automatically adjusted as the master gear 327 is brought into operative engagement with one of the computing totalizers 6 so that said cross totalizer 5 and possibly other totalizers as the balance totalizers 7, may perform calculations in subtraction simultaneously with the calculations in addition, by the computing totalizers 6 as hereinbefore hinted, each case 409 of the computing totalizers 6 is extended forwardly a short distance beyond the register wheels 320 in slightly spaced relation above the horizontal plane of the upper face of the cross totalizer case 310 as at 409', Figures 40, 44, 45 and 47.

In the extension 409' is provided a pair of horizontally disposed grooves 421 arranged in each end wall thereof, at the rear of and in a plane below the upper end of the extension 350 of the rock frame 324 in the cross totalizer 5. The grooves 421 are for the purpose of receiving therein a subtractor plate 423 which, in this instance, comprises a substantially triangular portion 423' and a rearwardly extending portion 423'' connected with the base of the triangular portion and which is of less thickness than the triangular portion for entering the groove 421. The vase of the triangular portion extends laterally beyond the reduced portion 423' and is adapted to engage the forward face of the side walls of the case extension 409' to limit the inward movement of the plate. The apex of the triangular portion 423' is adapted, when the plate is mounted in a computing totalizer 6, to extend into the path of movement of the extension 350 of the frame 324 so that said extension will engage one or the other of the inclined walls of the triangular portion of the plate, as the type unit 4 and cross totalizer 5 approach the respective computing totalizer 6 from either direction until the lateral projection 350' of the extension engages the apex of the plate as illustrated in Figures 44 and 46 when the frame 324 will be rocked sufficiently to bring the register wheels 320 carried thereby out of cooperative alignment with the master gear 327 and the auxiliary drive gears 321 will be brought into cooperative alignment with said master gear in the manner hereinbefore described.

When it is desired to cause the cross totalizer 5 to subtract, all that is necessary is for the operator to insert one of the subtraction plates 423 into the grooves 421 of the particular computing totalizer 6 by which the calculation is to be performed, and as the type unit 4 is brought into cooperative relation with this totalizer 6, the cross totalizer 5 will be automatically adjusted for subtraction and will remain in the subtraction position until the type unit 4 and cross totalizer 5 have passed beyond the respective totalizer 6 after which the frame 324 will be returned by the action of the spring 347 to its normal position with the register wheels 320 carried thereby in cooperative alignment with the master gear 327 as when adding.

As the type unit 4 and cross totalizer 5 approach any one of the computing totalizers 6, the case 310 of the cross totalizer 5 will be maintained against further axial movement simultaneously with the alignment of the master gear 327 with the first register wheel 320 positioned at the left hand side of the totalizer 6 as shown in Figure 21, by means of a stop 425 formed on the case 310 by pressing a portion thereof upwardly as illustrated in Figure 48 and which comes into engagement with a spring actuated latch 426 mounted in a vertical position in each totalizer case 409 at the right hand side thereof. As the case 310 is thus temporarily maintained against further axial movement, the housing 156 and the master wheel 327 carried thereby are free to move forwardly and the spring 316 will be compressed as the rods 313 and 314 are moved relative to the cross totalizer case 310. The case 310 and the register wheels 320 carried thereby will thus remain stationary while the master gear 327 is successively brought into cooperative relation with each of the register wheels 320 of the cross totalizer 5 or until the master gear has been brought into operative engagement with the units register wheel in the cents column.

As the type unit 4 is caused to move axially toward the right hand side of the machine out of cooperative relation with the totalizer, a pawl 427 carried by the housing 156 engages the latch 426 and raises it against the action of the spring as 428 out of the path of movement of the stop 425, thereby releasing the case 310 and permitting the case and the mechanism carried thereby to be returned to their normal position relative to the housing 156 by the action of the spring 316 which forces the case 310 axially along the rods 313 and 314 until the case again abuts against the bumper 318 after which the cross totalizer 5 may move in the normal manner in unison with the type unit 4.

Balance totalizers

The balance totalizers 7 located at the left hand side of the machine between the intermediate bracket 15 and the left hand end bracket 14 of the supporting frame 1 are constructed and operated similarly to the cross totalizer 5 and computing totalizer 6 described above. These totalizers 7 are substantially identical in construction and each comprises, as shown more clearly in Figures 21 and 49, a secondary master gear 430 or 431 mounted upon the hereinbefore mentioned telescopical shaft 364 in a manner presently described. Each totalizer 7 also comprises a plurality of register wheels 320 constructed and operated in the manner hereinbefore described for the register wheels in the cross totalizer 5 and computing totalizers 6. These wheels are journaled upon spacing sleeves 337 secured to a register wheel shaft 322 mounted in a rock frame 432. This rock frame 432 is common to all of the balance totalizer units provided in the left hand portion of the machine and has the outer end walls 433 thereof pivotally connected as at 434 to the case 435 for the totalizers 7.

This case 435 is movably mounted upon the cross bar 16 which has the lower side thereof provided with a dove tail track 408' between the brackets 14 and 15 and which is constructed similarly to the track 408 previously described. The case 435 has the upper end thereof provided with a recess 436 adapted to receive the track 408' therein and is clamped to said track by means of a clamp block 437 secured to the case by bolts 438 for clamping engagement with the adjacent wall of the track 408' as illustrated in Figure 49. This structure provides for the ready adjustment of the case 413 and the mechanism carried thereby along the cross bar 16 a limited distance for accurately positioning the register wheels 320 relative to the corresponding secondary master gear 430 or 431. The side walls 433 of the frame 432 are connected at their forward portions by a transverse wall 437 which is arranged beneath a sight opening 439 provided in the front wall of the case 435. The transverse wall 438 of the frame 432 is provided with a plurality of sight openings 440 of less width than the sight openings 439 and are arranged at the rear of said latter openings as shown in Figure 49. The register wheel shafts 322 arranged adjacent each end of the frame 432 have the outer ends thereof secured in the end walls 433 of the frame, while the inner ends of these shafts and the shafts 322 of the intermediate units are secured in respective intermediate walls 433' which are secured to the transverse wall 437 of the frame as illustrated more clearly in Figure 21.

An intermediate portion of the rock frame 432 may, as shown in Figure 21, be supported from the upper portion of the case 435 by a bracket 442 secured to said case and which extends downwardly between two adjacent intermediate walls 433' and is pivotally secured thereto by any suitable means as a stud or pin 434' arranged in co-axial alignment with the pivots 434. The walls 433 and 433' of the frame 432 are constructed alike and each pair has secured thereto a supporting shaft 339 similar to the shaft 339 shown and described in connection with the cross totalizer. Upon each of the shafts 339 is rotatably mounted a plurality of auxiliary drive and holding gears 321, one for each of the register wheels 320. These auxiliary drive and holding gears 321 are in permanent meshing engagement with a corresponding register wheel and are adapted when the frame 432 is rocked about its pivots 334 and 334' to have meshing engagement with the secondary master gears 430 and 431 so as to produce rotation of the wheels in the opposite direction from that when the wheels are in direct meshing engagement with the secondary master gears. The rock frame 432 is yieldingly maintained in its normal position with the register wheels 320 in operative alignment with the secondary master gears 430 and 431 by means of a stop 444 secured to the rear wall of the frame 432 in the path of movement of the rear end of one or more of the walls 433' and one or more springs 445 connected at one end to the upper portion of the case 435 and at the other end to one of the intermediate walls 433' as illustrated in Figure 49.

A roller detent 340 mounted upon an arm 341 which is journaled upon a shaft or rod 342 secured to each pair of end walls, is yieldingly maintained in engagement with each auxiliary drive and holding gear 321 by the spring 343 connected at one end with the arm 341 and at the other end with a pin or rod 343' which extends between and is secured to a respective pair of end walls.

It will now be observed that the register wheels 320 are yieldingly maintained with one of the teeth 328 thereof in registration with the sight opening 440 provided in the corresponding portion of the wall 437 by means of the auxiliary holding gears 321 and the roller detent 340. While the frame 432 is normally maintained in engagement with the stop 444 by the spring 445 with the register wheels 320 in cooperative alignment with the secondary master gears 430 and 431. The frame 432 is automatically rocked about its pivots 434 and 434' to bring the register wheels 320 out of cooperative alignment with the secondary master gears and to bring the auxiliary drive gears 321 into cooperative alignment with said secondary master gears substantially simultaneously with the moving of the frame 324 associated with the cross totalizer 5 to bring the auxiliary drive gear 321 connected therewith into cooperative alignment with the master gear 327 in the following manner:

A rock shaft 447 is extended from the intermediate supporting frame bracket 15 inwardly through the adjacent portion of the printing and computing zone and has the inner end portion thereof slidably mounted in the extension 409' of each totalizer case 409. The outer or left hand end of the shaft 447 is journaled in the bracket 15 as shown in Figure 21. This shaft is arranged in a horizontal plane a short distance above the subtractor plate grooves 421 provided in each case 409 as shown in Figure 40 and has secured thereto a plurality of rock plates 448.

These plates 448 are provided one for each computing totalizer 6 and extend forwardly from the shaft 447 in a plane over the path of movement of the extension 350 of the cross totalizer 324. The outer or free end of each plate 448 extends a short distance beyond the plane of travel of the extension 350 and is provided with a pendant cam surface 449 adapted to be engaged by the extension 350 or the lateral projection 350' thereof, as the frame 324 is rocked about its pivots 325 and 326 to bring the auxiliary drive gears 321 into cooperative alignment with the master gear 327, and to be rocked upwardly thereby as shown in Figure 44 so as to produce a corresponding rocking motion of the shaft 447 and an arm 450 connected with the outer or left hand end of the shaft as illustrated in Figure 21.

The arm 450 is operatively connected, as shown in Figure 49, with a second rock shaft 451 journaled in suitable brackets 452 secured to the rear wall of the case 435 by means of a link 453 and rock arm 454. The shaft 451, as illustrated in Figure 21, extends in a horizontal plane at the rear of the case 435 to substantially a position midway between the ends of the rock frame 432 and has secured thereto a second rock arm 455 which extends inwardly through a suitable aperture provided in the rear wall of the case 435 and has the inner end thereof connected by a link 456 to an adjacent one of the intermediate walls 433' of the frame 432.

In operation, as the type unit 4 and cross totalizer 5 connected therewith approach one of the computing totalizers 6 having a subtractor plate 423 mounted therein, the extension 350 of the frame 324 mounted in the cross totalizer will be engaged by said subtractor plate which will rock the frame 324 automatically to bring the cross totalizer computing elements to the subtracting position. At the same time, the computing elements in the balance totalizers 7 will also be brought to the subtracting position by the engagement of the extension 350 with the rock plate 448 associated with said totalizer through the medium of the rock shafts 447 and 451 and the linkage connecting the shafts with each other and with the balance totalizer frame 432.

The hereinbefore mentioned telescopical shaft 364 is comprised of two sections 364' and 364'', one of which as the section 364', is slidably mounted within the other section as 364'' which, is illustrated in Figure 21, is formed tubular throughout a portion of its length. These shaft sections 364' and 364'' are splined to each other so as to rotate in unison and at the same time be permitted to move axially relative to each other by means of a pin 458 secured to the shaft 364' and an elongated slot 459 provided in the other shaft section 364'. The telescopical shaft 364 extends the full length of the supporting frame 1 and has the outer end of the section 364'' thereof journaled in a suitable bearing 128 mounted in the end bracket 13. This shaft section 364'' extends through the intermediate bracket 15 and is journaled in a bearing 128 mounted in said bracket and to which said shaft section is adjustably secured by means of nuts 460 screw threaded on the shaft, one adjacent either side of the inner ball race of the bearing and by lock nuts 461.

The other shaft section 364' has the inner end thereof supported by the shaft section 364'' while the outer end of the shaft 364' is rotatably mounted upon a journal stud 462 which is secured to the outer supporting frame bracket 14 and extends into an axially disposed recess or bore 463 provided in the outer end of the shaft 364'. The shaft section 364' is yieldingly urged outwardly relative to the shaft section 364'' toward the bracket 14 by means of a compression spring 464 mounted in the shaft section 364'' at the inner end of the shaft section 364'. A bumper 465 composed of leather, rubber or the like, may, as indicated in Figure 21, be mounted upon the journal stud 462 to be engaged by the outer end of the shaft section 364'.

The shaft section 364' is provided with an outwardly extending flange 466 spaced a short distance from the outer end thereof. To the flange 466 is secured the secondary master gear 430 as shown in Figure 21 so that said gear will positively move with the shaft section, both in a rotary direction, and axially.

The shaft section 364" is provided with a plurality of axially disposed recesses 468 in the upper portion thereof and which are positioned adjacent two or more of the totalizers 6 depending upon the requirements of the business for which the particular accounting machine is adapted.

As shown more particularly in Figures 1A and 21, recesses 468 are provided adjacent two of the totalizers 6 and have the longitudinal walls thereof arranged in a plane below that of the upper peripheral surface of the shaft section 364'. The ends of the recesses 468 are inclined downwardly and inwardly to form cam surfaces 468'. The inner shaft section 364' is provided with a plurality of, in this instance two, notches 469, one for each recess 468, and which are positioned when the shaft section 364 is in its outermost position in engagement with the bumper 465, in close proximity to the rearward or left hand end of the respective recess 468.

Mounted upon the hub 361 which carries the drive gear 360 and master gear 327, is a drag pawl 470 which, as shown in Figure 40, is pivotally connected as at 470' to the flange of the hub member 361 at one side of the telescopical shaft 364 and extends across said shaft through a suitable slot provided in one side of the hub 361 adjacent the flange thereof so as to rest upon the telescopical shaft 364. The pawl is yieldingly maintained in engagement with the shaft 364 by a spring 471. The relation of each notch 469 to the corresponding computing totalizers 6 is such that as the master gear 327 approaches the totalizer, the pawl 470 will engage in the corresponding notch 469 for moving the shaft section 364' and the secondary master gear 430 in unison with the master gear 327 and the relation of the master gear 327 and pawl 470 to each notch 469 and the secondary master gear 430, is such that when the master gear 327 is in cooperative registration with the first register wheel 320 positioned at the left hand side of the computing totalizer, the secondary master gear 430 will be in cooperative registration with the corresponding register wheel 320 of the balance totalizer 7 positioned at the left hand end of the frame 432 and case 435.

It therefore follows that as the master gear 327 is moved step by step axially into engagement with the successive register wheels 320 of the computing totalizers 6, the secondary master gear 430 will be likewise moved into successive cooperative engagement with corresponding register wheels 320 of the corresponding balance totalizer 7. Furthermore, the relation of the cam surface 468' positioned at the forward or right hand end of each recess 468 is so related to the respective totalizers that as the master gear 327 moves beyond the last or units register wheel in the cents column, the pawl 470 will engage the cam surface 468' of the corresponding recess and be moved upwardly thereby out of holding engagement with the respective notch 469, thus releasing the shaft section 364' and permitting the same to be returned by the action of the spring 464 to its normal outermost position in engagement with the bumper 465 where the secondary master gear 430 will be maintained in a position beyond the corresponding totalizer 7 out of cooperative relation with the register wheels thereof.

As the type unit 4, and the master gear 327 are moved from one totalizer 6 to the other with which the recesses 468 are associated, the pawl 470 will be moved out of operative engagement with the notch 469 associated with the first one of the recesses by the engagement thereof with the cam surface 468' and then will engage the notch 469 associated with the next adjacent recess 468 which will then be positioned at the left hand end of the respective recess for moving the shaft section 364' and the secondary master gear 430 axially in unison with the master gear 327 as said master gear is moved into successive cooperative relation with the register wheels of the corresponding totalizer. Thus, for each movement transmitted to the register wheels of the totalizer 6 associated with the recesses 468, a like movement will be transmitted to the register wheels 320 of the balance totalizer 7 associated with the secondary master gear 430.

In order that the pawl 470 may freely pass through the recesses 468 and notches 469 without coming into holding engagement with the shaft section 364', as the type unit 4 is moved backward toward the left hand end of the machine, the left hand portion of the notches 469 and lower edge of the pawl 470 are tapered as illustrated in Figure 21.

There is secured to the secondary master gear 430 a hand lever 473 which, as illustrated more clearly in Figures 21 and 49, is journaled upon the shaft section 364' adjacent the secondary master gear 430 between a pair of collars or washers 474 secured to said shaft section. The lever extends outwardly from the shaft through an elongated aperture 475 formed in the front wall of the case 435. To the lever 473 is secured a spring arm 476 which engages the upper wall of the aperture 475 and is tensioned to maintain the lever in contact with the lower wall of said aperture. The aperture 475 extends in parallel relation with the shaft section 364' and is provided adjacent the inner end thereof with a notch 475' formed in the lower wall adapted to receive the lever 473 therein when the secondary master gear 430 is moved inwardly beyond the register wheels of the corresponding balance totalizer 7. When it is desired to maintain the secondary master gear 430 out of cooperative relation with the corresponding totalizer 7, it is only necessary to move the lever 473 through the aperture 475 until the same is brought into alignment with the notch 475' where the arm 476 will move the lever 473 into said notch and the gear 430 will thereby be maintained in the inoperative position against the action of the spring 464. Also when the gear 430 is maintained by the lever 473 in the inoperative position, the axial movement of the shaft section 364' produced thereby will be sufficient to bring the notches 469 out of registration with the corresponding recesses 468 so that the pawl 470 will freely move through said recesses without coming into holding engagement with the shaft section 364'.

The hereinbefore mentioned secondary master gear 431 is constructed and operated in very much the same manner as the secondary master gear 430 with the exception that the gear 431 is slidably mounted upon the shaft section 364', but is splined to the shaft so as to rotate in unison therewith; see Figures 51 and 52. The secondary master gear 431 is releasably secured to the shaft 364' so as to be moved axially therewith by means of a lever 478 which, as shown more particularly in Figures 21, 50, 51 and 52, is composed of two sections 478' and 478". The sections 478' and 478" are pivotally secured to each other by a shouldered stud 479 which is, in turn, mounted in a collar 480 rotatably mounted upon a hub 431' provided on the gear 431 adjacent the inner face thereof. One of the levers as 478' extends inwardly from the pivot 479 into engagement with an annular recess 431" provided in the hub 431' while the other lever extends inwardly from the pivot 479 at the opposite side of the shaft section 364' for engagement with an annular recess 481 provided in the shaft 364'. The inner ends of the lever sections are yieldingly urged toward each other and into engagement with the hub 431' and shaft 364' by a spring 482 connected at its ends with said lever sections. The lever sections extend outwardly from the pivot 479 through an elongated slot or aperture 483 formed in the forward wall of the case 435, said aperture being extended across all of the balance totalizers 7 with which the secondary master gear 431 is adapted to be engaged as shown more clearly in Figure 1A.

There are as many of the recesses 481 formed in the shaft 364' as there are balance totalizers 7 with which the master gear 431 is adapted to operate and the relation of each recess with the corresponding totalizer is such that when the lever 478 is in engagement therewith the secondary master gear 431 will be maintained in the same relation with the register wheels of said totalizer that the secondary master gear 431 has to the register wheels of the first totalizer 7. It therefore follows that the secondary master gear 431 may be readily set for operation with a predetermined one of the balance totalizers 7 in alignment with the aperture 483 by bringing the lever 478 into engagement with a corresponding recess 481 provided in the shaft section 364'.

A latch 485 is pivotally connected as at 486 to the forward wall of the case 435 a short distance below the aperture 483 at the outer or left hand end thereof as shown more clearly in Figures 1A and 50. This latch is provided with a shoulder 485' in its upper longitudinal edge adapted when the latch is raised to a vertical position, to engage the lever section 478" of the lever 478 and hold the outer end of said lever in a raised position against the action of the spring 482 sufficient to maintain the inner end of said lever section out of engagement with the shaft 364' and the recesses 481 associated therewith. The position of the latch relative to the first or left hand totalizer 7 with which the secondary master gear 431 is adapted to be engaged is such that when the latch is in the raised position, the gear will be maintained at the left hand side of the totalizer out of cooperative relation therewith so that the gear 431 will remain inactive during the operation of the master gear 327 when said master gear is operating the totalizers associated with the recesses 468.

*Rotor type inking means*

Any suitable means may be employed for applying ink to the type 159 carried by the rotor 154 and as illustrated more particularly in Figures 18 and 37, this means comprises an ink impregnated roller 535 journaled upon the outer or free end of an arm 536 which has the other end thereof rotatably mounted upon a rod 537 carried by the housing 156 and is maintained thereby in alignment with the type carried by the rotor. A spring 538 is connected with the arm 536 and to the pin 378 and is tensioned to maintain the roller 535 in contact with the rotor and type under relatively light pressure.

Although the ink roller is shown as being constantly maintained in contact with the rotor or the type carried thereby, it is to be understood that suitable means may be provided for maintaining the roller out of contact with the rotor so that said ink roller will engage only with the type.

Furthermore, it will be readily understood that other suitable means may be employed for supplying the type carried by the rotor 154 with ink and I have illustrated in Figures 57 to 59 inclusive a simple means by which this result may be readily accomplished. In the structure shown in these figures, I preferably employ the usual typewriter ribbon as 540 which has the ends thereof rolled in the usual manner upon suitable spools or drums 541 rotatably mounted upon a respective shaft 542 mounted in suitable extensions 539 of the housing 156, one at either side of the printing station P.

The tape is fed from one spool to the other across suitable guide rollers 543 over an aperture plate 544 mounted upon the housing 156 at the cut away portion 156' thereof as illustrated in Figure 57 so that a portion of said tape will be maintained in a plane intermediate the platen 3 and the type 159 positioned at the printing station. In order that the ribbon 540 may be intermittently moved across the plate 544 to bring different portions thereof into alignment with the type, I have provided each spool 541 with a ratchet wheel 545 which is secured in any suitable manner to the respective spool to move therewith. Engageable with the ratchets 545 is a pawl 546 or 546'. The pawl 546, as illustrated in Figure 57, is connected with the ratchet wheel positioned beneath the printing station and is pivotally connected intermediate its ends as at 547 to a vibrating frame 548. The frame 548 is an L-shaped member positioned intermediate the spools 541 with one leg 548' thereof extending in nearly a vertical plane at the rear of a rotor shaft 131. The other leg 548" of the frame extends toward the front of the machine with the forward end thereof slidably connected by a shouldered stud 549 to the type operating lever 169, while the vertical arm 548' of the lever is slidably connected with the adjacent portion of the housing 156 by a shouldered stud 550. The pawl 546 is yieldingly urged toward the ratchet wheel 445 by a spring 551, while a pin 552 secured to the housing 156 above the arm 548" is adapted to be engaged by the upper end portion of the pawl to move the pawl out of operative engagement with the ratchet wheel in the manner presently described.

The pawl 546' is pivotally connected as at 553 to the upper end of the arm 548' and is yieldingly urged toward the corresponding ratchet wheel 545 by a spring 554. A pin 555 is secured to the housing 156 in position to engage the pawl 546' for maintaining the same out of operative engagement with the corresponding ratchet wheel in the manner presently described. Associated with the frame 548 is a pair of bell crank levers 556 which are mounted in reverse relation upon respective pins 557 secured to the housing 156, at opposite sides of the printing station. One arm of each lever 556 is provided with a lateral portion 556' having a guide slot therein for receiving the ribbon therethrough, said lateral portion being adapted to be engaged by a button as 558, one of which is secured to the ribbon adjacent either end thereof as is the usual practice, for rocking the corresponding bell crank lever and thereby reverse the direction of travel of the ribbon. The other arm of each of these levers 556 is connected by a pin and slot connection 559 with adjacent portions of the arm 548' of the frame 548.

In order that the bell crank levers 556 and the frame 548 may be releasably maintained in one of two predetermined positions for causing the operation of one or the other of the pawls upon the respective ratchets 545, I have provided one of the bell crank levers as the upper one with a spring detent 560 which extends downwardly from the lever into contact with the adjacent wall of the housing 156, and is provided with an outwardly extending bead or rib 560' adapted to engage in one or the other of a pair of correspondingly formed recesses 561 formed in the wall of the housing 156 as illustrated in Figure 59.

In operation, when the frame 548 is positioned as shown by full lines in Figure 63, and as the arm 169' of the lever 169 is rocked upwardly by the cam 173 during the rotation thereof the frame 548 will be carried upwardly with a sliding motion upon the pins 550 and 559 due to the connection of the frame with the arm 169' at 549. This upward movement of the frame will bring the lower pawl 546 into engagement with the teeth of the ratchet above the normal position of the pawl so that as the pawl and frame 548 are again moved downwardly by the returning of the lever 169 to its normal position, a rotary motion will be imparted to the ratchet and spool 541 connected therewith, thereby drawing the ribbon 540 downwardly from the upper spool 541 and winding the same about the lower spool. As the button 548 at the upper end of the ribbon is brought into contact with the upper bell crank lever 556, said lever will be rocked about its pivot 547 and cause the upper end of the arm 548' to be moved outwardly or rearwardly away from the pin 555 and thereby permit the spring 554 to rock the pawl 546' about its pivot 553 into operative engagement with the upper ratchet wheel 545. In other words, the pawl will then be in the position illustrated by broken lines in Figure 57.

Simultaneously with the outward movement of the upper end of the arm 548', the lower portion of the frame will be rocked inwardly or forwardly about the pin 550 as a pivot, thereby swinging the lower bell crank lever 556 about its pivot 557 to the position illustrated by broken lines. Also, the pivot 547 for the lower pawl 546 will be carried inwardly or forwardly away from the plane of the ratchet wheel 545 associated therewith and toward the stop pin 552, thereby causing said pawl to be rocked out of engagement with the ratchet wheel to the position illustrated by broken lines.

It will now be seen that the lower pawl is maintained out of operative engagement with its ratchet wheel while the upper pawl 546' is maintained in operative engagement with its ratchet wheel so that upon the lever 169 being actuated by the cam 173, a reverse motion of the ribbon 540 will be produced until the button 558 secured to the end of the ribbon wound on the lower spool engages the lower positioned bell crank lever 556 and moves it from the position illustrated by full lines, thereby returning the frame 548 to its initial position and reversing the position of the pawls 546 and 546' to again feed the ribbon from the upper spool onto the lower spool.

Totalizer lock

In Figures 60 and 61, I have illustrated a modified form of computing totalizer 6 wherein there is provided a simple mechanism for locking the register wheels 320 against rotation when the type unit 4 is out of cooperative relation therewith. This locking mechanism comprises a lock plate 582 which extends longitudinally through the totalizer case 409 in a plane above the detent rollers 340. This plate is journaled at its ends in the side walls of the case as shown in Figure 61, and has the lower edge thereof arranged at one side of the axis of rotation of the plate for engagement with the peripheral surface of the detent rollers. The plate is connected with an operating plate 583 by a link 584 which is pivotally secured at its ends to the lock plate 582 and operating plate 583. The operating plate 583 is arranged in a horizontal plane beneath the holding gears 415 in registration with an opening 585 provided in the lower wall of the case as illustrated in Figure 60. Plate 583 has the rear end thereof pivotally connected to the case 409 with the forward end extended in the path of movement of the supporting roller 420 carried by the type unit housing 156 so as to be engaged thereby and rocked upwardly to produce a corresponding rocking movement of the lock plate 582 to swing the same out of holding engagement with the detent rollers 340. The supporting plate 583 is maintained in its lowermost position by a spring 586 connected with the link 584 and housing 409. The lock plate 582 is maintained in its normal locking position by means of a stop pin 587 secured to the wall of the housing 409.

In operation when the type unit 4 is out of cooperative relation with a totalizer having the locking mechanism associated therewith the operating plate 583 will be normally maintained in its lowermost position and the lock plate 582 will be maintained in holding engagement with the detent rollers 340 by the co-action of the spring 586 and stop pin 587. As soon, however, as the type unit is brought into operative relation with the totalizer, the supporting roller 420 will engage the operating plate 583 and move the same upwardly and thereby produce a corresponding rocking movement of the lock plate to bring the lower edge thereof out of holding engagement with the detent rollers and thus permit the free vertical movement of the rollers required in the passing thereof over the teeth of the corresponding gear member 415 and so permit the free action of the register wheels during the calculation operation in the usual manner. The operating plate 583, when maintained in its uppermost position by the supporting roller 420, is held in engagement with a stop 588 formed in this instance, by pressing a portion of the side wall inwardly as illustrated in Figure 61. The stop member 588 is not only adapted for limiting the upward movement of the plate 583, but also serves as a stabilizer whereby the case of the totalizer is supported to a greater or lesser extent through the medium of the roller 420 during the calculating operation.

Shock absorber

In Figures 62 and 63, I have illustrated a modified form of selector disc together with key operated means for engaging the disc whereby the rotating selector discs and type rotor or rotors connected therewith will be brought to the at rest position with a more or less gradual decrease in the speed of rotation thereof, thus eliminating the shock incident to the sudden stoppage of the selector discs when suddenly engaged thereby by a fixed stop while rotating at full speed.

In accomplishing this result, I provide each key lever as 590 with a shoulder 591 formed, in this instance, on the inner or rear end of the lever below the shoulder 307, while the upper rear end of each lever is operatively connected with a pivoted stop block 592 by mounting the same in a suitable slot or recess 593 provided in the stop block. Each of the stop blocks 592 is pivotally connected to a pivot bar 594 which is secured to a cross bar 595 mounted in any suitable manner to opposite side walls of the key board frame 69. The cross bar 595 is arranged in a horizontal plane beneath the cam shaft 189 and the pivot bar 594 is adjustably secured to the cross bar by a plurality of clamping screws 596 and adjusting screws 597 arranged in such a manner that by loosening the clamping screws the stop block may be raised or lowered by screw threading the adjusting screws to a greater or less extent in the cross bar as will be readily apparent from the structure shown in Figure 62.

The slot 593 as shown, is arranged at the rear of the lower end of the block so that as the rear end of the key lever is raised by the depression of the key, said block will be moved into the path of movement of the corresponding selector disc as 598 secured to the selector shaft 146. This disc is preferably a segmental member similar to the selector disc 300 and has the radially disposed contact surface 301 at the forward edge thereof adapted to be engaged by a respective stop block 592. Each selector disc is also provided with an arcuate recess 599 formed in the peripheral surface thereof a short distance at the rear of the contact surface 301. A drive pin 600 is secured to a bell crank lever 601 in a position slightly above the shoulder 591 of each key lever 590 in the path of movement of said shoulder so as to be actuated thereby.

Each bell crank lever 601 is rotatably mounted upon a rock shaft 602 which extends in a horizontal plane at the rear of the key levers and has the ends thereof journaled in any suitable manner in the side walls of the key board frame 69. The bell crank levers have one arm thereof normally extending forwardly from the shaft 602 to a position in slightly spaced relation to the path of movement of the corresponding selector disc 598 and terminates in a plane a considerable distance below the stop block 592. The other arm of each bell crank lever, as shown, normally extends downwardly and rearwardly from the shaft 602 to a position at the rear of a cross rod or bar 603 which has the ends supported in the free ends of a pair of rock arms 604 secured to the shaft 602 preferably adjacent the corresponding side wall of the key board frame 69.

Each bell crank lever 601 is maintained in its normal position as illustrated in Figure 62, with the drive pin 600 in engagement with the shoulder 591 by a spring 605 secured at one end to said bell crank lever at the rear of and slightly below the horizontal plane of the axis of the shaft 602, the other end of said spring being secured to the tie rail 17. Pivotally connected with each arm 604 intermediate the ends thereof is a rod 606 which extends rearwardly from the arm through a suitable hole provided in the tie rail to a position some distance rearwardly of said tie rail. The rear end of each rod 606 is externally threaded and has adjustably mounted thereon a recessed washer 607, while a similar washer 608 is mounted on the rod adjacent the rear face of the vertical leg of the tie rail. Interposed between these washers is a relatively light coil spring 609 which is adapted to constantly urge the rods 606 and the cross bar 603 rearwardly. The tension of the spring 609 may be controlled by adjusting the washer 607 axially along the rod 606 and for this purpose, there is provided one or more nuts 610 screw threaded on the rear end of each rod 606.

In operation when the key of the levers 590 is depressed, the upward movement of the rear end thereof as the lever swings about its pivot 278 will rock the stop block 592 connected therewith inwardly or forwardly into the path of movement of the corresponding selector disc 598. At the same time the engagement of the shoulder 591 with the drive pin 600 will rock the corresponding bell crank lever 601 to bring the forwardly extending arm of the bell crank lever into the path of movement of the selector disc, while the other arm of the bell crank lever will be brought into engagement with the cross bar 603. As the contact surface 301 of the selector disc 598 engages the arm of the bell crank lever, said lever will be rocked thereby to the position illustrated in Figure 63, thus producing a corresponding swinging movement of the cross bar 603 and the arms 604 against the action of the springs 609, and compressing said springs and gradually retarding the forward rotary movement of the selector disc, as the tension of the springs is increased during the compression thereof.

It is to be understood that the tension of the springs is such that while the action thereof upon the bell crank levers 601 is sufficient to retard the rotary movement of the selector discs 598, they will not completely overcome the drive action produced thereon by the slip clutch 132 so that the contact surfaces of the disc will be moved out of engagement with the bell crank lever from the position shown in Figure 63 into contact with the stop blocks 592 as illustrated by broken lines in Figure 63. As the selector discs 598 engage the stop block the bell crank lever will register with the recess 599 in the selector disc and be permitted thereby to be rocked toward its normal position by the action of the corresponding spring 605 to bring the pin into contact with the shoulder 591 and as soon as the pressure on the key for the corresponding lever is released, the levers 591 and 601 will be returned to their normal positions. The return of the key lever 590 to its normal position will automatically bring the stop block 592 associated therewith out of the path of movement of the selector disc 598 and thereby release said disc and permit the continued rotation thereof.

*Letter type lock*

In Figure 64 I have illustrated a still further modification of my novel accounting apparatus and which pertains to an automatic lock for preventing the letter type being accidentally moved into printing engagement with the platen and the paper mounted thereon when the type unit 4 is in cooperative relation with any one of the totalizers 6. In the structure shown in this figure, the selector discs and the stop block are of the form illustrated more particularly in Figure 16. The key lever as 288, however, is shown with a shoulder 612 which projects rearwardly from the rear end portion of the lever in a plane below the shoulder 307 for engaging the tie bar 306. Mounted in a horizontal plane above the shoulders 612 is a horizontally disposed shaft 613 which has the ends thereof mounted in the supporting frame brackets 15 and 13. Mounted upon the shaft 613 is a lockout frame 611 comprising a pair of triangular shaped plates 614 positioned one adjacent either end of the shaft. Secured to the lower rear edge portion of each plate is a cross bar 615, while a similar cross bar 616 is secured in any suitable manner to the forward lower edge portion of each plate so that these bars extend longitudinally of the supporting frame 1 between the intermediate bracket 15 and the right hand end bracket 13 thereof. The rear cross bar 615 is arranged to extend across the path of movement of the lower end of the arm 400 while the cross bar 616 is arranged to extend across the shoulders 612 of the levers 288 when said levers are in their normal inoperative position.

The lockout frame 611 is constantly urged rearwardly so that the bar 615 is maintained in contact with the arm 400 at all positions of said arm by one or more springs 617 connected with the bar 616 and with the tie rail 17. The distance between the cross bars 615 and 616 is such that when the rock arm 400 is in its normal position out of holding engagement with the stop block 404 carried by the rotor 154, the forward rail 616 will be maintained at the rear of the shoulders 612 out of the path of movement thereof so as to permit free upward movement of the rear ends of the levers 288.

As the arm 400 is brought into holding engagement with the stop block 404 on the rotor 154 by the action of the spring 402, and as the yoke 385 is depressed by the engagement of the rollers 391 carried thereby with the cam bar 392 of the totalizer with which the type unit 4 is brought into cooperative relation, the lockout frame 611 will be moved forwardly thereby to bring the bar 616 into the path of movement of the shoulders 612 and thereby hold the corresponding key levers against operation. As soon as the arm 400 is rocked out of engagement with the stop block 104 by the operation of a numeral key in the manner hereinbefore described and which are not provided with shoulders 612, it is obvious that although the levers 288 will be released by the lockout frame 611, these letter keys as well as the remainder of the numeral keys will be locked against operation by the lockout bar 290 in the manner hereinbefore described.

As soon as the type unit 4 has been moved out of cooperative relation with the totalizer 6 and the yoke 385 is returned to its normal uppermost position by the spring 394, the arm 400 will be moved out of holding engagement with the stop block 404 on the rotor and thereby permit the lockout frame 611 to be moved rearwardly out of holding engagement with the shoulders 612 by the spring 617 so that the letter keys may then be operated in the conventional manner for making a printed record.

*Subtracting type totalizer*

In Figures 65, 66 and 67 there is illustrated a further modified form of computing totalizer 6 in that the mechanism is adapted to be shifted to a position whereby the rotation of the gear 327 will effect calculations in subtraction when said gear is in cooperative relation with the totalizer.

The manner of constructing the totalizer is similar to that of the cross totalizer 5, that is, the register wheels 320, the auxiliary gears 415 and the respective shafts 322 and 416 are operatively mounted in a frame 620. This frame 620 is similar in construction to the frame 324 for the cross totalizer 5 in that it is provided with side members 621 joined across the forward edge thereof by a wall 622 which is provided with a sight opening 623 in alignment with one of the teeth 328 at the rear of the window 417 provided in the case 409. The detent rollers 340 have the arms thereof as 341' pivoted intermediate their ends on the rod 342 which has the ends thereof secured in the end members 621 of the frame 620. The springs 343 for actuating the rollers 340 have one end thereof secured to the opposite end of the corresponding arms 341' to that in which is mounted the rollers 340 while the opposite ends of the springs are attached to a rod 624 which extends transversely of the frame 620 with the ends thereof secured in the end members 621. The frame 620 is rotatably secured to the case 409 by pins or studs 625, one of which is shown in Figure 65 and which are connected with a respective end member 621 and with the adjacent portion of the case 409. The frame 620 is also provided with an arm 626 which extends outwardly from the forward side thereof adjacent one end through an elongated slot 627 provided in the front face of the case 409 adjacent the window 417. This arm provides a convenient means by which the frame may be manually rocked about its pivots 625 to alternately bring the register wheels 320 and the auxiliary gears 415 into and out of cooperative alignment with the master gear 327 in the same manner in which the corresponding members of the cross totalizer 5 are manipulated. The frame and the members carried thereby are maintained in a selected one of the two positions, in this instance, by means of a flat spring member 628 secured to the side wall of the case 409 and which is provided with a head 629 normally positioned in the path of movement of the arm 626 so as to engage either the front or rear edge of said arm for releasably maintaining the same at either end of the slot 627. The spring 628 may also, as shown, be provided with a finger-piece 630 which projects beyond the head 629 to be engaged by the operator for moving the head out of the path of movement of the arm 626 to release said arm.

In operation, when it is desired to effect calculations in addition, the frame is maintained in the position shown by full lines in Figure 65 with the register wheels 320 in cooperative alignment with the master gear 327 and the auxiliary gears 415 out of cooperative alignment with said master gear. When it is desired to effect calculations in subtraction, the frame 620 is rocked to the position illustrated by broken lines in Figure 65 in which position of the frame, the register wheels 320 will be maintained out of cooperative alignment with the master gear 327 while the auxiliary gears 415 will be maintained in cooperative alignment with said master gear, so that as the master gear is brought into meshing engagement with any one of the auxiliary gears 415, the register wheel or wheels actuated thereby will be rotated in the reverse direction of that produced by the master gear when said master gear is in direct meshing engagement with the register wheels, and thereby produce calculations in subtraction.

*Operation*

Considering that the supporting frame 1 is in the operative position as illustrated in Figure 2, and that a siutable sheet of paper has been secured to the platen 3 by the clips 89 and 90 and the pressure plate 110, the platen is then adjusted vertically to bring the paper into proper alignment with the type rotor 154. The next step in the operation of the machine is to set the motor 118 into operation by closing a suitable switch, as indicated at 631, Figure 1, in an electric circuit for the motor. It follows that when the motor is in operation the drive shafts 120 and 121 and the back space shaft 148 will be continuously rotated due to their connection with the motor by the gear train 119. The rotor shaft 131 and the selector shaft 146 and the members connected therewith are also normally rotated by the drive shaft 120 through the medium of the slip clutch 132 connected therewith, while the space and cam shaft 139 is normally held stationary against being rotated by the drive shaft 121 and slip clutch 132 connected therewith by the engagement of the detent 263 with the holding catch plate 262.

The next step in the operation of the machine is to bring the item totalizers 6 into cooperative alignment with the notches 469 in shaft 364'. The balance totalizers 6 may be aligned with columns on the paper or otherwise. There are at least 4 of the totalizers 6 utilized in recording each commercial transaction, although it is to be understood that any number of these totalizers may be provided and used depending upon the requirements for producing one or more records, as illustrated in Figure 1A.

I have illustrated in Figure 1B a plurality of, in this instance four, additional totalizers 6 constructed in the same manner as the totalizer shown in Figure 1A and which may be utilized independently of the totalizers illustrated in Figure 1A or the balance totalizers 7 provided in the balance summarizing zone for producing additional records as may be required.

It will be understood that the type unit 4 and the cross totalizer 5 connected therewith are usually maintained in a position at the left of the printing zone. If the type unit is not in this position, the operator first presses downwardly on the return key 217 to operatively connect the belt 254 with the rotating selector shaft 146 through the medium of the pinion 211 thereby rocking the tabulator bar out of operative relation with the spacing screw 178 and causing the upper run of the belt to travel toward the left hand side of the machine and thus bring the type unit 4 to a position to begin writing the entry.

The type unit 4 may be brought into cooperative relation with the record space or column on the sheet or sheets of paper secured to the platen, by either pressing downwardly upon the tabulating key 198 or upon the space bar 297, depending upon the distance the type unit 4 is required to travel toward the right hand end of the machine.

If the tabulator key 198 is utilized, the required tabulator arm 190 will first be rocked about its pivot 192 to its innermost position over the tabulator bar 183 so that as said bar is rocked outwardly out of engagement with the spacing screw 178, the corresponding stop shoulder 194 of the arm will be moved into the path of travel of the stop member 196 on the type unit. If, on the other hand, the space bar 297 is utilized to effect the axial movement of the type unit 4, it will be understood that the type unit will be moved but one letter space at a time by means of the cooperating of the spacing screw 178 with the rack teeth 182 on the tabulating bar 183.

After the type unit 4 has thus been brought into proper cooperative relation with the record space or column on the sheet or sheets of paper carried by the platen 3, the required data are printed by the successive manipulation of the keys of the letter and/or numeral keys of the key board 2.

If a letter key 279 is depressed the corresponding letter type carried by rotor 154 will be brought into registration with the printing station P and in alignment with pressure head 171, due to the engagement of the stop shoulder 302 carried by the key lever with the corresponding selector disc 300. At the same time, the space and cam shaft 139 is released due to the fact that the detent 263 is rocked out of holding engagement with the plate 262 by the engagement of the key lever 288 with the crank plate 306 of the trip bar 264. As the space and cam shaft 139 is thus permitted to be rotated by the drive shaft 121 through the medium of the slip clutch 132 associated therewith, the lever 169 will be actuated by the cam 173 to bring the pressure head 171 into operating engagement with the letter type in the manner hereinbefore described.

If a numeral key is operated, the corresponding numeral type carried by the rotor 154 will be brought into registration with the printing station P due to the engagement of the stop shoulder 302 carried by the key lever with the corresponding selector disc 300 after which this type will be moved radially outwardly by the pressure head 171 into pressure engagement with the sheet of paper by the action of the cam 173 upon the rock lever 169. It will be understood, however, that the cross totalizer 5 will not be operated by the master gear 327 during the printing of the numeral due to the fact that the yoke 385 will be in its uppermost position and the shoulder 379 on the arm 380 will be positioned about the upper end of the cam arm 373 as illustrated in Figure 38. It follows, therefore, that the cam arm will be in its normal innermost position in engagement with the stop 406 and the sliding teeth 366 will be maintained in their innermost inoperative positions as they move past the drive gear 360 due to the engagement of the pins 369 carried thereby with the outer or rear peripheral wall 376 of the arm 373, which is then in the position illustrated in Figure 38 in cooperative alignment with the surface 370 of the cam ring 162.

After the printing of each numeral or letter type, the type unit 4 is automatically moved one letter space by the action of the motor 118 upon the spacing screw 178 during the latter portion of the revolution of the space and cam shaft 139. As the type unit is again brought to rest at the end of the letter spacing, the rotor 154 will be released by the engagement of the cam 309' with the detent 263 which, as hereinbefore described, not only positively rocks the trip bar 264 to its normal position and thereby returns the key which has previously been depressed to its normal uppermost position, but also automatically stops the rotation of the space and cam shaft 139 by the engagement of the detent 263 with the tooth 262' of the plate 262. It will now be understood that this operation of the letter and numeral keys and the corresponding type may be repeated in succession until the required record or records have been printed after which the type unit 4 is moved axially toward the right hand end of the frame 1 into cooperative relation with the desired one of the totalizers 6 in the printing and computing zone.

This axial movement of the type unit is effected in the manner hereinbefore described by first swinging the proper tabulator arm 190 to the position over the tabulator bar 183 for stopping the type unit with the master gear 327 in cooperative alignment with or in close relation to the first or left hand register wheel 320 of the corresponding totalizer and then manipulating the tabulator key 198. After the type unit has thus been positioned, the same may be moved axially if the master gear 327 is not properly positioned by utilizing the space bar 297 or the back space key 277 to bring the master gear into cooperative alignment with any one of the register wheels depending upon the sum to be printed and totaled.

As the type unit 4 is thus brought into cooperative relation with a selected one of the totalizers 6, it will be understood that the yoke 385 will have been moved to its innermost position by the engagement of a roller 391 carried thereby with the cam bar 392 secured to the corresponding totalizers so that the arm 400 will be released and moved by the spring 402 about the pivot 401 for bringing the shoulder 403 into the path of movement of the stop block 404 and thus stop the rotation of the rotor with the blank space 157' in registration with the printing station and pressure head 171. At the same time, the lower end of the arm 400 will be moved forwardly into close proximity to the trip bar 264.

It will also be understood that as the yoke 385 engages the cam bar 392, the cam link 396 will be carried downwardly thereby to bring the cam surface 396' thereof into the path of movement of the actuating pin 398 so that during the rotation of the rotor 154 and before the stop block 404 engages the shoulder 403 on the arm 400, the actuating pin 398 will engage said cam surface and rock the arm 396 outwardly or rearwardly about the pivot 395, thereby rocking the cam arm 373 outwardly or rearwardly to bring the upper end of the inner or forward cam surface of the cam groove 375 into registration with the surface 370 of the cam ring 162. As the cam arm 373 is thus rocked rearwardly, the upper end thereof will pass from beneath the shoulder 379 and permit the arm 380 to be moved downwardly by the spring 383 so as to position said shoulder 379 into the path of movement of the upper end of the arm 373 as illustrated in Figure 37 for holding said arm in its outer or rearward position against the action of the spring 377 after the pin 398 has passed beyond the cam surface 396'.

Furthermore, as the type unit 4 approaches the totalizer 6, which for convenience of explanation will be considered as the first computing totalizer or the one at the left hand side of the series, which is arranged in alignment with the debit column or space on the paper, the drag pawl 470 mounted on the case 156 will be brought into engagement with the first notch 469 provided in the inner section 364' of the telescopical shaft 364. This engagement of pawl 470 with shaft section 364' will produce axial movement of said shaft section and the secondary master gears 430 and 431 carried thereby to bring the same into cooperative alignment with the register wheels of the corresponding balance totalizer 7. It, therefore, follows that if the type unit 4 is moved axially to bring the master gear 327 into cooperative alignment with an intermediate register wheel of the totalizer 6, the secondary master gears 430 and 431 will simultaneously be brought into cooperative relation with corresponding register wheels of the respective totalizer 7. The rotor 154 and the printing and calculating mechanism associated therewith, including the master gear 327 and the secondary master gears 430 and 431, are now in position whereby the sum to be recorded may be simultaneously printed on the paper and registered on the totalizer 6, balance totalizers 7 and the cross totalizer 5.

This recording of the sum upon paper, and entering the same into the various totalizers, is effected by the operator merely successively manipulating the proper numeral keys provided in the key board 2 in the following manner. As an example, let it be assumed that the sum to be printed and registered on the totalizers is one thousand dollars. The master gear 327 and the secondary master gears 430 and 431 are first brought into cooperative relation with the thousandths register wheel in the dollars section in the respective totalizer by producing axial movement of the type unit 4 in the manner just described. The operator now presses upon the numeral one key and as he does so, the lever of said key will be brought into position for engagement with the corresponding selector disc or element 300. At the same time, the rotor 154 will be released by the engagement of the trip bar 264 with the lower end of the arm 400. Inasmuch as the key lever is positioned in the path of movement of the selector corresponding to the numeral one type, the rotor will only be permitted to rotate until the numeral one type is brought into registration with the printing station in alignment with the pressure head 171.

As the rotor 154 is thus moved from the at rest position to the position where the numeral one type is at the printing station, the first one of the drive teeth 366, when considered in the direction of rotation thereof, will be moved outwardly by the inner cam surface of the cam groove 375 into engagement with one of the teeth of the drive gear 360. This tooth 366 will move said gear one tooth space before said tooth is again returned to its innermost position out of engagement with the tooth of the gear by the cam surface 370" of the ring gear 162. The second tooth of the series of sliding teeth will be brought during this operation of the first tooth only into position for engaging the next tooth of the gear 360 but will not move said tooth and the gear before the rotor is again held against rotation by the co-action of the selector disc and numeral one key lever. In other words, the drive teeth 366 will be in the position illustrated in Figure 40 when the rotor is brought to an at rest position with the numeral one type at the printing station.

During this movement of the rotor from the at rest position to the position where the numeral one type is at the printing station, the register wheels 320 of the cross totalizer 5 and of the computing totalizer 6 with which said master gear is in cooperative relation will have been moved one tooth space and at the same time the secondary master gears 430 and 431 will have similarly moved the corresponding register wheels of the balance totalizers 7 with which they are in engagement one tooth space, and thereby produced the required calculations on the respective totalizers.

Shortly after the numeral one type is brought to the printing station, the rock lever 169 is actuated by the cam 173 for effecting the printing of the type and at the same time, this movement of the rock lever will produce an upward movement of the arm 380 for bringing the shoulder 379 above the upper end of the cam arm 373, thereby permitting the spring 377 to swing said arm 373 inwardly and move the drive teeth 366 having pins in registration with the advanced or lower portion of the cam groove 375 inwardly to the inoperative position so the drive teeth will not move into engagement with the teeth of the gear 360.

As the throw of the cam 173 passes beyond the lever 169, the spacing screw 178 effects letter spacing of the type unit 4 to bring the master gear 327 into cooperative alignment with the next succeeding register wheels 320 of the cross totalizer 5 and the totalizer 6. At the same time, the pawl 470 effects a corresponding axial movement of the shaft section 364' and thus brings the secondary master gears 430 and 431 into cooperative relation with the next successive register wheels of the respective balance totalizer 7. The type unit 4 and secondary master gears 430 and 431 are then in position whereby the next numeral in the sum may be recorded on paper and entered into the totalizer.

Inasmuch, however, as the next numeral is a cipher in the sum selected, it will be understood that when the cipher numeral key is depressed and the rotor 154 released thereby in the manner described above when operating the numeral one key, the rotation of the rotor before being stopped by the co-action of the key lever and a corresponding selector disc with the cipher numeral type at the printing station will be insufficient to bring any of the sliding gear teeth 366 into such operative relation with the teeth of the gear 360 as to produce a rotary movement of the gear. Therefore, neither the master gear 327 nor the secondary master gear 430 and 431 will, in this instance, be operated so that the corresponding totalizers associated therewith will remain idle. After the rotor has been positioned by the coaction of the key lever and selector disc, the type will be motor driven by the action of the cam 173 and lever 169 in the usual manner to effect the printing thereof. In like manner, the remaining ciphers may be printed without affecting any of the totalizers.

It will now be understood that any desired sum within the capacity of the totalizers may be recorded on paper and entered into any selected totalizer 6 which is mounted in cooperative relation with the recesses 468 provided in the telescopical shaft 364 and that a corresponding calculation will be computed by the balance totalizers 7 due to the engagement of the drag pawl 470 with the shaft section 364'.

If, however, the calculation is to be computed in the second positioned totalizer 6 or in other words, the totalizer in registration with the credit column or space, the cross totalizer 5 and the particular one of the balance totalizers 7 with which the secondary master gears 430 and 431 are in operative engagement, may be caused to subtract the sum or amount being recorded from the balance carried by these units by the operator inserting one of the subtractor plates 423 into the totalizer 6 prior to the movement of the type unit 4 into operative relation therewith. Inasmuch as the direction of rotation of the register wheels 320 in the totalizer 6 will always be in the same direction when actuated by the master gear 327, the sum registered thereon will be added to the balance already obtained, whereas in the cross totalizer 5, by transmitting motion to the register wheels thereof through the auxiliary drive gears 321, which is effected when the frame 324 is rocked by the engagement of the subtractor plate with the exension 350 in the manner hereinbefore described, the register wheel or wheels of the cross totalizer actuated by the master gear will thereby be rotated in a direction reverse to that of the computing totalizer register wheels and thus produce calculation in subtraction.

Simultaneously with the shifting of the frame 324 in the cross totalizer, the shaft 447 will be rocked by the engagement of the extension 350 with the rock plate 448 mounted in the totalizer, which, in turn, will produce a corresponding rotation of the frame 432 for the balance totalizers 7 and thereby bring the auxiliary drive gears 321 associated with the balance totalizers 7 in cooperative alignment with the secondary master gears 430 and 431 so that the amount being recorded will thus be subtracted from the balance previously showing on the respective balance totalizers 7 and the cross totalizer 5.

After the sum has been entered in the above described manner into either one of the totalizers 6 arranged in the debit or credit column, the cross totalizer 5 is then cleared of the balance showing thereon, or, in other words, is reset to zero reading by bringing the type unit 4 into cooperative relation with one or the other of the two remaining totalizers 6 of the group of four hereinbefore referred to. For instance, if the sum is registered on the first or debit entry column totalizer 6, the type unit 4 will be moved into engagement with the third totalizer 6 which is arranged in the debit balance column so that if one thousand dollars is registered on the debit entry column totalizer, the same sum will be entered into the debit balance column totalizer.

The totalizer 6 in the debit balance column is provided with one of the subtractor plates 448 so that when the printing mechanism is actuated to print the sum in the debit balance column, the same sum will be subtracted from the balance in the cross totalizer 5. On the other hand, if the entry is a credit and the type unit 4 is first moved into cooperative engagement with the second totalizer 6, that is, the one in the credit entry column the cross totalizer 5 and the balance totalizer 7 engaged by the secondary master gears 430 and 431 will be operated to effect calculations in subtraction. Now when the type unit 4 is brought into operative engagement with the fourth totalizer 6, or the totalizer in the credit balance column, the cross totalizer 5 will be operated in a direction to effect calculations in addition and thereby simultaneously clear the cross totalizer 5 with the printing of the sum in the credit balance column and the entering thereof in the credit balance totalizer. It will be observed, however, that when the type unit 4 is in cooperative relation with either of the totalizers 6 positioned in the balance columns, the operation of the master gear 327 will not effect operation of the balance totalizers 7 due to the fact that the secondary master gears will be maintained at one side of the balance totalizers 7 out of cooperative relation therewith by the action of the spring 464 upon the shaft section 364'.

When the apparatus is constructed in the manner shown in the drawings, the secondary master gear 430 will always be actuated to effect calculation, either in subtraction or addition in the first or left hand balance totalizer 7 when the type unit 4 is in cooperative relation with the first and second or debit and credit entry totalizers 6, while any one of the remaining balance totalizers 7 may be operated as desired by the securing of the secondary master gear 431 with the shaft section 364' at a corresponding one of the recesses 481 formed in said shaft section. Also, the secondary master gear 431 may be maintained idle or inoperative during the operation of the other secondary master gear 430 if desired, by swinging the latch 485 from the horizontal position to the vertical position and thereby maintain the secondary master gear against axial movement during the axial movement of said shaft section. Furthermore, both secondary master gears 430 and 431 may be maintained inoperative during the operation of the type unit and totalizers 6 when desired by the operator manually moving the master gear 430 axially with the shaft section 364' until the lever engages the notch 475' provided in the lower wall of the aperture 475 when the secondary master gear 430 will be maintained intermediate the first and second balance totalizers 7 out of cooperative relation therewith.

After the first entry has been recorded and entered in the manner above described, the paper may be brought into position for the next entry by the operator pressing downwardly on the line space key 70 associated with the key board 2 to manually effect the raising of the platen 3 one line space. After the platen and paper have thus been moved upwardly one line space, the type unit 4 is brought back to the left end of the printing zone by pressing the rotor return key, after which the type unit 4 and the printing and calculating mechanism associated therewith may be operated as desired for printing and computing a second entry. It is obvious that these series of movements may be continued as long as desired or until the available space on the sheet or sheets of paper has been utilized, when said paper may be replaced by one or more new sheets and records made thereon in the above described manner.

The totalizers 6 are used in connection with the cross totalizer 5 as a check upon each individual entry and these totalizers are each cleared after completing the entry of each specific account at the end of each entry period. If the totalizers 6 are constructed as illustrated in Figure 40, they may be cleared by manually adding to the balance carried thereby the complement of said balance to return the totalizers to zero reading. If, on the other hand, the totalizers are constructed as illustrated in Figure 65, they may be cleared by shifting the frame 620 to bring the computing mechanism thereof into the subtracting position in the manner hereinbefore described after which the amount of the balance appearing in the totalizer is printed in the column with which the totalizer is aligned. As the amount is thus printed, the master gear 327 will, of course, be brought into meshing engagement with corresponding auxiliary gears 415 and will, therefore, subtract the amount from the balance formerly carried by the totalizer and thus automatically return the totalizer to zero reading.

The general balance totalizers 7, on the other hand, are used in connection with major accounts only, such as a general ledger account, accounts receivable, accounts payable, notes receivable and the like, and the balance is accumulated on these totalizers from day to day for an extended period of time so that the total balance of any of these accounts may be learned at any time by referring to the corresponding general balance totalizer. If desired, the sight opening 439 may be closed by a suitable plate, not shown, which may be locked in place, whereby only an authorized person may have access to the amounts showing on the general balance totalizers.

While I have shown and described the totalizers 6 as all having the register wheels thereof provided with numeral characters, it is to be understood that these characters may be omitted particularly in the case of totalizers used in connection with the debit and credit balance columns where there is no particular advantage in having the balance appear in the totalizer inasmuch as these units are utilized for clearing the cross accumulator 5 only.

Although I have shown and particularly described the preferred embodiment of my invention, together with certain modifications thereof, it will be readily understood that many other modifications pertaining to the structure of the apparatus and to the form, size, and relation of the parts thereof, may readily be made without departing from the spirit of the invention as set forth in the appended claims.

I claim:

1. In a machine of the class described, a printing unit including a rotor carrying character, alphabet and numeral type adapted to be selectively brought to a predetermined printing station by an appropriate rotation of said rotor, means for translating said printing unit longitudinally of the machine into and out of predetermined writing and computing zones at the will of the operator, gear teeth mounted on said rotor in definite relation to said numeral type, a totalizer located in said computing zone, a master gear carried by said printing unit and adapted to operate said totalizer when brought into cooperative relation therewith by translation of said printing unit, means for bringing said rotor gear teeth into cooperative relation with said master gear when said printing unit is in said computing zone, and means operable when said printing unit is in said computing zone for turning said rotor through a predetermined angle of rotation so as simultaneously to bring a selected one of said numeral type to said printing station and to produce a predetermined rotation of said master gear, thereby entering said number into the totalizer.

2. A device as described in claim 1, wherein said gear teeth are movably mounted on said rotor.

3. In an accounting machine, a rotatable type carrier, numeral type mounted on said carrier, a totalizer, power means for rotating said type carrier to selectively bring the type to a printing station, and means carried by said type carrier and adapted to cooperate with said totalizer operated by the rotation of said type carrier for simultaneously entering the value of the selected type into the totalizer while positioning the type at the printing station.

4. In a machine of the class described having a stationary key board including letter, character and numeral keys and a substantially flat platen, in combination, a rotor mounted adjacent said platen, power means for rotating said rotor, printing type mounted on said rotor, gear teeth mounted on said rotor in definite spaced relation to said type, a totalizer, a master gear mounted adjacent said rotor and arranged to cooperate with said totalizer, means for bringing said rotor gear teeth into cooperative relationship with said master gear, means including keys of said key board for controlling the rotation of said rotor whereby a preselected numeral type is brought to a printing station with respect to said platen while the same controlled rotation of the rotor simultaneously enters a preselected number into said totalizer.

5. In an accounting machine having a frame, a rotor shaft, power means for obtaining uni-directional rotation of said rotor shaft, in combination, a printing unit including a rotor mounted on said rotor shaft and adapted to rotate with said shaft while free to move transversely of said frame, printing type mounted on said rotor, gear teeth mounted on said rotor in definite spaced relationship to said type, a single master gear mounted adjacent said rotor and adapted to be carried along with said rotor, selector means connected with said rotor for arresting the rotation of said rotor in any one of a number of predetermined positions to bring a pre-selected letter or numeral to the printing station, a totalizer carried by said printing unit and having limited relative movement with respect thereto, a totalizer mounted on said machine frame, means for releasably holding said totalizers in alignment during a limited portion of the transverse movement of said printing unit, said totalizers including a plurality of denominational register wheels, gear teeth carried by each of said register wheels, said gear teeth of each denominational register wheel of each totalizer being adapted to mesh directly with said single master gear and similar denominational register wheels of both totalizers meshing simultaneously with said single master gear, means for moving said rotor gear teeth into and out of cooperative engagement with said master gear, means positioned in definite relation to said machine frame totalizer for controlling the last mentioned means as the printing unit is moved transversely of the frame whereby rotation of said rotor to bring a preselected number type to the printing station simultaneously and directly enters the number into said two totalizers by means of said single master gear when said two totalizers are in alignment.

6. A device as described in claim 5, wherein said rotor gear teeth are movably mounted on said rotor.

7. A device as described in claim 5, wherein said rotor gear teeth are movably mounted on said rotor and wherein said means for bringing said rotor gear teeth into and out of cooperation with said master gear comprises a device movable with respect to said rotor for extending and retracting said movable gear teeth radially with respect to the periphery of said rotor.

8. In a machine of the class described having a stationary key board including character, letter and numeral keys, a platen and a totalizer having a plurality of denominational orders, in combination, a printing unit including a rotor adapted for uni-directional rotation mounted adjacent said platen and arranged to move longitudinally thereto, printing type mounted on said rotor, gear teeth mounted on said rotor in definite spaced relation to said type, a master gear arranged to move longitudinally with said rotor and arranged to cooperate with successive denominational orders of said totalizer, means for bringing said master gear into cooperative relationship with said rotor gear teeth, spacing means controlled by said keys of said key board, said means being so constructed and arranged as to move said printing unit step by step longitudinally of the platen to provide for printing successive numerals while simultaneously carrying the master gear into and out of cooperative relation with said successive denominational orders of said totalizer.

9. In a machine of the class described having a totalizer, a master gear adapted to actuate said totalizer, a rotor, a rotary shaft for rotating said rotor, means for rotating said shaft in one direction, means for arresting the motion of said rotor at a predetermined portion of the revolution, in combination, gear teeth mounted on said rotor, means for bringing said rotor gear teeth into and out of driving contact with said master gear whereby a predetermined partial revolution of said rotor enters a predetermined value into said totalizer.

10. A device as described in claim 9 wherein said gear teeth are movably mounted on said rotor and adapted to be extended and retracted individually.

11. In a machine of the class described, having a master gear adapted to actuate a totalizer, a rotor having gear teeth mounted thereon, a rotary shaft for rotating said rotor, means for continuously rotating said shaft in one direction, means for releasably holding said rotor against rotation at a predetermined position, means for releasing said holding means, means for arresting the motion of said rotor at a predetermined portion of a revolution, in combination, means for moving said rotor gear teeth relative to said master gear to bring said rotor gear teeth into and out of driving contact with said master gear, said last mentioned means being so constructed and arranged as to bring the rotor gear teeth into driving contact with said master gear for the partial revolution of the rotor from the predetermined held position to the selected arrested position, and mechanism operated during the arrested period of said revolution for actuating said last mentioned means to bring the rotor gear teeth out of driving contact with said master gear.

12. In a device as described in claim 11, means operated during the completion of the arrested revolution of said rotor for resetting said means for bringing said rotor gear teeth into driving contact with said master gear.

13. In a device as described in claim 11, shock-absorbing means connected with said arresting means.

14. A device as described in claim 11 wherein said rotor gear teeth are movably mounted on said rotor so as to be extended and retracted with relation to the periphery of said rotor, and wherein the drive is provided with means for extending and retracting said teeth individually.

15. In a machine of the class described having a master gear adapted to actuate a totalizer, in combination, a rotor having extensible gear teeth mounted thereon, said gear teeth when extended being adapted to cooperate with said master gear, movable printing type mounted on said rotor in definite spaced relationship to said gear teeth, a rotary shaft for rotating said rotor, means for rotating said shaft, means for releasably holding said rotor against rotation in a predetermined position, a tooth actuating device movable relative to said rotor, means adapted upon the rotation of said rotor to move said device relative to said rotor and into cooperation with said gear teeth to extend the same, means for releasing said holding means, means for arresting the motion of said rotor at a predetermined portion of a revolution whereby a selected number type is brought to a printing station and simultaneously the coaction of the extended gear teeth with the master gear enters the pre-selected number into the totalizer, a pressure head for operating said printing type, a link connecting said pressure head with said tooth actuating device, means for actuating said pressure head, means arranged to operate during the arrested period of said revolution whereby actuation of said pressure head effects printing of the selected type while simultaneously moving said tooth actuating device to retract said teeth, and means positioned on said rotor for resetting said tooth actuating device when the arresting means is released and during the completion of the interrupted revolution of said rotor.

16. In an accounting machine having a key board, a totalizer mounted in predetermined relation with said key board, and a travelling master gear for said totalizer, in combination, means for bringing the master gear into cooperative relation with successive register wheels of the totalizer comprising a shaft, a tabulating bar adjacent said shaft, a screw member on said shaft engageable with said bar, and means for operating said shaft and screw member one revolution for each operation of a key of said key board.

17. A device as in claim 16 having means for moving the tabulator bar into and out of cooperative relation with the screw member.

18. In an accounting machine having a pair of totalizers arranged in predetermined spaced relation to each other, in combination, a shaft member common to both of said totalizers having a limited axial movement with respect to said totalizers, a master gear mounted on said shaft to rotate therewith and having axial movement with respect to said shaft, a secondary master gear mounted on said shaft for axial and rotary movement therewith in cooperative relation with one of said totalizers, power operated means for producing step-by-step axial movement of said master gear to bring the same into operative relation with successive orders of one of said totalizers, and clutch means connected with said master gear and engaging said shaft member for producing axial movement of said shaft member to bring the secondary master gear into cooperative relation with successive orders of its corresponding totalizer.

19. A device as in claim 18 having means coacting with the clutch means for disconnecting the master gear from said shaft, and means for subsequently producing axial movement of said shaft member for returning the secondary master gear to an initial position.

20. A device as in claim 18 wherein means is provided for releasably connecting the secondary master gear to the shaft member whereby said gear may be moved relative to the shaft to an inoperative position at one side of the totalizers, and means for maintaining the secondary master gear in the inoperative position.

21. In a machine of the class described having a frame, a carriage having translational movement with respect to said frame, a totalizer mounted on the frame, a totalizer mounted on the carriage, said totalizers including a plurality of register wheels, and said register wheels being provided with gear teeth, in combination, totalizer operating mechanism including a single master gear adapted to mesh directly and simultaneously with said frame totalizer and said carriage totalizer register wheels mounted on the carriage, means for bringing said carriage totalizer into registration with said frame totalizer, and means for maintaining said carriage totalizer in registration with said frame totalizer during a limited portion of said translational movement of said carriage, whereby said single master gear is rendered effective to operate said two totalizers simultaneously.

22. A device as described in claim 21, having in addition, means for releasing said registration maintaining means.

23. A device as described in claim 21, wherein said carriage totalizer is constructed to perform operations in addition or subtraction, and wherein the device is provided with control means carried by said totalizer for causing said totalizer to add or subtract, and control operating means attached to said frame positioned in definite relation to said fixed totalizer and in the path of said control means, whereby translational movement of said carriage effects coaction of said control means with said control operating means.

24. A device as described in claim 21, wherein said carriage totalizer is of the rock frame type of construction adapted to perform operations in addition or subtraction, and wherein the device is provided with a control lever fastened to said rock frame, and a cam attached to said machine frame in definite relation to said frame totalizer and positioned in the path of said lever, whereby translational movement of said carriage effects coaction between said lever and said cam to control the operation of said carriage totalizer to cause it to perform operations in either addition or subtraction and to maintain such state during registration of said two totalizers.

25. In an accounting machine having a totalizer for effecting calculations, a master gear adapted to cooperate with said totalizer and a set of type for making printed records of the numbers entered into said totalizer, in combination, a rotor on which are mounted said printing type, gear teeth mounted on said rotor in definite spaced relationship to said type, means for bringing said gear teeth into cooperation with said master gear whereby rotation of said rotor to bring a selected number type to a printing station simultaneously rotates the master gear to enter the selected number into said totalizer.

26. In an accounting machine having a totalizer for effecting calculation, a master gear adapted to cooperate with said totalizer, a set of type including numerals for making printed records, and a set of keys corresponding to the type, in combination, a rotor on which said type are mounted, gear teeth mounted on said rotor in definite spaced relationship to said type, means for rotating said rotor, selector means controlled by said keys for arresting the rotor at a plurality of portions of a revolution to bring a selected type to a printing station, means for bringing said rotor gear teeth into driving contact with said master gear when it is desired to effect calculations, means for releasably holding said rotor in a predetermined position, means for releasing said holding means operated by said keys, whereby depression of a numeral key releases the rotor from its held position, said selector means arrests said rotor at a portion of a revolution to bring the selected type to the printing station and simultaneously the partial revolution of said rotor enters the number into said totalizer.

27. A device as described in claim 26 wherein said set of type includes letters and characters and means for locking out said letter and character keys when setting the machine for effecting calculations.

28. In an accounting machine, a totalizer, a travelling master gear to drive the various register wheels of said totalizer, and tabulating means including a power operated friction drive member operatively connected with the master gear for moving said gear into cooperative relation with the register wheel of a predetermined order of the totalizer.

29. In an accounting machine, a single rotatable type carrier, numeral type mounted on said carrier, a totalizer, power means for rotating said type carrier in one direction to selectively bring the type to a printing station, and means carried by said type carrier and adapted to cooperate with said totalizer operated by the rotation of said type carrier for simultaneously entering the value of the selected type into the totalizer while positioning the type at the printing station.

30. In a machine of the class described having at least two fixed totalizers and a traveling cross totalizer constructed and arranged to perform addition or subtraction, state control means associated with said cross totalizer and state control operating means mounted in fixed predetermined relation to said fixed totalizers, in combination, a single traveling master gear, means for differentially rotating said master gear in one direction, means for holding successively said traveling cross totalizer in alignment with said fixed totalizers, means for bringing said master gear into direct and simultaneous driving contact with successive orders of said fixed totalizer and said cross totalizer when said two totalizers are held in alignment, whereby rotation of said single master gear directly operates said cross totalizer automatically to perform addition or subtraction as governed by said state control means while simultaneously said master gear directly operates said fixed totalizer.

31. In an accounting machine adapted to print and calculate multiple entries, having a plurality of column totalizers for totaling said multiple entries, a carriage and a cross-footer totalizer mounted on said carriage, in combination, means for entering a value simultaneously in said cross-footer and a selected one of said column totalizers, means for transferring from said cross-footer to a second selected column totalizer the value first entered in said cross-footer and clearing said cross-footer back to zero, said means including a single traveling master gear adapted to mesh directly with the selected column totalizer and the cross-footer totalizer simultaneously, and state control mechanism for automatically controlling the cross-footer totalizer to perform addition or subtraction.

ERNEST C. OLNEY.